(12) United States Patent
Kobayashi et al.

(10) Patent No.: US 10,725,300 B2
(45) Date of Patent: Jul. 28, 2020

(54) DISPLAY DEVICE, CONTROL METHOD FOR DISPLAY DEVICE, AND PROGRAM

(71) Applicant: SEIKO EPSON CORPORATION, Tokyo (JP)

(72) Inventors: Shinichi Kobayashi, Azumino (JP); Yuichi Mori, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/327,158

(22) PCT Filed: Jul. 28, 2015

(86) PCT No.: PCT/JP2015/003766
§ 371 (c)(1),
(2) Date: Jan. 18, 2017

(87) PCT Pub. No.: WO2016/017144
PCT Pub. Date: Feb. 4, 2016

(65) Prior Publication Data
US 2017/0160550 A1      Jun. 8, 2017

(30) Foreign Application Priority Data

Jul. 31, 2014   (JP) .................................. 2014-155936
Apr. 6, 2015    (JP) .................................. 2015-077458

(51) Int. Cl.
*G02B 27/01*        (2006.01)
*H04N 13/356*       (2018.01)
*H04N 13/344*       (2018.01)

(52) U.S. Cl.
CPC ....... *G02B 27/0172* (2013.01); *G02B 27/017* (2013.01); *H04N 13/344* (2018.05);
(Continued)

(58) Field of Classification Search
None
See application file for complete search history.

(56) References Cited

U.S. PATENT DOCUMENTS 5,982,343 A     11/1999   Iba et al.
6,445,365 B1     9/2002   Taniguchi et al.
(Continued)

FOREIGN PATENT DOCUMENTS

CN      102282860 A       12/2011
EP        1906677 A1       4/2008
(Continued)

OTHER PUBLICATIONS

Oct. 6, 2015 International Search Report issued in International Patent Application No. PCT/JP2015/003766.
(Continued)

*Primary Examiner* — Matthew Yeung
(74) *Attorney, Agent, or Firm* — Oliff PLC

(57) ABSTRACT

A head-mounted display device includes a left optical-image display unit that displays an image corresponding to the left eye of a user and a right optical-image display unit that displays an image corresponding to the right eye of the user. An image processing unit divides a display target image and outputs an image for left eye and an image for right eye including divided images to the left optical-image display unit and the right optical-image display unit. The image for left eye and the image for right eye include image regions configured by the images divided by the image processing unit and non-image regions not including the divided images. A state of the non-image region of one of the image for left eye and the image for right eye corresponds to a state of the image region of the other.

20 Claims, 24 Drawing Sheets

(52) U.S. Cl.
CPC ..... *H04N 13/356* (2018.05); *G02B 2027/014* (2013.01); *G02B 2027/0112* (2013.01); *G02B 2027/0118* (2013.01); *G02B 2027/0132* (2013.01); *G02B 2027/0134* (2013.01); *G02B 2027/0138* (2013.01); *G02B 2027/0178* (2013.01)

(56) References Cited

U.S. PATENT DOCUMENTS

| | | | |
|---|---|---|---|
| 7,215,357 B1* | 5/2007 | Swift | H04N 3/24 348/56 |
| 2002/0130821 A1 | 9/2002 | Bronson | |
| 2004/0227699 A1* | 11/2004 | Mitchell | A61B 3/113 345/44 |
| 2010/0033554 A1* | 2/2010 | Kobayashi | H04N 13/324 348/43 |
| 2010/0124371 A1* | 5/2010 | Jiang | G06K 9/4671 382/162 |
| 2010/0164990 A1* | 7/2010 | Van Doorn | G02B 27/017 345/633 |
| 2011/0001808 A1* | 1/2011 | Mentz | H04N 13/0438 348/59 |
| 2011/0261034 A1* | 10/2011 | Tsuchida | G09G 3/3659 345/204 |
| 2012/0019645 A1* | 1/2012 | Maltz | G02B 7/287 348/78 |
| 2012/0050468 A1 | 3/2012 | Takahashi et al. | |
| 2012/0050509 A1* | 3/2012 | Suzuki | H04N 13/0475 348/56 |
| 2012/0200938 A1 | 8/2012 | Totani et al. | |
| 2012/0218456 A1* | 8/2012 | Sweet, III | H04N 5/23212 348/345 |
| 2012/0242677 A1 | 9/2012 | Kobayashi | |
| 2013/0207964 A1* | 8/2013 | Fleck | H01L 33/60 345/419 |
| 2013/0249945 A1 | 9/2013 | Kobayashi | |
| 2013/0342913 A1* | 12/2013 | Tsimhoni | G02B 27/01 359/630 |
| 2014/0198033 A1 | 7/2014 | Kobayashi | |
| 2014/0306981 A1 | 10/2014 | Kobayashi | |
| 2015/0062315 A1* | 3/2015 | Davis | H04N 13/361 348/56 |
| 2016/0133053 A1* | 5/2016 | Fateh | G06F 3/147 345/633 |
| 2016/0140767 A1 | 5/2016 | Kobayashi | |

FOREIGN PATENT DOCUMENTS

| | | |
|---|---|---|
| JP | H07-077665 A | 3/1995 |
| JP | H07-302063 A | 11/1995 |
| JP | H07-302064 A | 11/1995 |
| JP | 2010-205030 A | 9/2010 |
| JP | 2012-049658 A | 3/2012 |
| JP | 2012-125453 A | 7/2012 |
| JP | 2012-205000 A | 10/2012 |
| JP | 2013-200444 A | 10/2013 |
| JP | 2013-211712 A | 10/2013 |
| JP | 2014-131094 A | 7/2014 |

OTHER PUBLICATIONS

Oct. 6, 2015 Written Opinion issued in International Patent Application No. PCT/JP2015/003766.

* cited by examiner

[Fig. 1]
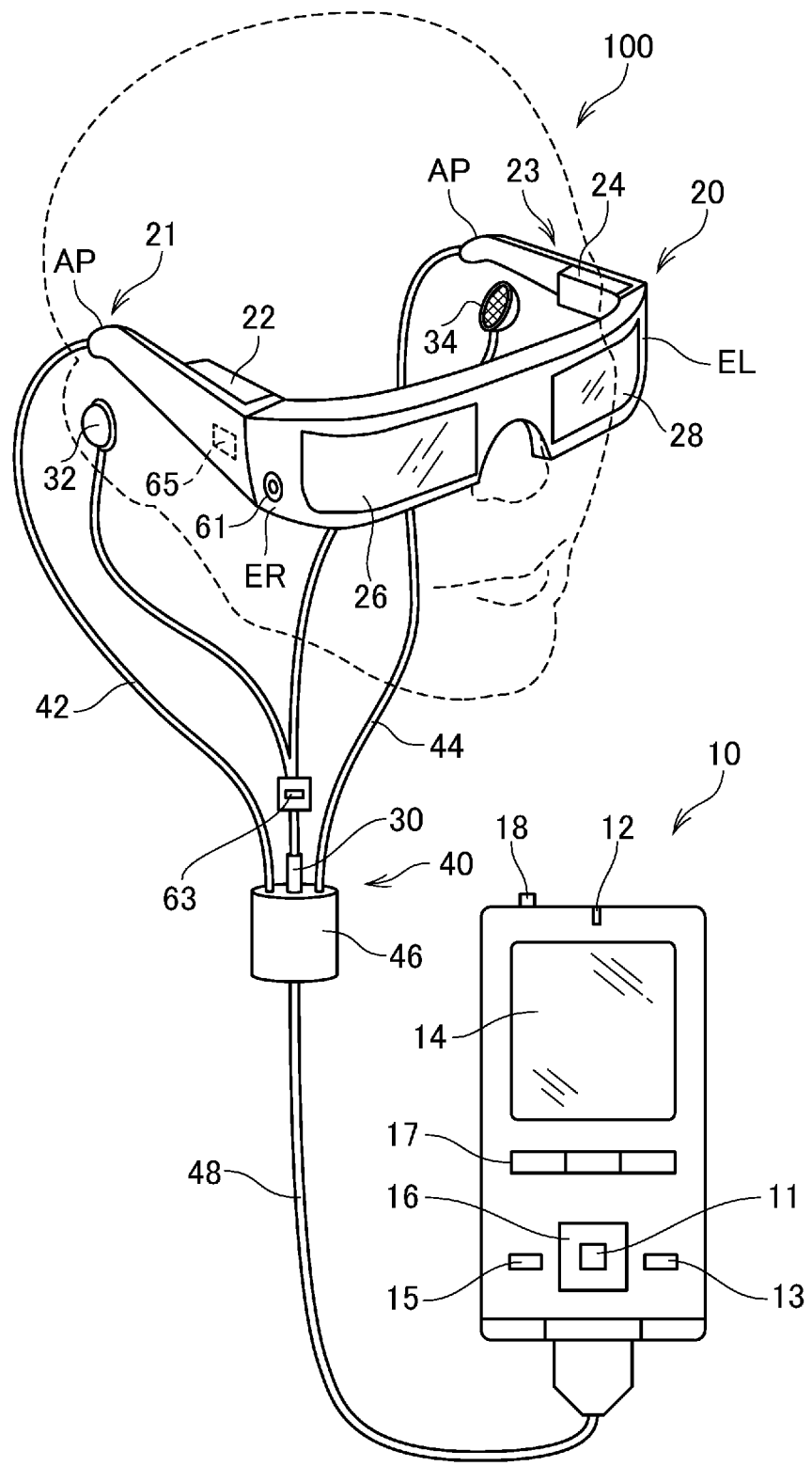

[Fig. 2]
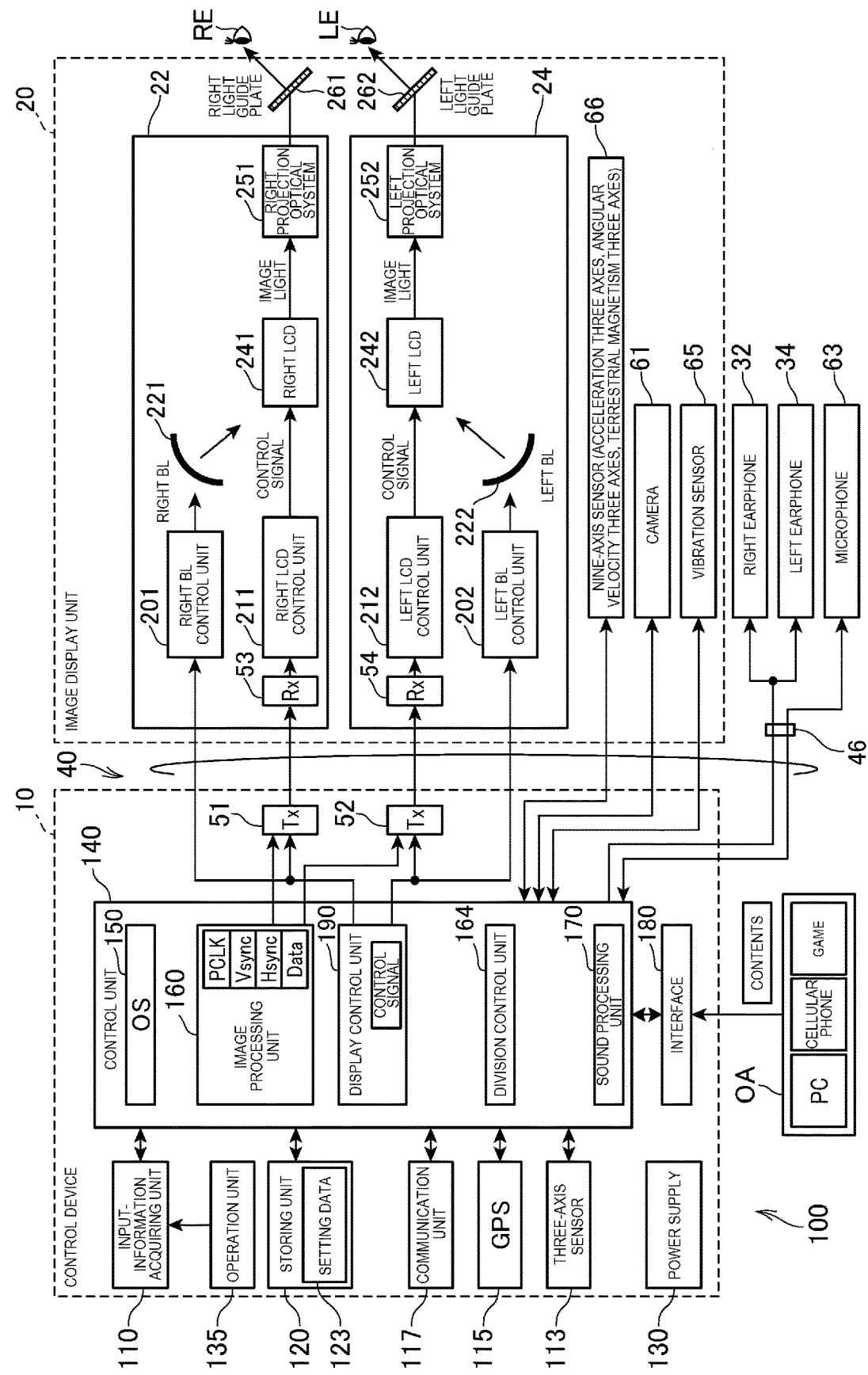

[Fig. 3]
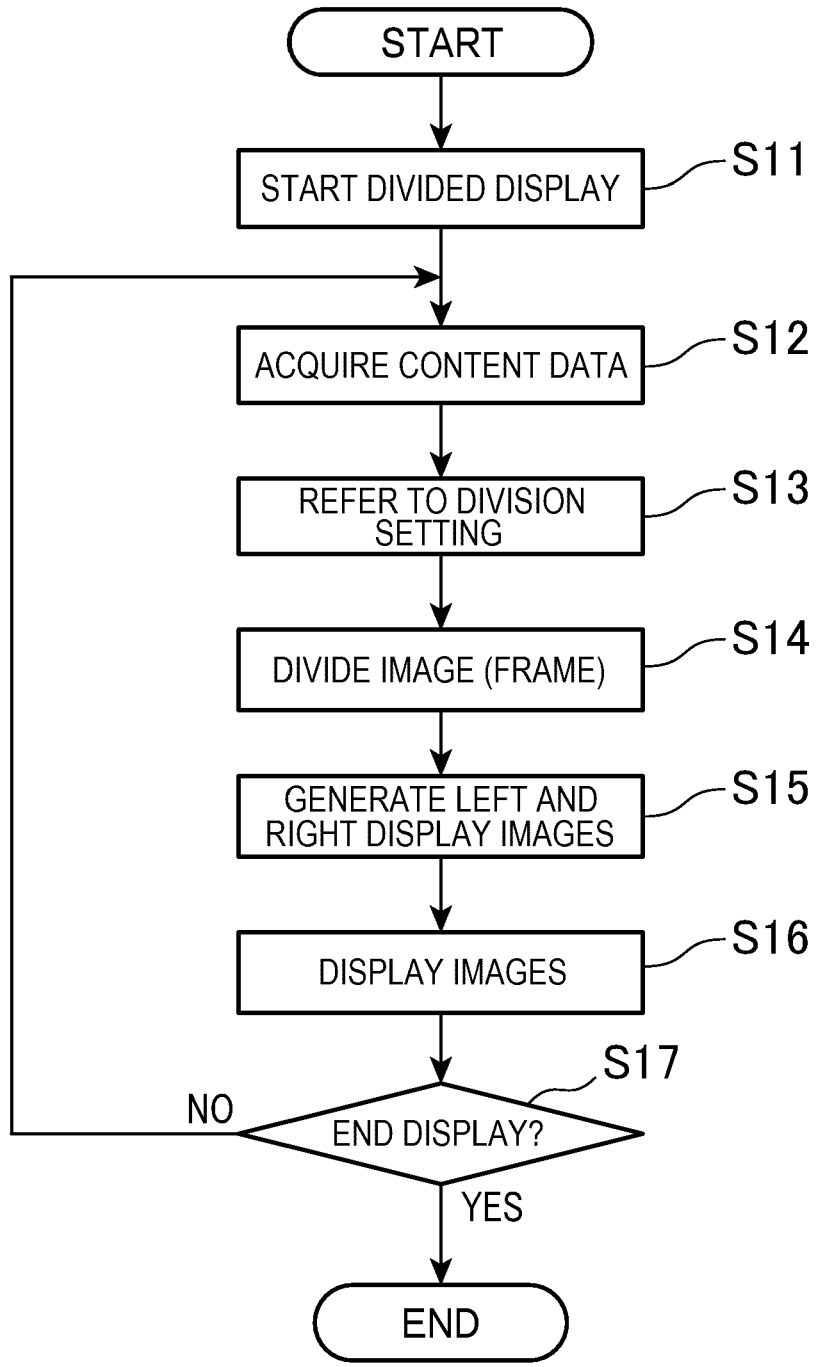

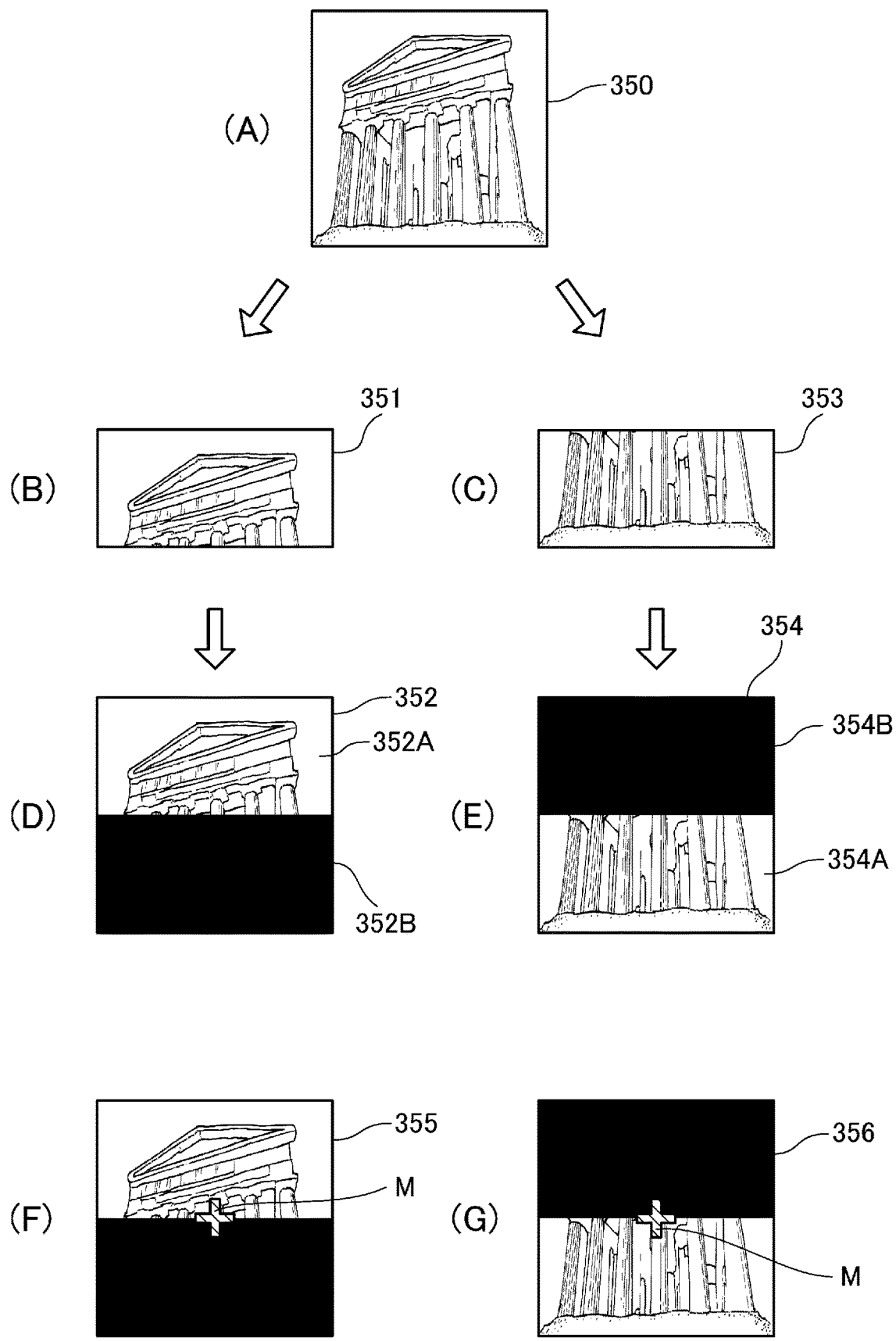
[Fig. 4]

[Fig. 5]
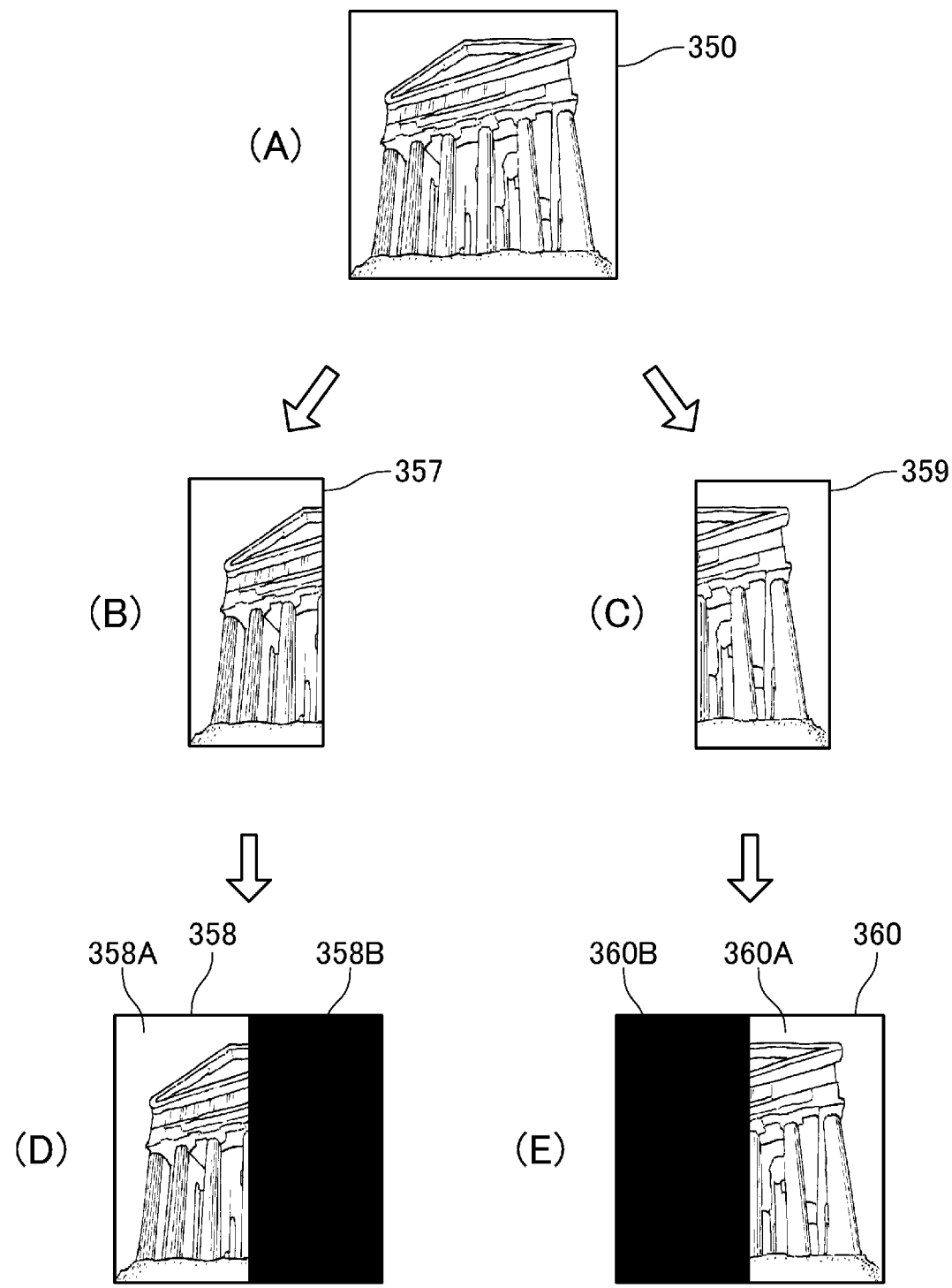

[Fig. 6]
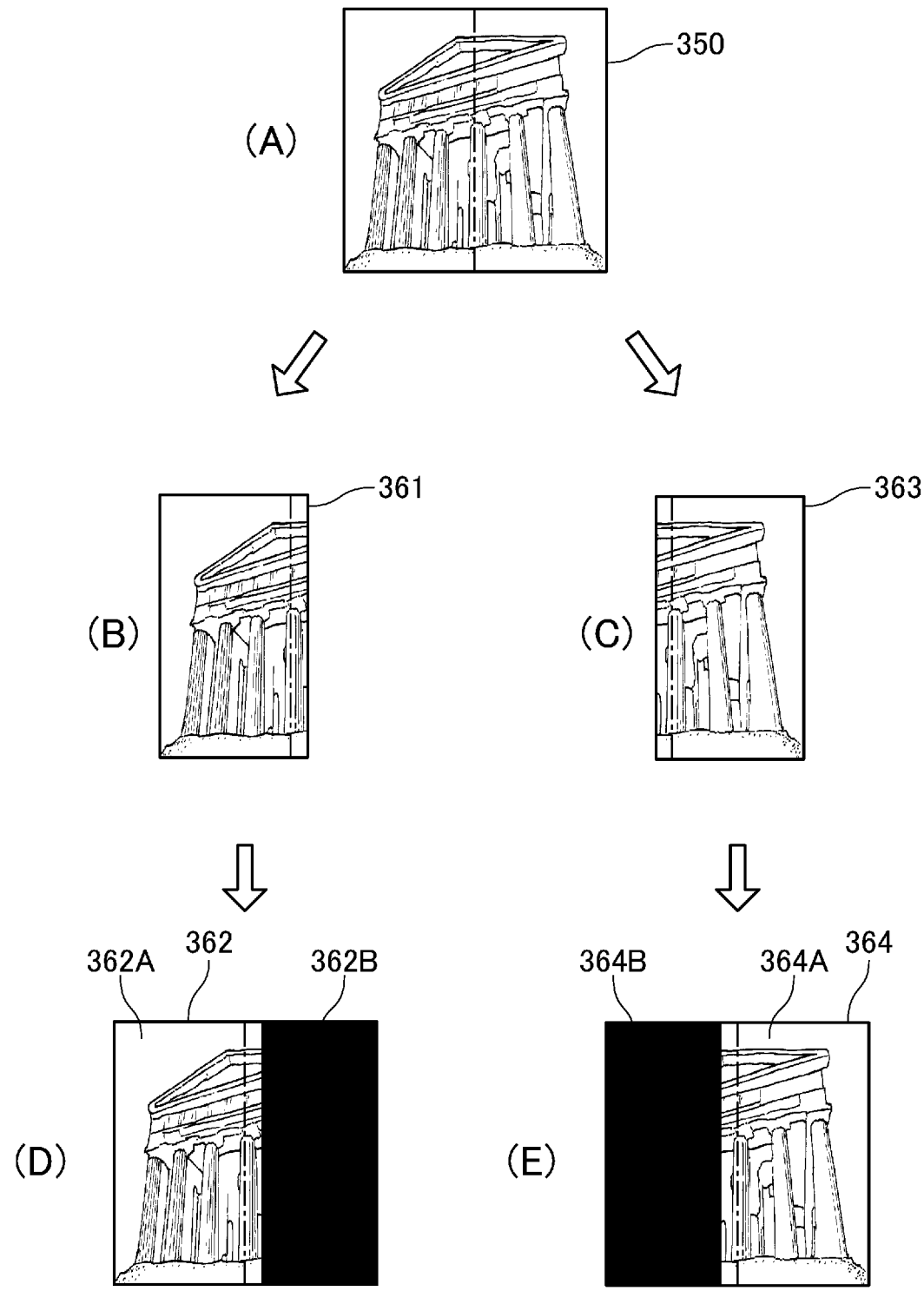

[Fig. 7]
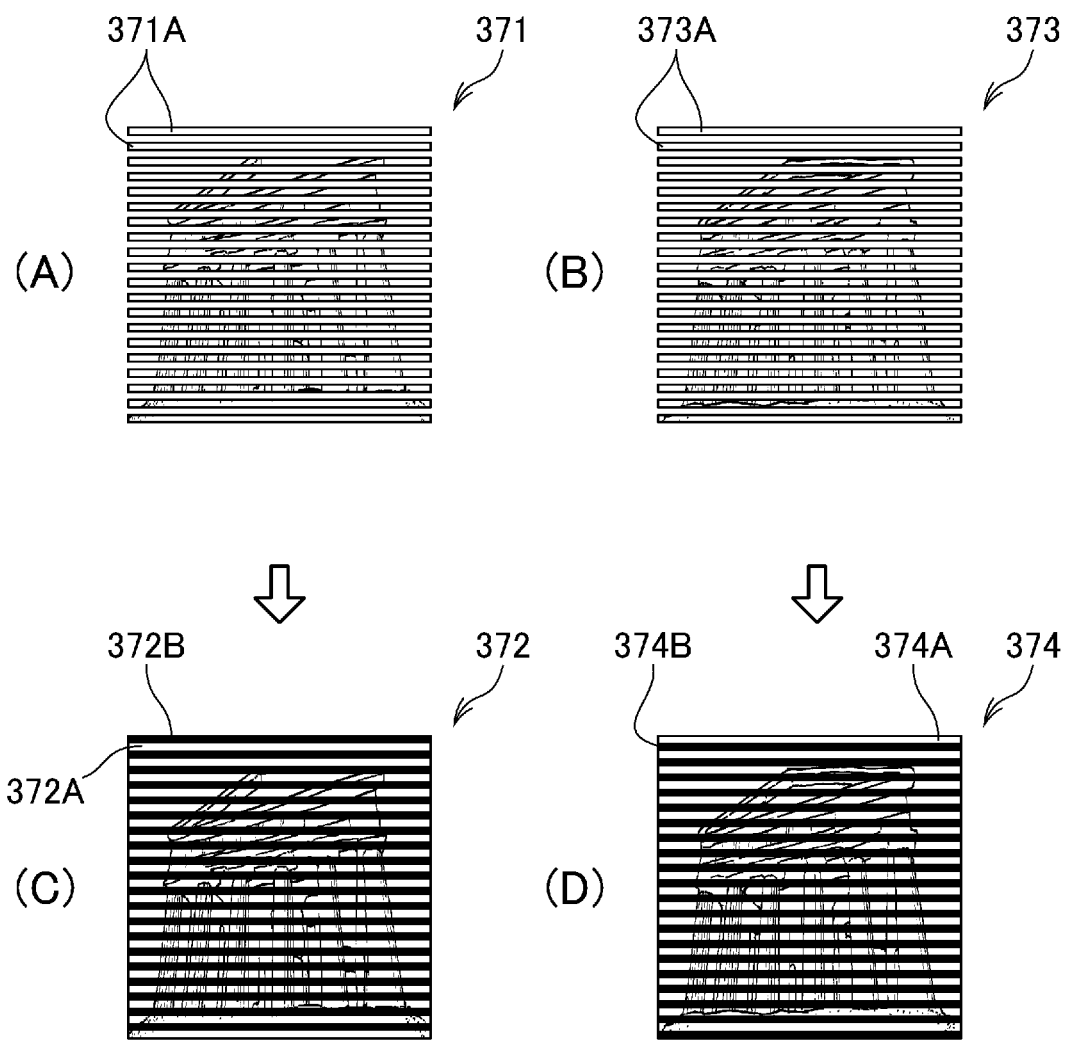

[Fig. 8]
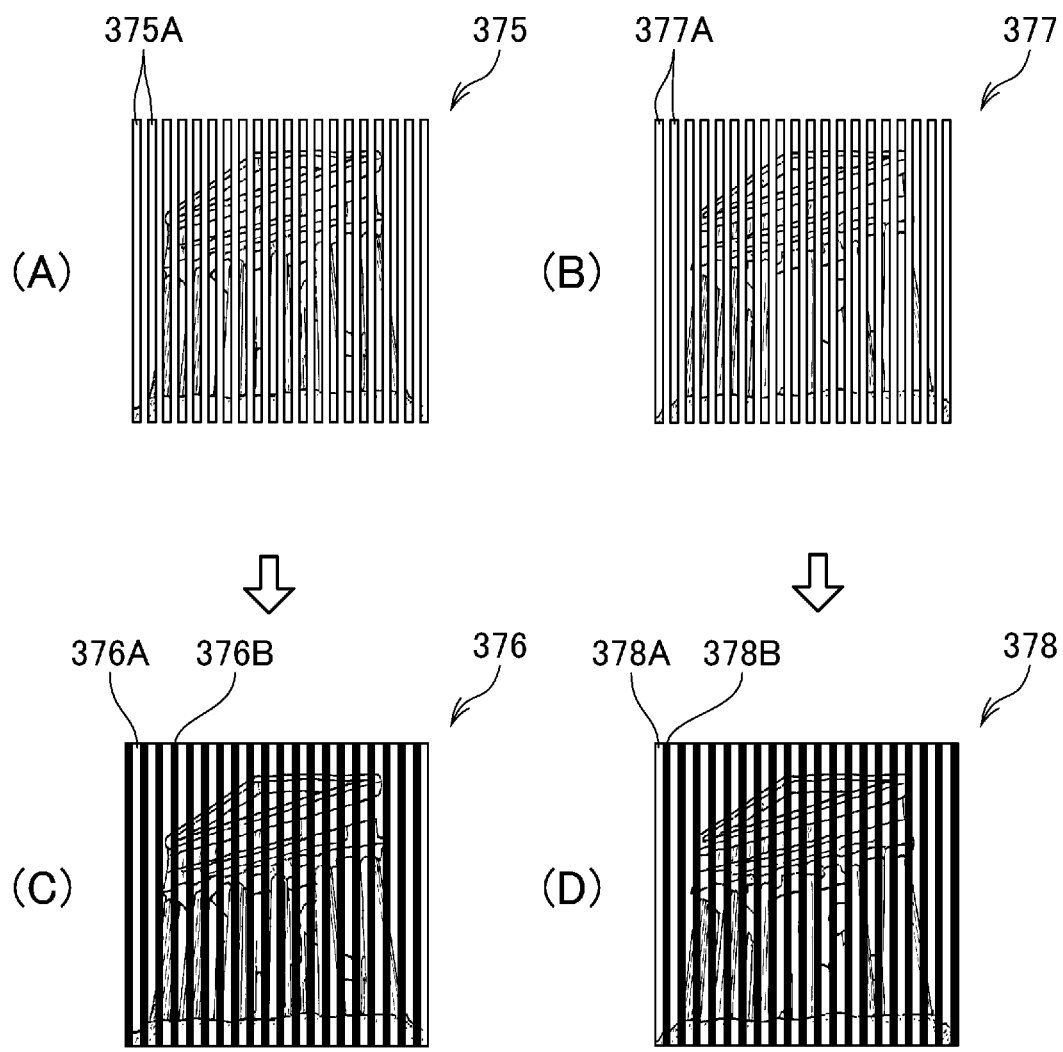

[Fig. 9]
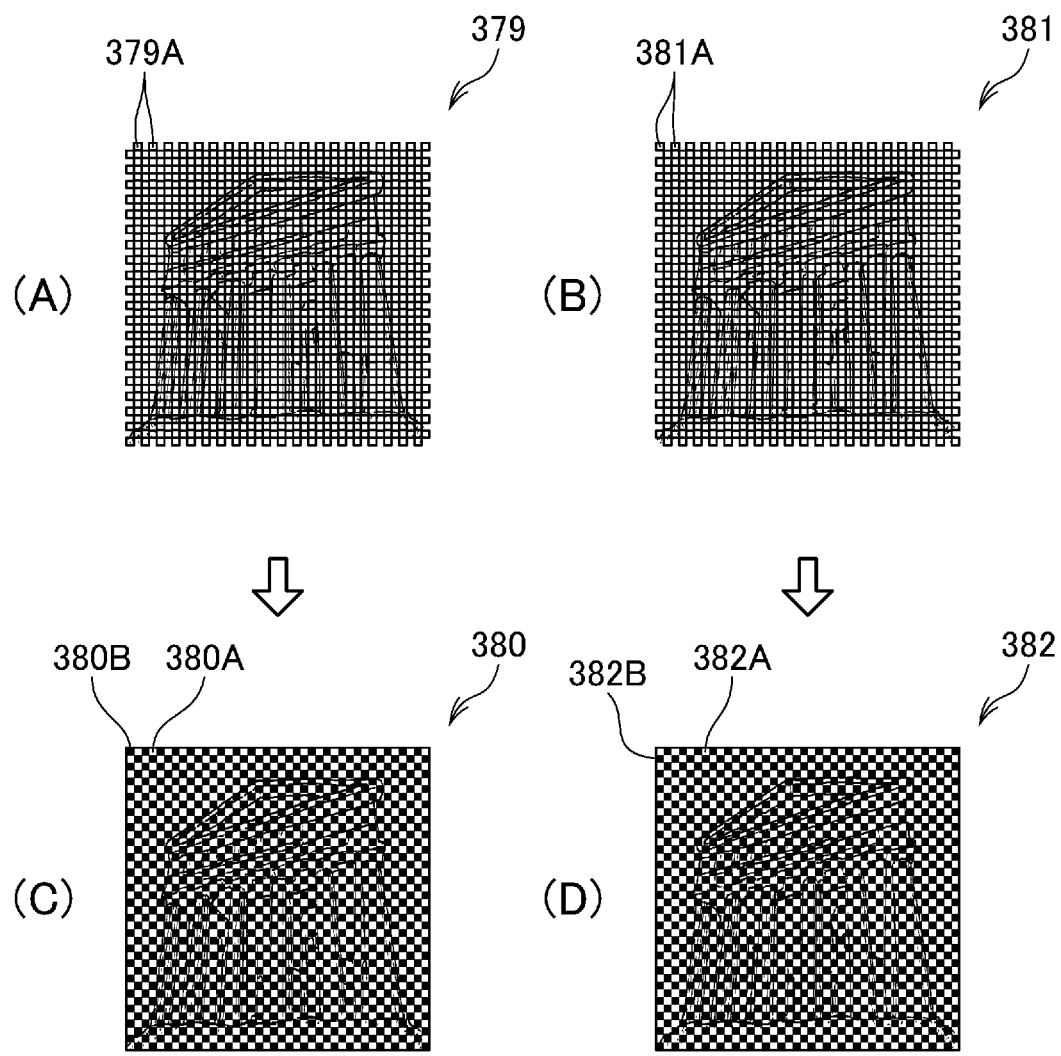

[Fig. 10]
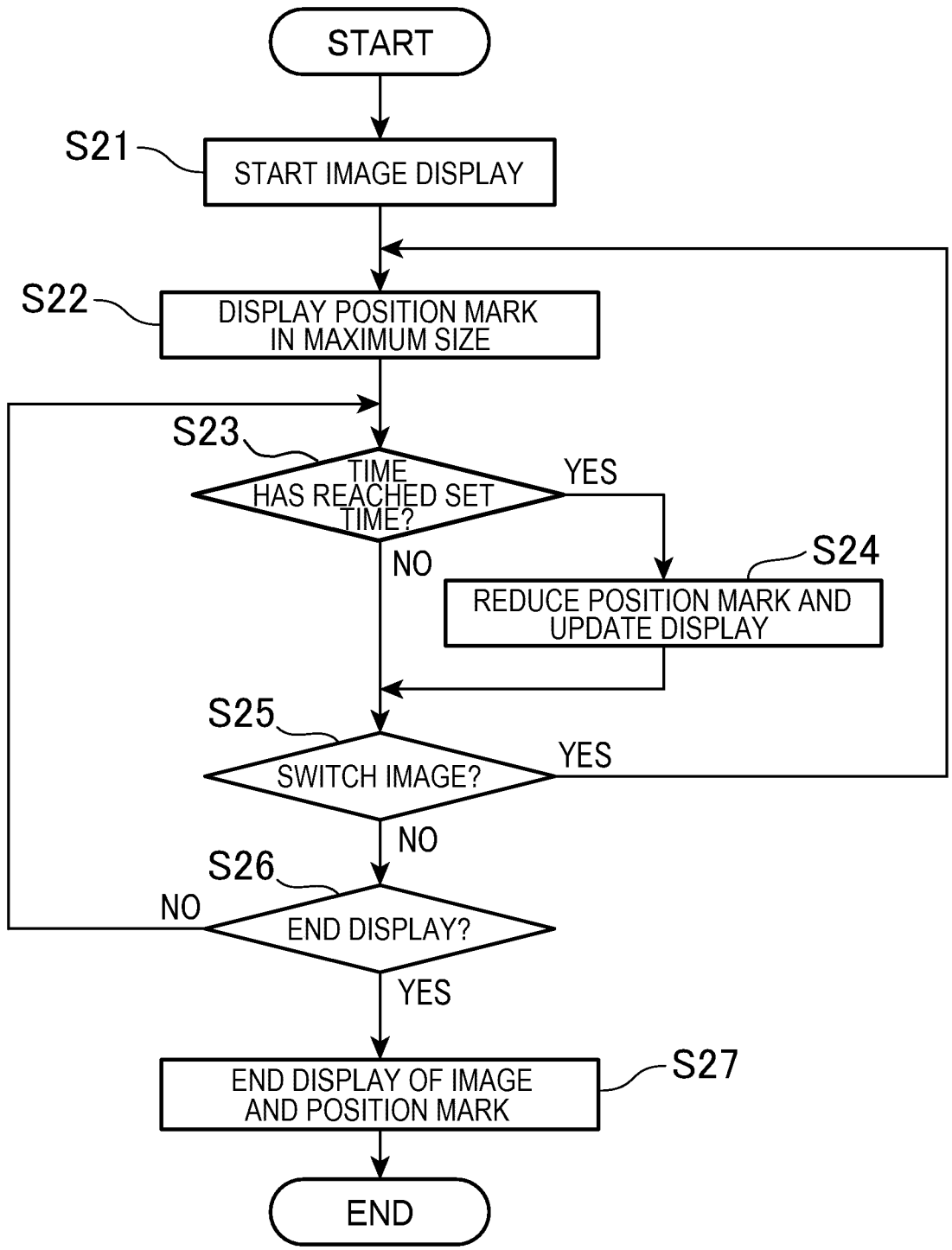

[Fig. 11]
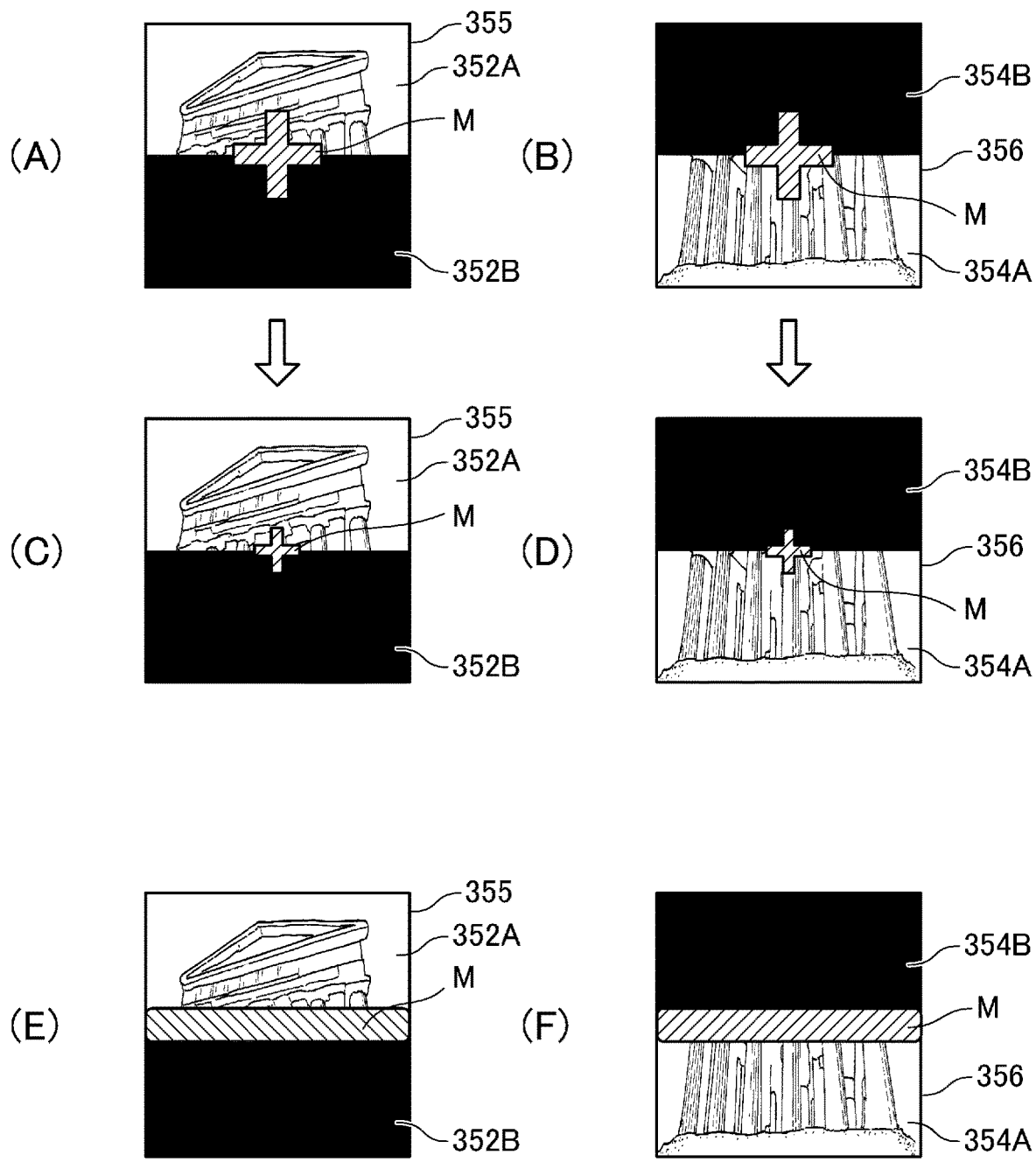

[Fig. 12]
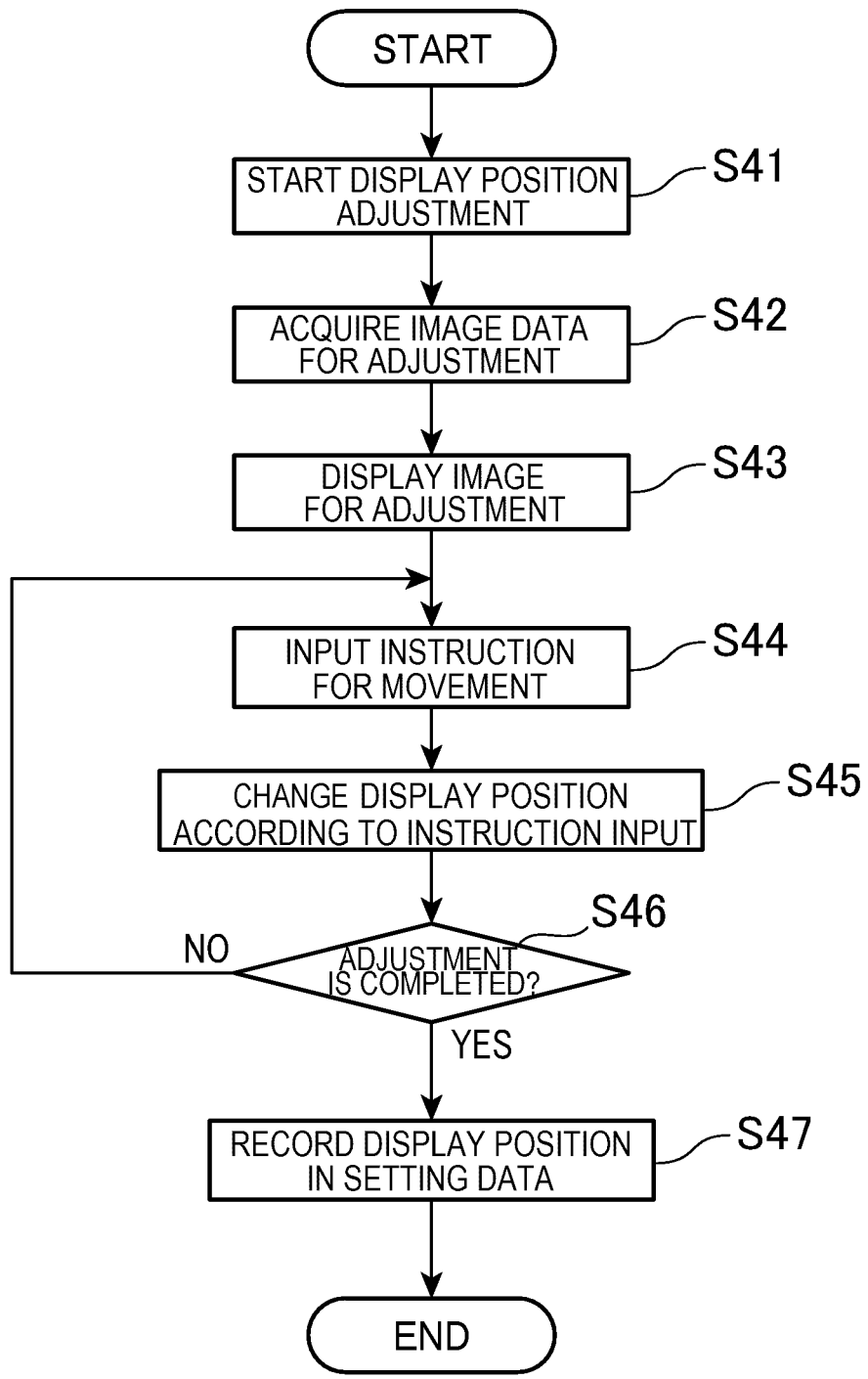

[Fig. 13]
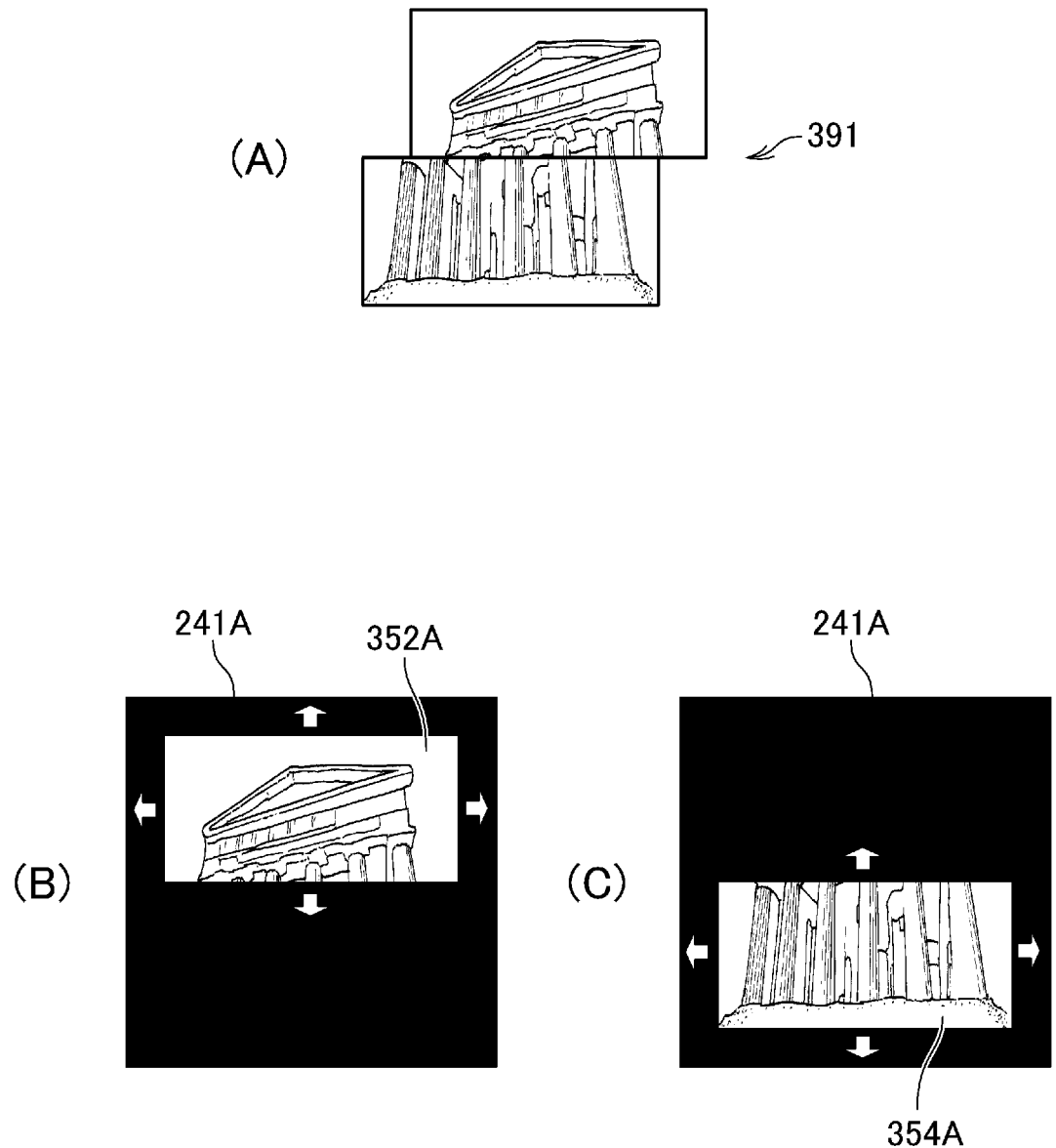

[Fig. 14]
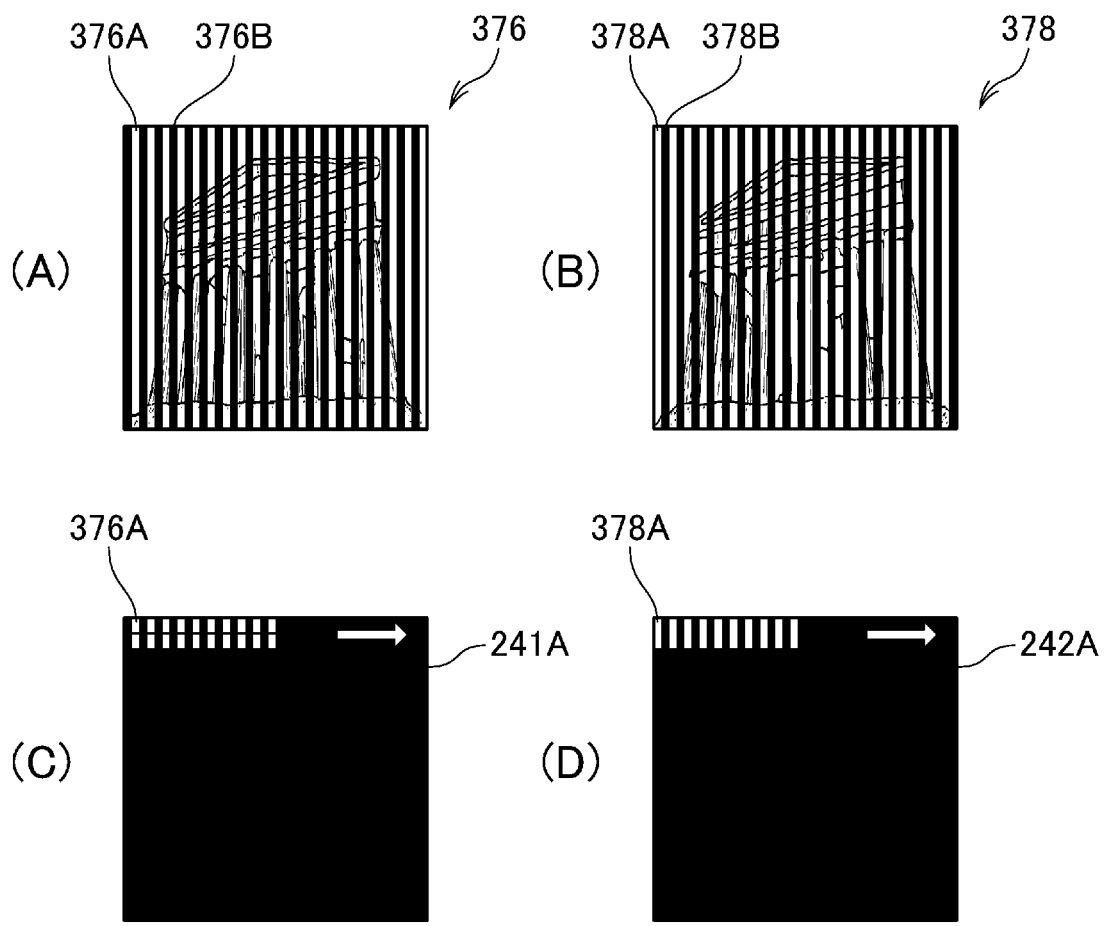

[Fig. 15]
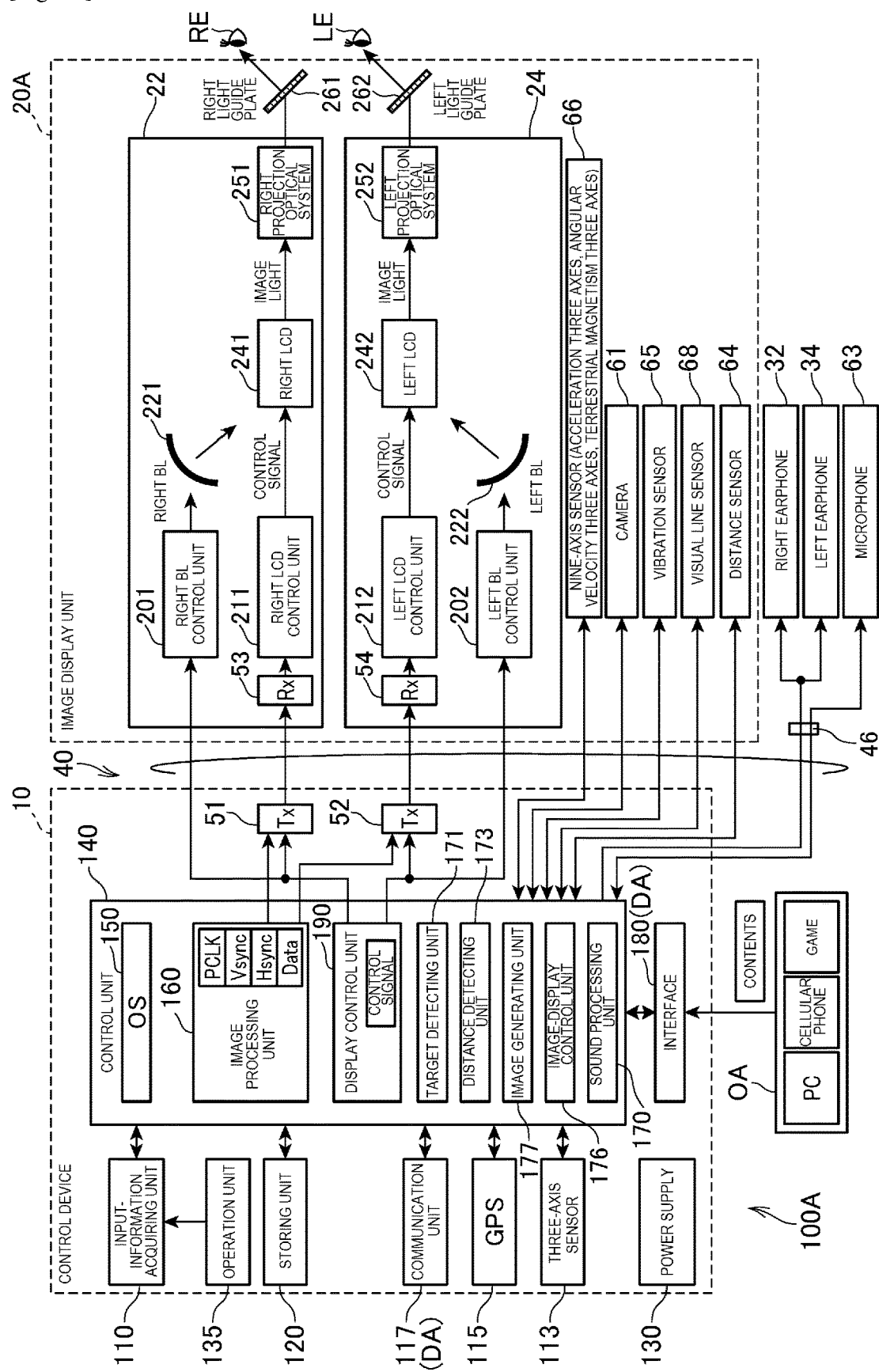

[Fig. 16]
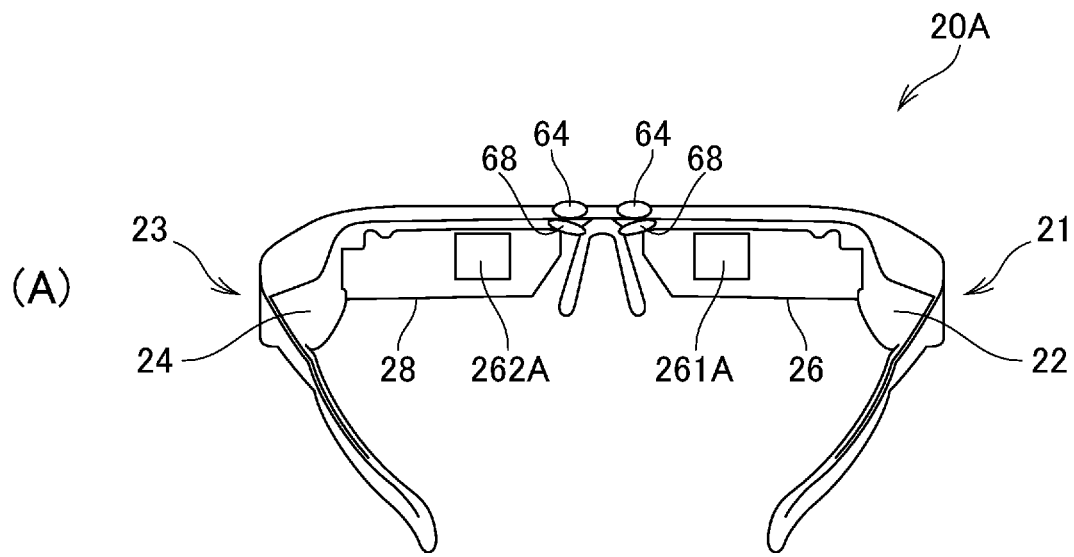
(A)
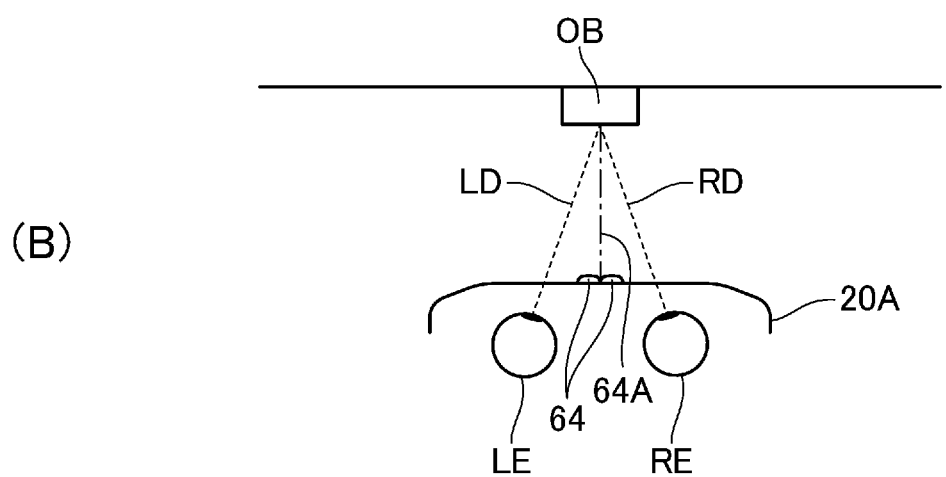
(B)

[Fig. 17]
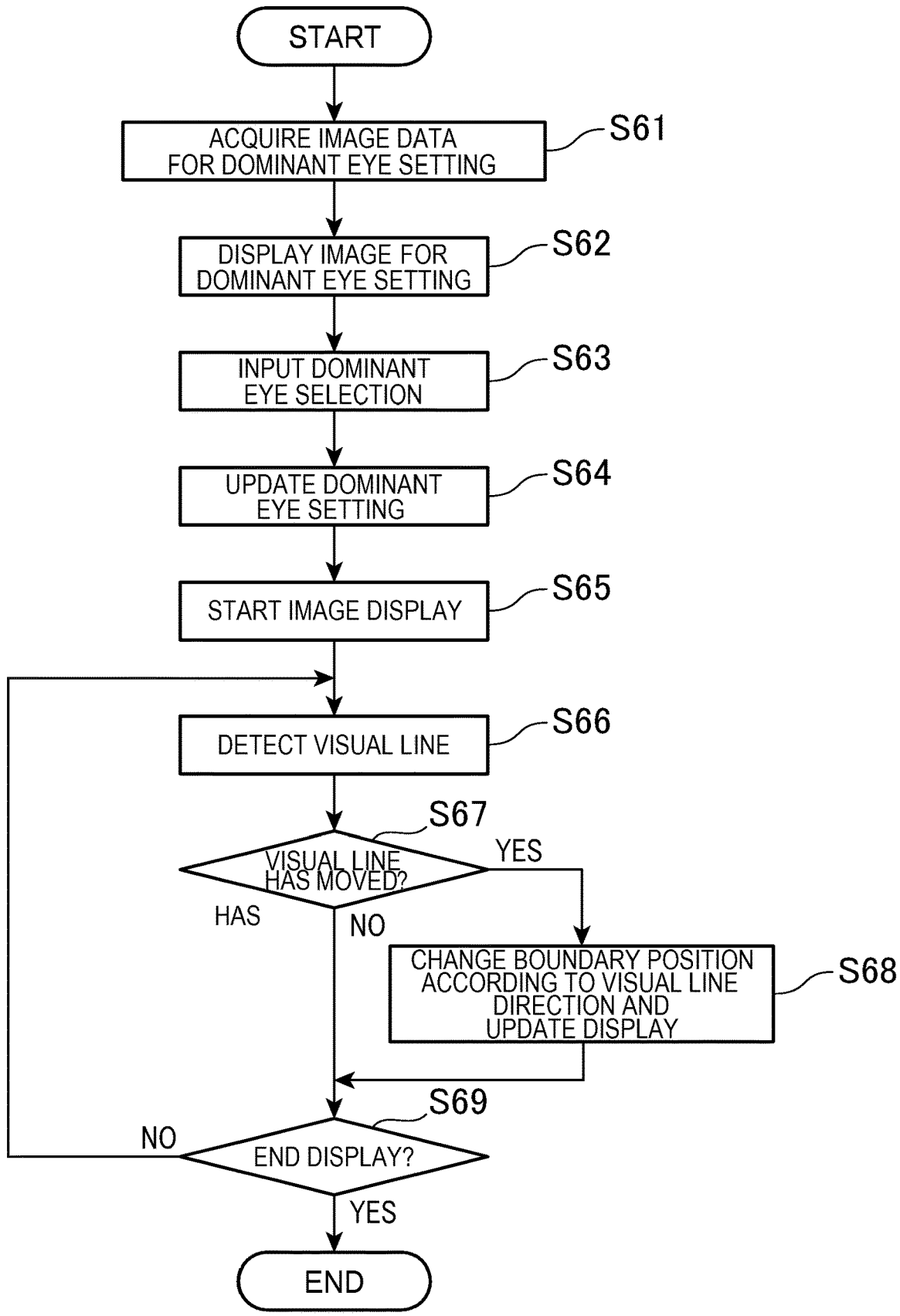

[Fig. 18]
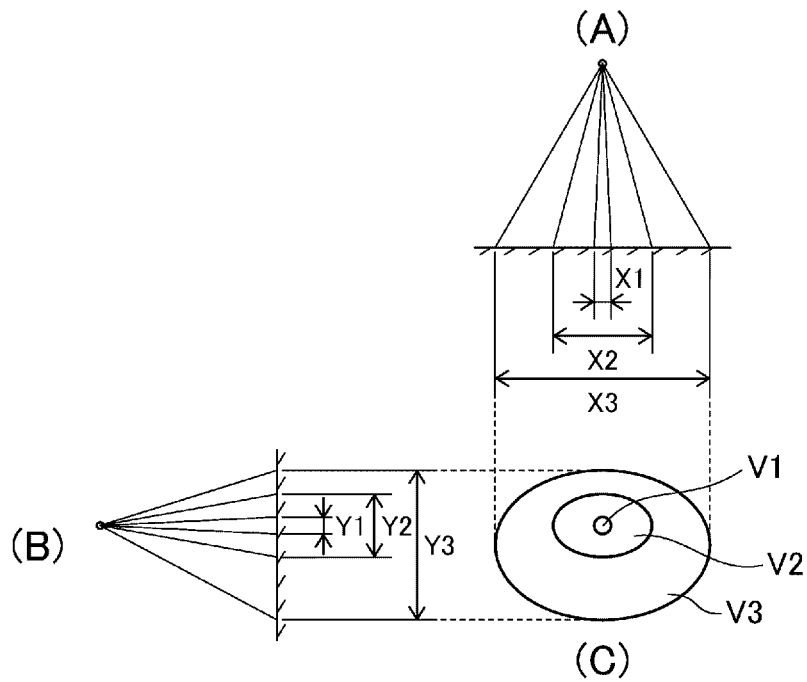
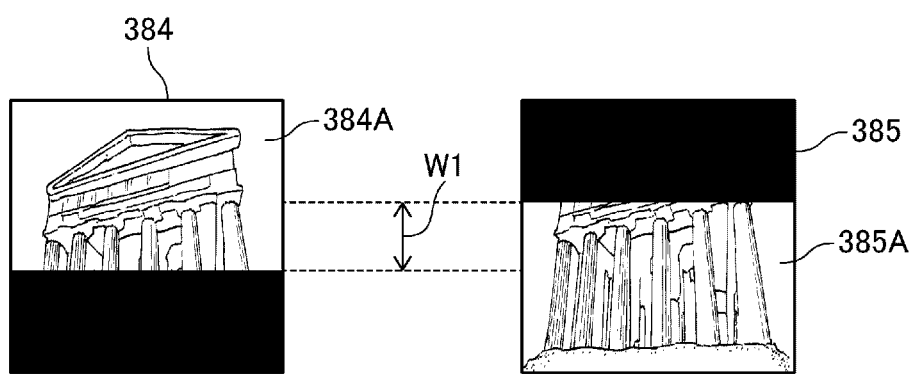
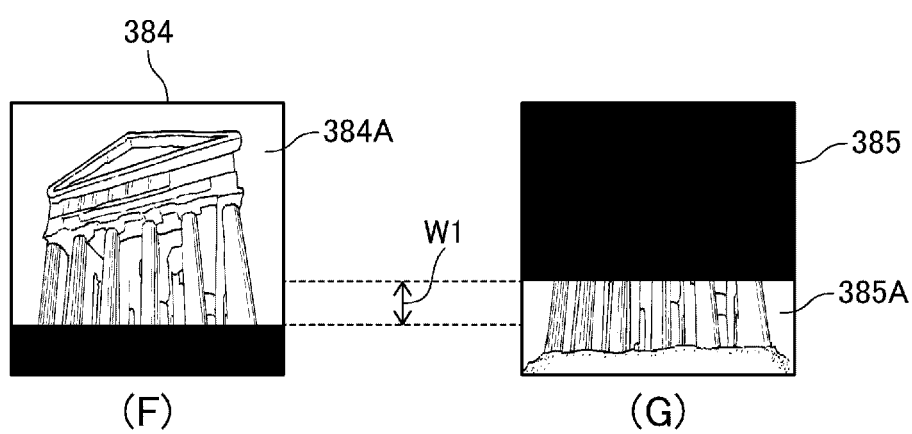

[Fig. 19]
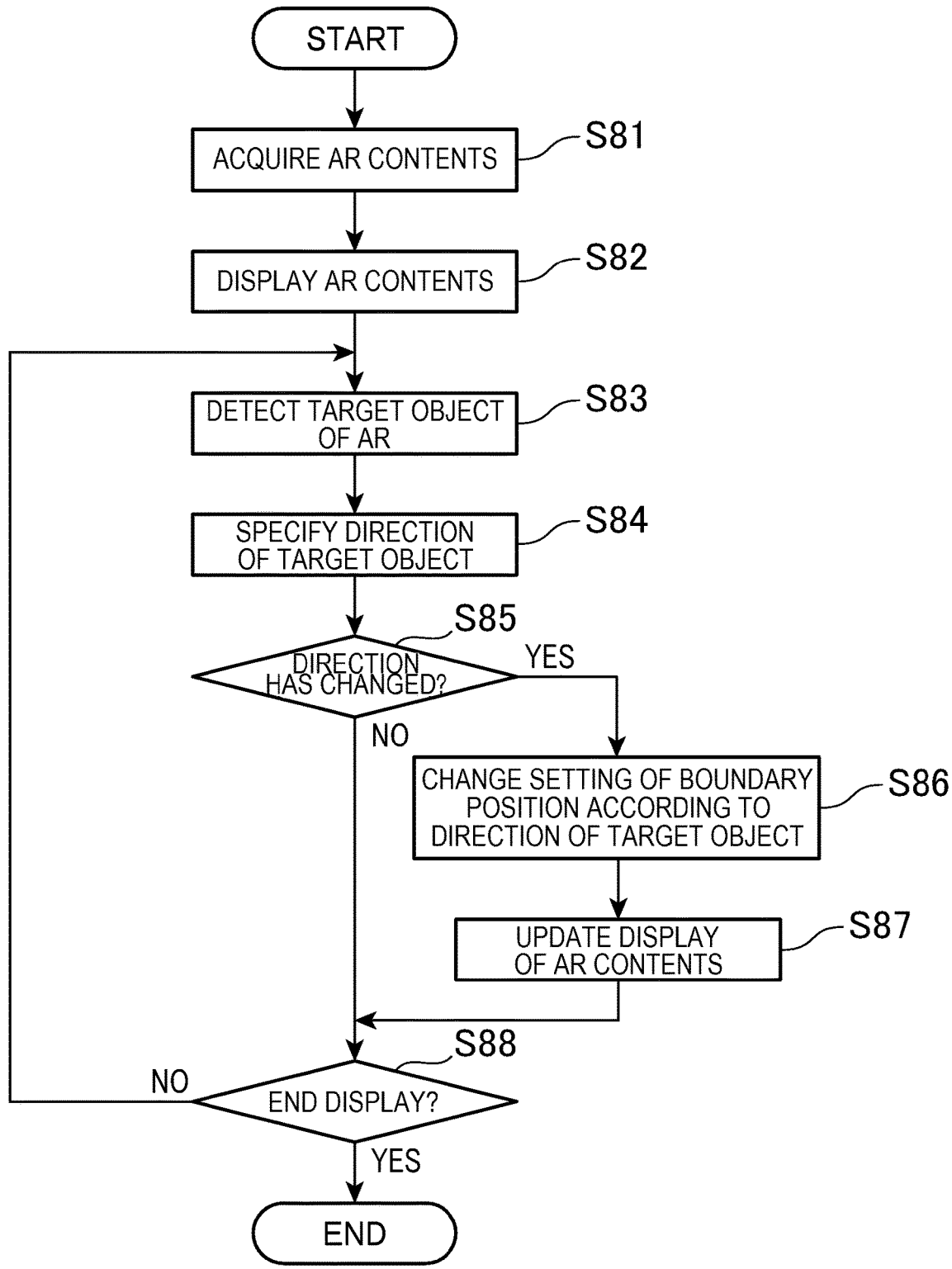

[Fig. 20]
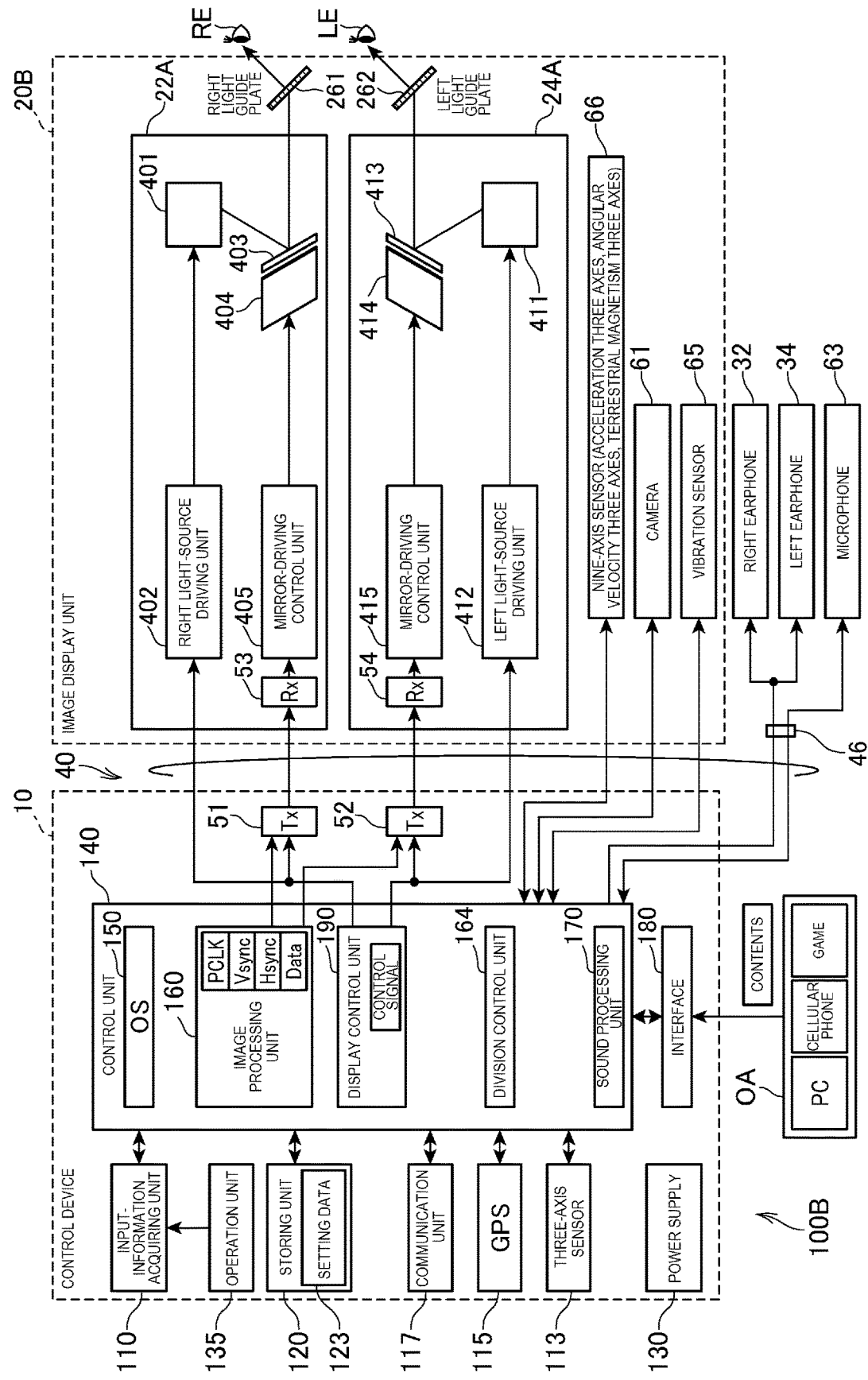

[Fig. 21]
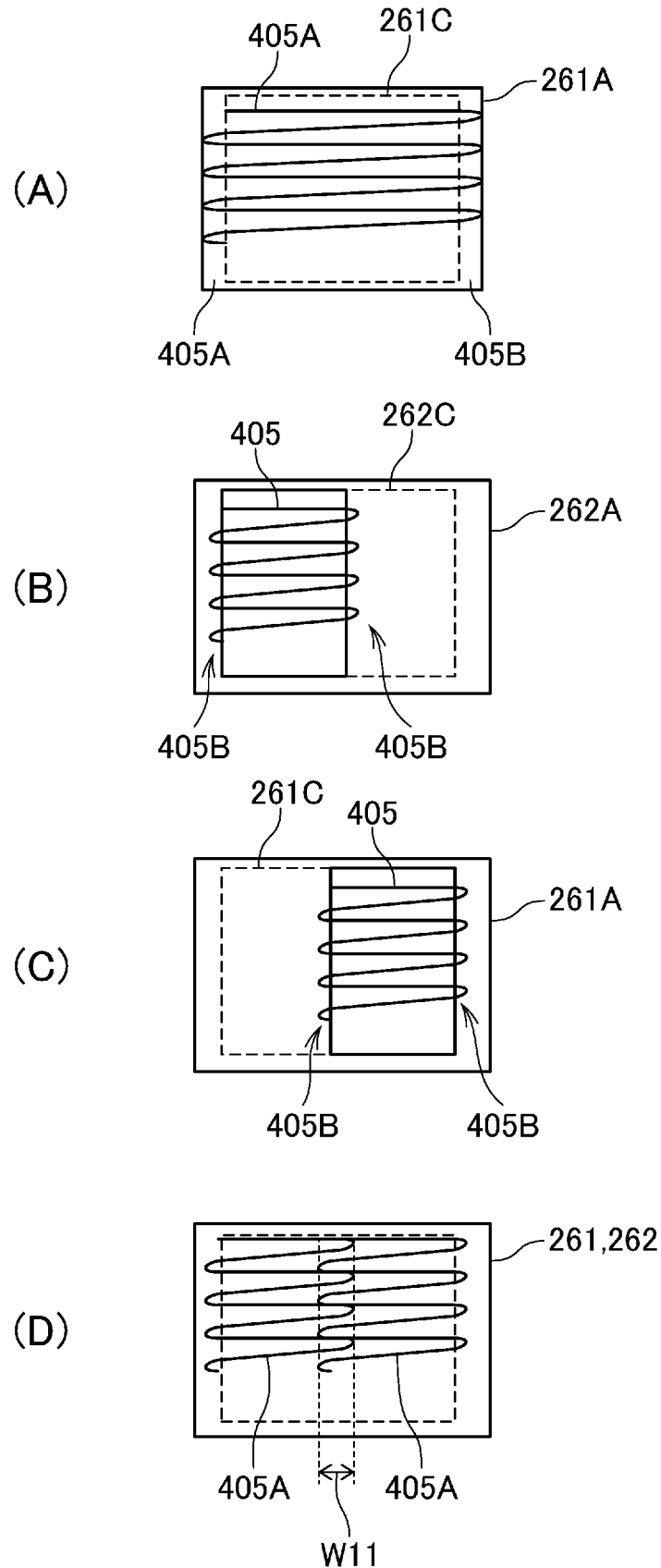

[Fig. 22]
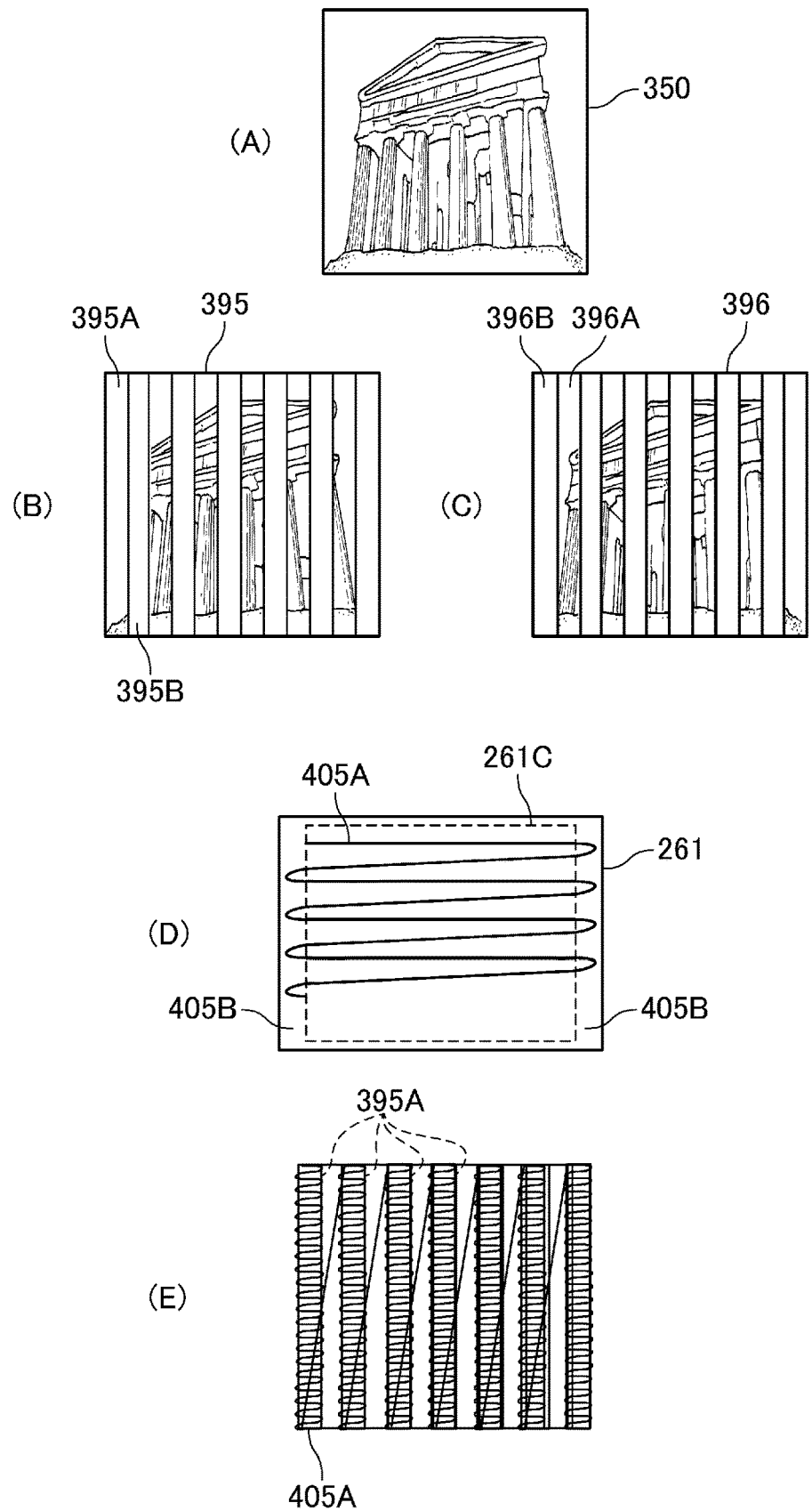

[Fig. 23]
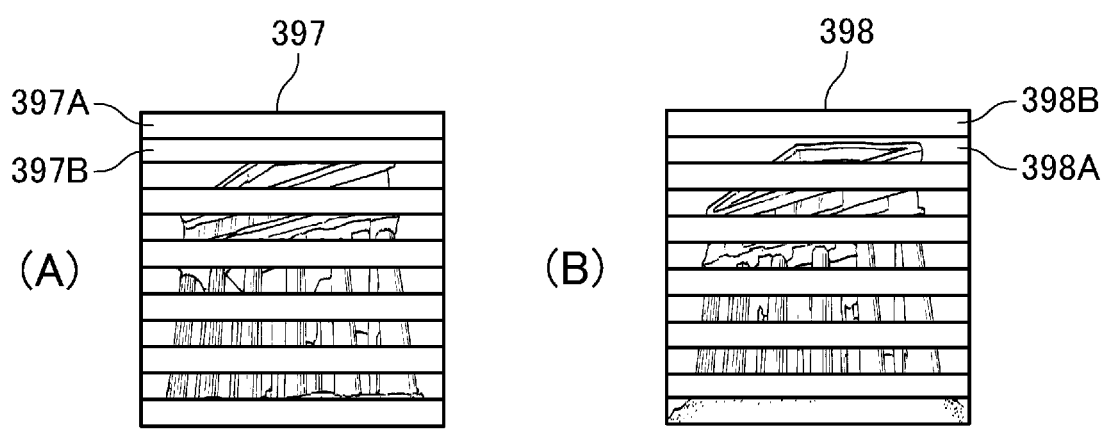
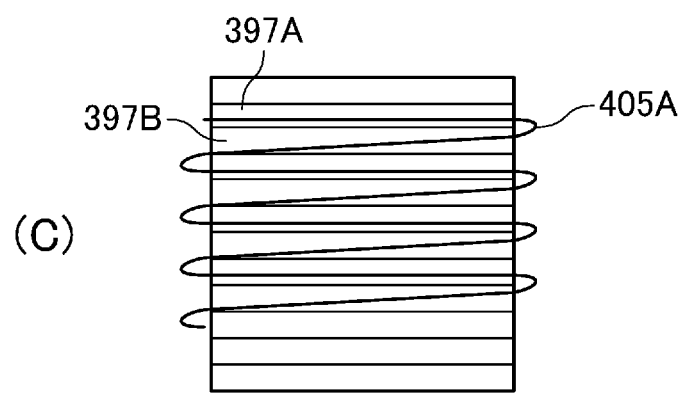

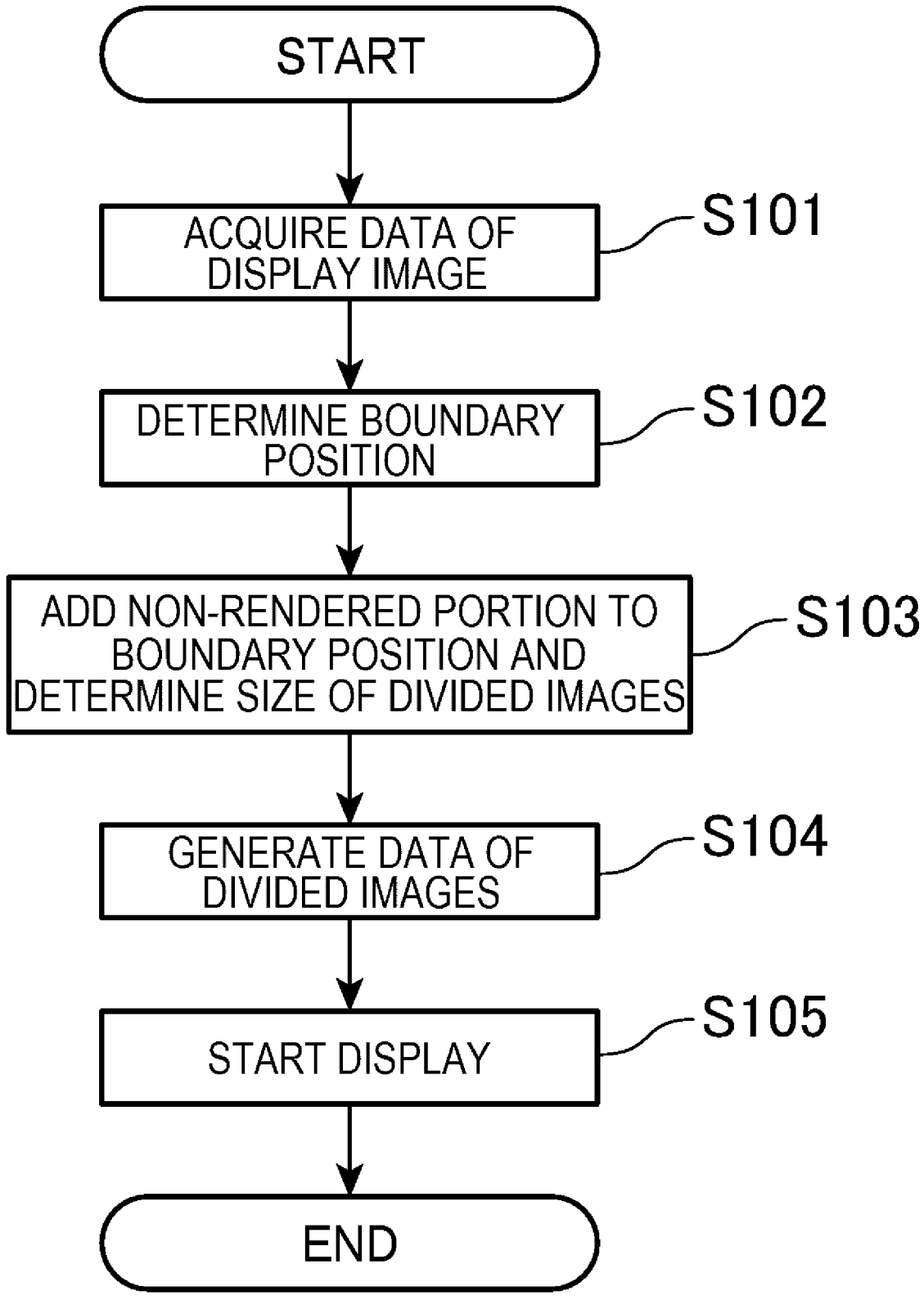
[Fig. 24]

DISPLAY DEVICE, CONTROL METHOD FOR DISPLAY DEVICE, AND PROGRAM

TECHNICAL FIELD

The present invention relates to a display device, a control method for the display device, and a program.

BACKGROUND ART

There have been known devices that display images respectively corresponding to the right eye and the left eye of a user (see, for example, PTLs 1 and 2). The devices described in PTLs 1 and 2 display images having different aspect ratios by causing the user to recognize, as one connected screen, two screens displayed on a symmetrical liquid crystal display. The device described in PTL 2 adjusts the luminance of an overlapping portion by adjusting the overlapping width of the two screens.

CITATION LIST

Patent Literature

PTL 1: JP-A-7-302063
PTL 2: JP-A-7-302064

SUMMARY OF INVENTION

Technical Problem

As in the display device in the past, when the two images are displayed respectively corresponding to the right eye and the left eye of the user, it is necessary to process an image larger than an input image. PTL 1 describes an example in which a high-vision image of a MUSE type is displayed as a wide image of horizontal resolution 1200×vertical resolution 500 using two liquid crystal panels of NTSC standard (horizontal resolution 600×vertical resolution 500). In this example, processing for converting an input image into an image having higher resolution is necessary. A load in processing the image after the conversion is higher than a load in processing the input image. In this way, in general, the resolution of a displayed image of combined two screens is larger than the resolution of the input image. There is a concern about a high processing load.

An advantage of some aspects of the invention is to reduce a processing load applied when a display device including a plurality of display units displays an input image.

Solution to Problem

An aspect of the invention is directed to a display device including: a first display unit configured to display an image corresponding to the left eye of a user; a second display unit configured to display an image corresponding to the right eye of the user; and an image processing unit configured to divide a display target image and output a first image and a second image including divided images to the first and second display units. The first image and the second image include image regions configured by the images divided by the image processing unit and non-image regions not including the divided images. A state of the non-image region of one of the first image and the second image corresponds to a state of the image region of the other.

According to the aspect of the invention, the first display unit and the second display unit display the first and second images. The first image and the second image include, in addition to the image regions configured by the images obtained by dividing the display target image, the non-image regions not including the divided images. Therefore, processing such as an increase in resolution and expansion of the display target image is not involved or a load of processing can be suppressed. Further, transfer speed for transferring images to the display units can be suppressed. If processing for generating the non-image regions and the non-image regions are simplified, a load can be easily suppressed. Therefore, it is possible to suppress a load related to display of images and cause the user to visually recognize a target image.

In the aspect of the invention, in the display device, it is preferable that the non-image regions included in the first image and the second image are pseudo image regions including pseudo images different from the divided images.

According to the aspect of the invention, by using the pseudo images, it is possible to suppress a load related to display of images and cause the user to visually recognize a target image.

In the aspect of the invention, in the display device, it is preferable that the first image and the second image are images visually recognized as the display target image by a user when the first image and the second image are displayed on the first display unit and the second display unit.

According to the aspect of the invention, by dividing the target image and displaying the divided images on the first display unit and the second display unit, it is possible to suppress a load of processing and display the target image making use of the two display units.

In the aspect of the invention, in the display device, it is preferable that the image processing unit associates positions of the image regions in the first image and the second image with positions of the divided images in the display target image.

According to the aspect of the invention, the display target image is divided and the divided images are displayed on the first and second display units without the positions of the divided images being changed. Therefore, it is possible to cause the user to visually recognize one display target image using the two display units.

In the aspect of the invention, it is preferable that the display device further includes a display-state control unit configured to control a display position of the image region of the first image in the first display unit and a display position of the image region of the second image in the second display unit.

According to the aspect of the invention, it is possible to appropriately adjust the display positions of the image region of the first image and the image region of the second image and satisfactorily keep visibility of the display target image.

In the aspect of the invention, it is preferable that the display device further includes a receiving unit configured to receive an input of the user, and the display-state control unit changes, according to the input received by the receiving unit, at least one of the display position of the image region of the first image in the first display unit and the display position of the image region of the second image in the second display unit.

According to the aspect of the invention, it is possible to adjust the display positions of the image regions according to view perceived by the user and satisfactorily keep visibility of the display target image.

In the aspect of the invention, it is preferable that the display device controls, according to a state of a visual line of the user, at least one of the display position of the image region of the first image in the first display unit and the display position of the image region of the second image in the second display unit.

According to the aspect of the invention, it is possible to adjust the display positions of the image regions according to view perceived by the user and satisfactorily keep visibility of the display target image.

In the aspect of the invention, it is preferable that the display device further includes a visual-line detecting unit configured to detect a visual line direction of the user, and the display-state control unit controls, according to the visual line direction detected by the visual-line detecting unit, at least one of the display position of the image region of the first image in the first display unit and the display position of the image region of the second image in the second display unit.

According to the aspect of the invention, it is possible to adjust the display positions of the image regions according to the visual line direction of the user and satisfactorily keep visibility of the display target image.

In the aspect of the invention, in the display device, it is preferable that the display-state control unit controls, according to a visual line direction of a dominant eye of the user detected by the visual-line detecting unit, the display position of the image region of the first image in the first display unit and the display position of the image region of the second image in the second display unit.

According to the aspect of the invention, it is possible to adjust the display positions of the image regions to prioritize the visual line direction of the dominant eye of the user and satisfactorily keep visibility of the display target image.

In the aspect of the invention, in the display device, it is preferable that the first display unit and the second display unit transmit an outside scene and display the images to be enabled to be visually recognized together with the outside scene, and the display-state control unit adjusts a display mode of the non-image region in at least one of the first image and the second image.

According to the aspect of the invention, by adjusting the display mode of the pseudo image region, it is possible to control visibility of the outside scene transmitted through the pseudo image region or the image region corresponding to the pseudo image region.

In the aspect of the invention, it is preferable that the display device further includes a display control unit configured to cause the first display unit and the second display unit to display the display target image according to a position where the user visually recognizes a target object included in the outside scene, and the display-state control unit controls, according to the position where the user visually recognizes the target object, the display position of the image region of the first image in the first display unit and the display position of the image region of the second image in the second display unit.

According to the aspect of the invention, it is possible to satisfactorily perform AR display corresponding to the target object included in the outside scene.

In the aspect of the invention, in the display device, it is preferable that the display-state control unit extracts two images having portions overlapping each other from the display target image and sets the two images respectively as the image regions of the first image and the second image.

According to the aspect of the invention, it is possible to cause the image displayed by the first display unit and the image displayed by the second display unit to overlap each other. Consequently, when a seam of the images displayed by the first and second display units gives a sense of discomfort, it is possible to eliminate the sense of discomfort and display a high-definition image.

In the aspect of the invention, in the display device, it is preferable that the display-state control unit disposes the image regions and the non-image regions in regions set in advance in the first image and the second image.

According to the aspect of the invention, it is possible to reduce loads of processing by the image processing unit for dividing the display target image and processing for combining the non-image regions to generate the first or second image.

In the aspect of the invention, in the display device, it is preferable that the display-state control unit disposes a plurality of the image regions and a plurality of the non-image regions in each of the first image and the second image.

According to the aspect of the invention, the first image and the second image are combined in a more complicated shape to cause the user to visually recognize the display target. Therefore, it is possible to divide the display target image, for example, in a shape easily visually recognized by the user and display images.

In the aspect of the invention, in the display device, it is preferable that the display-state control unit sets a display size of the first image displayed on the first display unit and a display size of the second image displayed on the second display unit to the same size.

According to the aspect of the invention, since the display sizes of the first and second display units are equal, correspondence between the image displayed by the first display unit and the image displayed by the second display unit is clarified. There is an advantage that it is easy to recognize one display target image from the images of the two display units.

In the aspect of the invention, in the display device, it is preferable that the display-state control unit disposes a predetermined index in a common position of the first image and the second image.

According to the aspect of the invention, since the index is present in the common position in the images displayed on the first and second display units, correspondence between the images displayed by the first display unit and the second display unit is clarified. Therefore, there is an advantage that it is easy to recognize one display target image from the images of the two display units.

In the aspect of the invention, in the display device, it is preferable that the display-state control unit changes a display size of the index displayed on the first display unit and the second display unit.

According to the aspect of the invention, it is possible to increase visibility of the index according to necessity and appropriately display the index not to hinder visual recognition of the display target image.

In the aspect of the invention, in the display device, it is preferable that the display-state control unit reduces a display size of the index as time elapses and, when the display target image changes, expands the display size of the index.

According to the aspect of the invention, it is possible to display the index large and increase the visibility when the index is necessary and reduce the index when necessity of the index decreases and display the index not to hinder visual recognition of images. Consequently, it is possible to appropriately display the index and attain improvement of convenience.

In the aspect of the invention, in the display device, it is preferable that the first display unit and the second display unit respectively include light sources, light scanning units configured to two-dimensionally scan lights from the light sources, and reflecting units configured to reflect the lights two-dimensionally scanned by the light scanning units to the user, and the display-state control unit causes the image processing unit to output the first image and the second image corresponding to amplitudes of the scanning of the lights by the light scanning units of the first display unit and the second display unit to the first and second display units. According to the aspect of the invention, when the first display unit and the second display unit have a configuration for scanning lights and causing the user to visually recognize images, it is possible to control display such that the first image and the second image are satisfactorily visually recognized in the configuration. Consequently, it is possible to satisfactorily visually recognize the display target image in a display device of a scanning type.

In the aspect of the invention, in the display device, it is preferable that the first display unit and the second display unit display the first image and the second image at timings different from each other.

According to the aspect of the invention, by setting the different timings for displaying images, it is possible to distribute timings for transferring the image and suppress a transfer amount of the images per unit time.

Another aspect of the invention is directed to a display device including: a first display unit configured to display an image corresponding to the left eye of a user; a second display unit configured to display an image corresponding to the right eye of the user; an image processing unit configured to divide a display target image and output a first image and a second image including divided images to the first and second display units; a visual-line detecting unit configured to detect a visual line direction of the user; and a display-state control unit configured to control, according to the visual line direction of the user detected by the visual-line detecting unit, display modes of the first image displayed by the first display unit and the second image displayed by the second display unit.

According to the aspect of the invention, the first display unit and the second display unit display the first and second images. Therefore, processing such as an increase in resolution and expansion of the display target image is not involved or a load of processing can be suppressed. Further, transfer speed for transferring images to the display units can be suppressed. Therefore, it is possible to suppress a load related to display of images and cause the user to visually recognize a target image. Further, it is possible to adjust display positions of image regions according to the visual line direction of the user and satisfactorily keep visibility of the display target image.

Still another aspect of the invention is directed to a control method for a display device including first and second display units. The control method includes: dividing a display target image; displaying a first image and a second image corresponding to divided images on the first and second display units; and setting the first image and the second image as images including image regions configured by the divided images and non-image regions not including the divided images, a state of the non-image region of one of the first image and the second image corresponding to a state of the image region of the other.

According to the aspect of the invention, processing such as an increase in resolution and expansion of the display target image is not involved or a load of processing can be suppressed. Further, transfer speed for transferring images to the display units can be suppressed. If processing for generating the non-image regions and the non-image regions are simplified, a load can be easily suppressed. Therefore, it is possible to suppress a load related to display of images and cause the user to visually recognize a target image.

Yet another aspect of the invention is directed to a program executable by a computer that controls a display device including first and second display units. The program causes the computer to function as an image processing unit configured to divide a display target image and output a first image and a second image including divided images to the first and second display units. The first image and the second image include image regions configured by the images divided by the image processing unit and non-image regions not including the divided images. A state of the non-image region of one of the first image and the second image corresponds to a state of the image region of the other.

According to the aspect of the invention, processing such as an increase in resolution and expansion of the display target image is not involved or a load of processing can be suppressed. Further, transfer speed for transferring images to the display units can be suppressed. If processing for generating the non-image regions and the non-image regions are simplified, a load can be easily suppressed. Therefore, it is possible to suppress a load related to display of images and cause the user to visually recognize a target image.

BRIEF DESCRIPTION OF DRAWINGS

FIG. 1 is an explanatory diagram showing the external configuration of a head-mounted display device in a first embodiment.

FIG. 2 is a block diagram showing the functional configuration of the head-mounted display device.

FIG. 3 is a flowchart for explaining the operation of the head-mounted display device.

FIGS. 4(A) to 4(G) are explanatory diagrams showing examples of images displayed by the head-mounted display device.

FIGS. 5(A) to 5(E) are explanatory diagrams showing examples of images displayed by the head-mounted display device.

FIGS. 6(A) to 6(E) are explanatory diagrams showing examples of images displayed by the head-mounted display device.

FIGS. 7(A) to 7(D) are explanatory diagrams showing examples of images displayed by the head-mounted display device.

FIGS. 8(A) to 8(D) are explanatory diagrams showing examples of images displayed by the head-mounted display device.

FIGS. 9(A) to 9(D) are explanatory diagrams showing examples of images displayed by the head-mounted display device.

FIG. 10 is a flowchart for explaining the operation of the head-mounted display device.

FIGS. 11(A) to 11(F) are explanatory diagrams showing examples of images displayed by the head-mounted display device.

FIG. 12 is a flowchart for explaining the operation of the head-mounted display device.

FIGS. 13(A) to 13(C) are explanatory diagrams showing examples of images displayed by the head-mounted display device.

FIGS. 14(A) to 14(D) are explanatory diagrams of operation of rendering of the head-mounted display device.

FIG. 15 is a block diagram showing the functional configuration of a head-mounted display device in a second embodiment.

FIGS. 16(A) and 16(B) are diagrams showing the main part configuration of an image display unit.

FIG. 17 is a flowchart for explaining the operation of the head-mounted display device.

FIGS. 18(A) to 18(G) are explanatory diagrams showing correspondence between an image displayed by the head-mounted display device and a visual line and examples of images displayed by the head-mounted display device.

FIG. 19 is a flowchart for explaining the operation of the head-mounted display device.

FIG. 20 is a block diagram showing the functional configuration of a head-mounted display device in a third embodiment.

FIGS. 21(A) to 21(D) are explanatory diagrams of a display system of the head-mounted display device.

FIGS. 22(A) to 22(E) are explanatory diagrams showing examples of images displayed by the head-mounted display device and display operation of the head-mounted display device.

FIGS. 23(A) to 23(C) are explanatory diagrams showing examples of images displayed by the head-mounted display device and display operation of the head-mounted display device.

FIG. 24 is a flowchart for explaining the operation of the head-mounted display device.

DESCRIPTION OF EMBODIMENTS

First Embodiment

A first embodiment applied with the invention is explained below with reference to the drawings.

FIG. 1 is an explanatory diagram showing the external configuration of a head-mounted display device 100. The head-mounted display device 100 is a display device mounted on a head and is also called head mounted display (HMD). The head-mounted display device 100 in this embodiment is a head-mounted display device of an optical transmission type with which a user can visually recognize a virtual image and, at the same time, directly visually recognize an outside scene. Note that, in this specification, the virtual image visually recognized by the user with the head-mounted display device 100 is also referred to as "display image" for convenience. Emitting image light generated on the basis of image data is also referred to as "display an image".

The head-mounted display device 100 includes an image display unit 20 (a display unit) that causes the user to visually recognize the virtual image in a state in which the image display unit 20 is worn on the head of the user and a control device (a controller) 10 that controls the image display unit 20.

The image display unit 20 is a wearing body worn on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, a camera 61, and a microphone 63. The right optical-image display unit 26 and the left optical-image display unit 28 are respectively disposed to be located in front of the right and left eyes of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end portion ER, which is the other end of the right optical-image display unit 26, to a position corresponding to the temporal region of the user when the user wears the image display unit 20. Similarly, the left holding unit 23 is a member provided to extend from an end portion EL, which is the other end of the left optical-image display unit 28, to a position corresponding to the temporal region of the user when the user wears the image display unit 20. The right holding unit 21 and the left holding unit 23 hold the image display unit 20 on the head of the user like temples of eyeglasses.

The right display driving unit 22 and the left display driving unit 24 are disposed on sides opposed to the head of the user when the user wears the image display unit 20. Note that, in the following explanation, the right holding unit 21 and the left holding unit 23 are also collectively simply referred to as "holding units". The right display driving unit 22 and the left display driving unit 24 are also collectively simply referred to as "display driving units". The right optical-image display unit 26 and the left optical-image display unit 28 are also collectively simply referred to as "optical-image display units".

The display driving units 22 and 24 include liquid crystal displays 241 and 242 (hereinafter referred to as "LCDs 241 and 242") and projection optical systems 251 and 252 (see FIG. 2). Details of the configuration of the display driving units 22 and 24 are explained below. The optical-image display units 26 and 28 functioning as optical members include light guide plates 261 and 262 (see FIG. 2). Dimming plates (not shown in the figure) may be provided on the front surface sides of the right optical-image display units 26 and 28. The light guide plates 261 and 262 are formed of light transmissive resin or the like and guide image lights output from the display driving units 22 and 24 to the eyes of the user. The dimming plates are thin plate-like optical elements and are disposed to cover the front side of the image display unit 20, which is a side opposite to the side of the eyes of the user. As the dimming plates, various dimming plates can be used such as dimming plates, light transimissivity of which is nearly zero, dimming plates that are almost transparent, dimming plates that attenuate a light amount and transmit light, and dimming plates that attenuate or reflect light having a specific wavelength. By appropriately selecting optical characteristics (light transmittance and the like) of the dimming plates, it is possible to adjust an amount of lights made incident on the right optical-image display unit 26 and the left optical-image display unit 28 from the outside and adjust easiness of visual recognition of virtual images. In this embodiment, diming plates having light transmissivity enough for allowing the user wearing the image display unit 20 to visually recognize a scene on the outside. The dimming plates are useful for protecting the light guide plates 261 and 262 and suppress damage, adhesion of soil, and the like to the right light guide plate 261 and the left light guide plate 262.

The dimming plates may be detachably attachable to the right optical-image display unit 26 and the left-optical image display unit 28. A plurality of kinds of dimming plates may be able to be replaced and mounted. The dimming plates may be omitted.

The camera 61 is disposed at the end portion ER, which is the other end of the right optical-image display unit 26. The camera 61 picks up an image of an outside scene, which is a scene of an outside in a direction on the opposite side of the side of the eyes of the user, and acquires an outside scene image.

An image pickup direction, that is, an angle of view of the camera 61 is a direction in which an image in a front side direction of the image display unit 20 is picked up. In other words, the angle of view of the camera 61 is a direction in which an image of an outside scene of at least a part of a visual field direction of the user in a state in which the image display unit 20 is worn is picked up. The breadth of the angle of view of the camera 61 can be set as appropriate. However, an image pickup range of the camera 61 is preferably a range including an outside world visually recognized by the user through the right optical-image display unit 26 and the left optical-image display unit 28. Further, the image pickup range of the camera 61 is more preferably set such that an image of the entire visual field of the user can be picked up through the dimming plates.

The image display unit 20 further includes a connecting unit 40 for connecting the image display unit 20 to the control device 10. The connecting unit 40 includes a main body cord 48 connected to the control device 10, a right cord 42, a left cord 44, and a coupling member 46. The right cord 42 and the left cord 44 are two cords branching from the main body cord 48. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24.

The coupling member 46 is provided at a branching point of the main body cord 48 and the right cord 42 and the left cord 44 and includes a jack for connecting an earphone plug 30. A right earphone 32 and a left earphone 34 extend from the earphone plug 30. The microphone 63 is connected to the vicinity of the earphone plug 30. Cords from the earphone plug 30 to the microphone 63 are collected as one cord. Cords branch from the microphone 63 and are respectively connected to the right earphone 32 and the left earphone 34.

Note that the right cord 42 and the left cord 44 can also be collected as one cord. Specifically, a lead wire on the inside of the right cord 42 may be drawn into the left holding unit 23 side through the inside of a main body of the image display unit 20. The lead wire and a lead wire inside the left cord 44 may be coated with resin and collected as one cord.

The image display unit 20 and the control device 10 perform transmission of various signals via the connecting unit 40. Connectors (not shown in the figure), which fit with each other, are respectively provided at an end portion on the opposite side of the coupling member 46 in the main body cord 48 and in the control device 10. The control device 10 and the image display unit 20 are connected and disconnected according to fitting and unfitting of the connector of the main body cord 48 and the connector of the control device 10. For example, a metal cable or an optical fiber can be adopted as the right cord 42, the left cord 44, and the main body cord 48.

The control device 10 is a device for controlling the head-mounted display device 100. The control device 10 includes a determination key 11, a lighting unit 12, a display switching key 13, a luminance switching key 15, a direction key 16, a menu key 17, and switches including a power switch 18. The control device 10 includes a track pad 14 touch-operated by the user using a finger.

The determination key 11 detects pressing operation and outputs a signal for determining content of the operation in the control device 10. The lighting unit 12 notifies, with a light emission state thereof, an operation state of the head-mounted display device 100. As the operation state of the head-mounted display device 100, there is, for example, ON/OFF of a power supply. As the lighting unit 12, for example, an LED (Light Emitting Diode) is used. The display switching key 13 detects pressing operation and outputs, for example, a signal for switching a display mode of a content moving image to 3D and 2D.

The track pad 14 detects operation by a finger of the user on an operation surface of the track pad 14 and outputs a signal corresponding to detected content. As the track pad 14, various track pads such as an electrostatic type, a pressure type, and an optical type can be adopted. The luminance switching key 15 detects pressing operation and outputs a signal for increasing or reducing the luminance of the image display unit 20. The direction key 16 detects pressing operation on keys corresponding to the up, down, left, and right directions and outputs a signal corresponding to detected content. The power switch 18 detects slide operation of the switch to switch a power supply state of the head-mounted display device 100.

FIG. 2 is a functional block diagram of the head-mounted display device 100. In FIG. 2, an image supply device OA connected to the head-mounted display device 100 is also shown. The head-mounted display device 100 and the image supply device OA can configure a display system.

As shown in FIG. 2, the control device 10 includes a control unit 140, an operation unit 135, an input-information acquiring unit 110 (a receiving unit), a storing unit 120, a power supply 130, an interface 180, and a transmitting unit (Tx) 51 and a transmitting unit (Tx) 52.

The operation unit 135 detects operation by the user. The operation unit 135 includes the units such as the determination key 11, the display switching key 13, the track pad 14, the luminance switching key 15, the direction key 16, the menu key 17, and the power switch 18 shown in FIG. 1.

The input-information acquiring unit 110 acquires a signal corresponding to an operation input of the user. As the signal corresponding to the operation input, there are, for example, operation inputs to the track pad 14, the direction key 16, and the power switch 18.

The power supply 130 supplies electric power to the units of the head-mounted display device 100. As the power supply 130, for example, a secondary battery can be used.

The storing unit 120 has stored therein various computer programs. The storing unit 120 is configured by a ROM, a RAM, and the like.

The control unit 140 includes a CPU, a ROM, and a RAM and executes programs stored in the ROM or the storing unit 120 to thereby control the units of the head-mounted display device 100. The control unit 140 executes the programs to thereby function as an operating system (OS) 150, which is a basic control system of the head-mounted display device 100. The control unit 140 executes the programs to function as an image processing unit 160, a division control unit 164, a sound processing unit 170, and a display control unit 190. These functions may be a part of the operating system 150 or may be functions of application programs operating on the operating system 150.

The image processing unit 160 acquires an image signal included in content. The image processing unit 160 separates synchronization signals such as a vertical synchronization signal VSync and a horizontal synchronization signal HSync from the acquired image signal. The image processing unit 160 generates a clock signal PCLK using a PLL (Phase Locked Loop) circuit or the like (not shown in the figure) according to cycles of the separated vertical synchronization signal VSync and horizontal synchronization signal HSync. The image processing unit 160 converts an analog image signal, from which the synchronization signals are separated, into a digital image signal using an A/D conversion circuit or the like (not shown in the figure). Thereafter, the image processing unit 160 stores the digital image signal after the conversion in a DRAM in the storing unit 120 frame by frame as image data (in the figure, Data) of a target image. The image data is, for example, RGB data. The DRAM of the storing unit 120 functions as a frame memory or a frame buffer that temporarily stores image data of one frame.

Note that the image processing unit 160 may execute, on the image data, image processing such as resolution conversion processing, various kinds of tone correction processing for adjustment of luminance and chroma, and keystone correction processing according to necessity.

The image processing unit 160 transmits the clock signal PCLK, the vertical synchronization signal VSync, and the horizontal synchronization signal HSync generated by the image processing unit 160 and the image data Data stored in the DRAM in the storing unit 120 respectively via the transmitting units 51 and 52. Note that the image data Data transmitted via the transmitting unit 51 is referred to as "image data for right eye" as well. The image data Data transmitted via the transmitting unit 52 is referred to as "image data for left eye" as well. The transmitting units 51 and 52 function as a transceiver for serial transmission between the control device 10 and the image display unit 20.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of the left LCD 242 by a left LCD control unit 212, ON/OFF of driving of a left backlight 222 by a left backlight control unit 202, and the like. Consequently, the display control unit 190 controls generation and emission of image lights respectively by the right display driving unit 22 and the left display driving unit 24. For example, the display control unit 190 causes both of the right display driving unit 22 and the left display driving unit 24 to generate image lights, causes only one of the right display driving unit 22 and the left display driving unit 24 to generate image lights, or does not cause both of the right display driving unit 22 and the left display driving unit 24 to generate image lights.

The display control unit 190 transmits control signals for the right LCD control unit 211 and the left LCD control unit 212 respectively via the transmitting units 51 and 52. The display control unit 190 respectively transmits control signals for the right backlight control unit 201 and the left backlight control unit 202.

The head-mounted display device 100 causes, with the functions of the image processing unit 160 and the display control unit 190, the image display unit 20 to display an image of content input via the interface 180 or a communication unit 117 explained below. When the input content is a still image or a moving image of 2D (plane), the right display driving unit 22 and the left display driving unit 24 display the same image. The image processing unit 160 transmits the image data stored in the DRAM in the storing unit 120 as image data for right eye from the transmitting unit 51 and transmits the image as image data for left eye from the transmitting unit 52. That is, the image processing unit 160 processes two image data for the right eye and the left eye. When the image data has high resolution or when a frame rate is high, a processing load on the image processing unit 160 is large. When the processing load is excessively large, there are concerns about an increase in a heat value of hardware configuring the control unit 140, an increase in power consumption, occurrence of harmonics that cause unnecessary radiation, and the like. Therefore, heat radiation measures, securing of a sufficient power supply capacity, reinforcement of hardware performance, and the like appropriate for the increase in the processing load are performed. Consequently, an increase in costs and an increase in the size of the device due to complication of the configuration are caused.

The head-mounted display device 100 in this embodiment includes the division control unit 164 (a display-state control unit). The head-mounted display device 100 executes divided display with a function of the division control unit 164. Consequently, the processing load on the image processing unit 160 can be reduced.

The divided display is a method of dividing an image of content and dividedly displaying the image in the right display driving unit 22 and the left display driving unit 24. During execution of the divided display, the division control unit 164 controls a divided state of the image and display positions of divided images. The image processing unit 160 divides and displays the image according to the control. The image processing unit 160 can suppress an increase in a data amount of image data due to duplication according to processing for generating image data for right eye and image data for left eye from the image of content. Therefore, it is possible to reduce the processing load. Details of the divided display are explained below.

The sound processing unit 170 acquires a sound signal included in content, amplifies the acquired sound signal, and supplies the sound signal to a speaker (not shown in the figure) in the right earphone 32 and a speaker (not shown in the figure) in the left earphone 34 connected to the coupling member 46. Note that, for example, when a Dolby (registered trademark) system is adopted, processing for the sound signal is performed. Different sounds, the frequencies or the like of which are varied, are respectively output from the right earphone 32 and the left earphone 34. The sound processing unit 170 acquires sound collected and input by the microphone 63, converts the sound into digital sound data, and performs processing related to the sound. For example, the sound processing unit 170 may perform speaker recognition for extracting characteristics from the acquired sound and modeling the characteristics to separately recognize voices of a plurality of people and specify a speaking person for each of voices.

A three-axis sensor 113, a GPS 115, and the communication unit 117 are connected to the control unit 140. The three-axis sensor 113 is an acceleration sensor having three axes. The control unit 140 is capable of acquiring a detection value of the three-axis sensor 113 and detecting a movement and a direction of the movement of the control device 10.

The GPS 115 includes an antenna (not shown in the figure), receives a GPS (global Positioning System) signal, and calculates a present position of the control device 10. The GPS 115 outputs the present position and present time calculated on the basis of the GPS signal to the control unit 140. The GPS 115 may include a function of acquiring present time on the basis of information included in the GPS signal and causing the control unit 140 of the control device 10 to correct time clocked by the control unit 140.

The communication unit 117 executes radio data communication conforming to a wireless LAN (Wi-Fi (registered trademark)) and a Bluetooth (registered trademark) standard.

The interface 180 is an interface for connecting various image supply devices OA, which are supply sources of contents, to the control device 10. The contents supplied by the image supply devices OA include a still image or a moving image and may include sound. Examples of the image supply devices OA include a personal computer (PC), a cellular phone terminal, and a game terminal. As the interface 180, for example, a USB interface, a micro USB interface, or an interface for a memory card can be used.

The image supply devices OA can also be connected to the control device 10 by radio communication lines. In this case, the image supply device OA executes radio communication with the communication unit 117 and transmits data of content using a radio communication technique such as Miracast (registered trademark).

The image display unit 20 includes the right display driving unit 22, the left display driving unit 24, the right light guide plate 261 functioning as the right optical-image display unit 26, the left light guide plate 262 functioning as the left optical-image display unit 28, the camera 61, a vibration sensor 65, and a nine-axis sensor 66.

The vibration sensor 65 is configured using an acceleration sensor and disposed on the inside of the image display unit 20 as shown in FIG. 1. In the example shown in FIG. 1, the vibration sensor 65 is incorporated in the vicinity of the end portion ER of the right optical-image display unit 26 in the right holding unit 21. When the user performs operation for knocking the end portion ER (knock operation), the vibration sensor 65 detects vibration due to this operation and outputs a detection result to the control unit 140. The control unit 140 detects the knock operation by the user according to a detection result of the vibration sensor 65.

The nine-axis sensor 66 is a motion sensor that detects acceleration (three axes), angular velocity (three axes), and terrestrial magnetism (three axes). Since the nine-axis sensor 66 is provided in the image display unit 20, when the image display unit 20 is worn on the head of the user, the nine-axis sensor 66 detects movement of the head of the user. For example, the control unit 140 can determine the direction of the image display unit 20 from the movement of the head of the user detected by the nine-axis sensor 66 and estimate a visual line direction of the user.

The right display driving unit 22 includes a receiving unit (Rx) 53, the right backlight (BL) control unit 201 and the right backlight (BL) 221 functioning as a light source, the right LCD control unit 211 and the right LCD 241 functioning as a display element, and the right projection optical system 251. The right backlight control unit 201 and the right backlight 221 function as the light source. The right LCD control unit 211 and the right LCD 241 function as the display element. Note that the right backlight control unit 201, the right LCD control unit 211, the right backlight 221, and the right LCD 241 are collectively referred to as "image-light generating unit" as well.

The receiving unit 53 functions as a receiver for serial transmission between the control device 10 and the image display unit 20. The right backlight control unit 201 drives the right backlight 221 on the basis of an input control signal. The right backlight 221 is, for example, a light emitting body such as an LED or an electroluminescence (EL) element. The right LCD control unit 211 drives the right LCD 241 on the basis of the clock signal PCLK, the vertical synchronization signal VSync, the horizontal synchronization signal HSync, and image data for right eye Data1 input via the receiving unit 53. The right LCD 241 is a transmissive liquid crystal panel on which a plurality of pixels are disposed in a matrix shape.

The right projection optical system 251 is configured by a collimate lens that changes image light emitted from the right LCD 241 to light beams in a parallel state. The right light guide plate 261 functioning as the right optical-image display unit 26 guides the image light output from the right projection optical system 251 to the right eye RE of the user while reflecting the image light along a predetermined optical path. Note that the right projection optical system 251 and the right light guide plate 261 are collectively referred to as "light guide unit" as well.

The left display driving unit 24 includes a configuration the same as the configuration of the right display driving unit 22. The left display driving unit 24 includes a receiving unit (Rx) 54, the left backlight (BL) control unit 202 and the left backlight (BL) 222 functioning as a light source, the left LCD control unit 212 and the left LCD 242 functioning as a display element, and the left projection optical system 252. The left backlight control unit 202 and the left backlight 222 function as the light source. The left LCD control unit 212 and the left LCD 242 function as the display element.

Note that the left backlight control unit 202, the left LCD control unit 212, the left backlight 222, and the left LCD 242 are collectively referred to as "image-light generating unit" as well. The left projection optical system 252 is configured by a collimate lens that changes image light emitted from the left LCD 242 to light beams in a parallel state. The left guide plate 262 functioning as the left optical-image display unit 28 guides the image light output from the left projection optical system 252 to the left eye LE of the user while reflecting the image light along a predetermined optical path. Note that the left projection optical system 252 and the left light guide plate 262 are collectively referred to as "light guide unit" as well.

The left display driving unit 24 and the left light guide plate 262 configure a first display unit that displays an image corresponding to the left eye of the user. The right display driving unit 22 and the right light guide plate 261 configure a second display unit that displays an image corresponding to the right eye of the user.

FIG. 3 is a flowchart for explaining the operation of the head-mounted display device 100. In particular, FIG. 3 shows operation related to divided display performed using the function of the division control unit 164.

When content is input by the interface 180 or the communication unit 117 and display of the content is instructed by operation of the operation unit 135, the division control unit 164 controls the image processing unit 160 and the display control unit 190 and starts the divided display (step S11).

It is set in advance whether display of a normal image is executed or the divided display is executed. The division control unit 164 may determine attributes such as an aspect ratio, a display size or display resolution, and a display refresh rate concerning an image of content input from the image supply device OA and determine, according to the determined attributes, whether the divided display is executed. The division control unit 164 may automatically perform the determination in association with the determined attributes or may execute the divided display when the attributes correspond to conditions set by the user.

Further, the division control unit 164 may enable the user to execute input operation for selecting whether the divided display is executed.

The image processing unit 160 acquires an image signal included in content and stores, as image data (in the figure, Data) of a target image, a digital image signal configuring an image of the content in the DRAM in the storing unit 120 frame by frame (step S12).

Subsequently, the division control unit 164 acquires setting concerning division of the image referring to, for example, setting data 123 stored in the storing unit 120 (step S13). The setting data 123 is data set concerning a mode of division of the image data of the content acquired by the image processing unit 160. As the mode of the division of the image data, there are various modes such as a longitudinal (vertical direction) half, a lateral (horizontal direction) half, a lateral line unit, a longitudinal line unit, and a dot unit. An overlapping portion of divided data may be provided. A marker may be added. The mode of the division is explained below with reference to specific examples shown in FIGS. 4(A) to 9(D). Note that examples of the marker include a one-dimensional code such as a barcode, a two-dimensional code such as a QR code (registered trademark), and other machine-recognizable markers. The marker may include information or may not include information.

The division control unit 164 causes the image processing unit 160 to divide the image data stored in the DRAM of the storing unit 120 (step S14). Further, the division control unit 164 causes the image processing unit 160 to generate image data for left eye (a first image) and image data for right eye (a second image) including the image data after the division (step S15).

Thereafter, the image processing unit 160 transmits the image data for right eye to the right display driving unit 22 via the transmitting unit 51, transmits the image data for left eye to the left display driving unit 24 via the transmitting unit 52, and causes the right display driving unit 22 and the left display driving unit 24 to display an image for the right eye and an image for the left eye (step S16).

The control unit 140 discriminates presence or absence of an instruction concerning an end of the display (step S17). When the display is continued (NO in step S17), the control unit 140 returns to step S12. When the display end is instructed by the operation unit 135 (YES in step S17), the control unit 140 ends the processing.

FIGS. 4(A) to 9(D) are diagrams showing specific examples of the divided display.

FIGS. 4(A) to 4(G) are diagrams showing an example in which an image is divided in a predetermined position in a longitudinal direction (the up-down direction, the height direction, and the vertical direction). FIG. 4(A) shows an image (a pre-division image) 350 of content before division. FIG. 4(B) shows an image (a divided image) 351 of one of divided images. FIG. 4(C) shows an image (a divided image) 353 of the other of the divided images. FIG. 4(D) shows an image for left eye 352 based on the divided image 351. FIG. 4(E) shows an image for right eye 354 based on the divided image 353.

In the examples shown in FIGS. 4(A) to 4(G), the image processing unit 160 divides the pre-division image 350 (a display target image) into two in the up-down direction according to control by the division control unit 164. A position for the division is the center in the up-down direction of the pre-division image 350. The pre-division image 350 is equally divided. The sizes of the divided image 351 and the divided image 353 in the longitudinal direction are the same. The sizes of the divided images 351 and 353 in the lateral direction are the same as the size in the lateral direction of the pre-division image 350.

The divided image 351 corresponds to the upper half of the pre-division image 350. Resolution (the number of pixels) in the longitudinal direction of the divided image 351 is a half of the resolution of the pre-division image 350. Therefore, the image processing unit 160 outputs the image for left eye 352 (the first image) on the basis of the divided image 351. The image for left eye 352 is configured by an image region 352A and a pseudo image region 352B. The image region 352A is the divided image 351. The pseudo image region 352B is dummy data added by the image processing unit 160 in order to adjust the resolution in the longitudinal direction of the pseudo image region 352B.

The image processing unit 160 outputs the image for right eye 354 (the second image) on the basis of the divided image 353. The image for right eye 354 is configured by an image region 354A and a pseudo image region 354B. The image region 354A is the divided image 353. The pseudo image region 354B is dummy data added by the image processing unit 160 in order to adjust the resolution in the longitudinal direction.

In this example, the image for left eye 352 is output to the left display driving unit 24 and displayed by the left optical-image display unit 28. The image for right eye 354 is output to the right display driving unit 22 and displayed by the right optical-image display unit 26. For the user, image light of the image for left eye 352 is made incident on the left eye and image light of the image for right eye 354 is made incident on the right eye. Therefore, the left eye sees the image for left eye 352 and the right eye sees the image for right eye 354. It is empirically clarified that the human brain has a function of combining images seen in the left eye and the right eye. The user combines the image for left eye 352 and the image for right eye 354 displayed in this embodiment. Consequently, the user recognizes the combined pre-division image 350.

In particular, the pseudo image region 352B of the image for left eye 352 has a size and the number of pixels the same as the size and the number of pixels of the image region 354A of the image for right eye 354. The pseudo image region 354B of the image for right eye 354 has a size and the number of pixels the same as the size and the number of pixels of the image region 352A of the image for left eye 352. In this way, the pseudo image region 352B corresponds to the image region 354A. The pseudo image region 354B corresponds to the image region 352A. That is, in a position where a part of the pre-division image 350 is seen in one eye of the user, the dummy data is seen in the other eye. Therefore, when images are combined by the function of the brain of the user, the images and the dummy data are superimposed. Therefore, the images are naturally superimposed. The user can reasonably recognize the pre-division image 350.

The divided image 351, which is the upper half of the pre-vision image 350, is the image region 352A, which is the upper half of the image for left eye 352. The divided image 353, which is the lower half of the pre-division image 350, is the image region 354A, which is the lower half of the image for right eye 354. That is, the image regions 352A and 354A are disposed in positions the same as positions occupied by the divided images corresponding thereto in the pre-division image 350. Therefore, the user can more naturally superimpose the images and recognize the pre-division image 350.

A display position of the image for left eye 352 in a displayable region of the left optical-image display unit 28 and a display position of the image for right eye 354 in a displayable region of the right optical-image display unit 26 are desirably set in the same position. Further, a display size of the image for left eye 352 in the displayable region of the left optical-image display unit 28 and a display size of the image for right eye 354 in the displayable region of the right optical-image display unit 26 are more desirably the same size. In this case, the position of the image for left eye 352 seen in the left eye of the user and the position of the image for right eye 354 seen in the right eye coincide with each other. Therefore, there is an advantage that the user can easily combine the visual fields of the left and right eyes and recognize the pre-division image 350. The displayable region refers to a region where the right optical-image display unit 26 and the left optical-image display unit 28 can display images.

According to the examination by the inventors, the influence of the display size of the image for left eye 352 and the image for right eye 354 on visibility of the user has been clarified as explained below.

When the display size is large, the image regions 352A and 354A are seen. Further, the pseudo image regions 352B and 354B are clearly visually recognized. Therefore, since the pseudo image regions 352B and 354B are conspicuous, the image regions 352A and 354A tend to be seen blurred. It has been found that the image for left eye 352 and the image for right eye 354 are more clearly seen as the display size is larger. This is considered to be because a light amount of the image for left eye 352 and the image for right eye 354 is large.

On the other hand, when the display size is small, the pseudo image regions 352B and 354B are less conspicuous. The image regions 352A and 354A tend to be clearly seen. The pre-division image 350 was able to be visually recognized in a state in which the image regions 352A and 354A had a small shift and were correctly superimposed. However, a recognized image was darker as the display size was smaller.

Therefore, the display size of the image for left eye 352 and the image for right eye 354 is desirably smaller. For example, the display size is desirably half sizes or less in both of the longitudinal direction and the lateral direction with respect to the displayable regions of the right optical-image display unit 26 and the left optical-image display unit 28.

In this embodiment, the image data processed by the image processing unit 160 is the pre-division image 350 and the dummy data configuring the pseudo image regions 352B and 354B. The pseudo image regions 352B and 354B are, for example, data of (R, G, B)=(0, 0, 0) indicating black. The pseudo image regions 352B and 354B may be data indicating all while (in the case of RGB 24 bit data, (255, 255, 255)). Image data configured by continuous pixels of black and white can be easily generated and compressed. Therefore, in this embodiment, compared with when the pre-division image 350 is output to each of the transmitting units 51 and 52, it is possible to reduce or compress a substantial data amount processed by the image processing unit 160. It is possible to reduce a processing load on the image processing unit 160.

As explained above, the image display unit 20 is the transmissive display device. Image lights are made incident on the eyes of the user by the right optical-image display unit 26 and the left optical-image display unit 28 that transmit external light. When the pseudo image regions 352B and 354B are colored in black, image light is absent in portions corresponding to the pseudo image regions 352B and 354B.

Therefore, image light of the divided image 351 and image light of the divided image 353 are made incident on the eyes of the user. On the other hand, image lights of the dummy data are not made incident on the eyes. Therefore, a light amount of the image lights made incident on the eyes of the user is substantially equal to a light amount for one screen of the pre-division image 350. Therefore, the user can easily recognize the pre-division image 350.

Note that, in the example explained above, compared with when the pre-division image 350 is displayed by both of the right optical-image display unit 26 and the left optical-image display unit 28, the light amount of the image lights is approximately a half and the pre-division image 350 is seen dark. As measures against this problem, when the image processing unit 160 performs the divided display according to the control by the division control unit 164, compared with when normal display is performed, the light amount of the image lights emitted by the right optical-image display unit 26 and the left optical-image display unit 28 may be increased. Specifically, there are a method of increasing light amounts of the right backlight 221 and the left backlight 222 and a method of performing luminance expansion processing with the image processing unit 160 to increase the luminance of the image for left eye 352 and the image for right eye 354. Alternatively, when the right display driving unit 22 and the left display driving unit 24 include diaphragm mechanisms (extinction mechanisms) for narrowing image lights, the image lights may be increased by a function of the diaphragm mechanisms.

On the other hand, when the pseudo image regions 352B and 354B are colored in white, image lights of pixels having maximum luminance are irradiated on the portions corresponding to the pseudo image regions 352B and 354B. The image light of the divided image 351 and the image light of the divided image 353 are made incident on the eyes of the user. Further, image lights of while corresponding to dummy data are also made incident on the eyes. In this case, since a color of the dummy data is an achromatic color, a light amount of the image lights made incident on the eyes of the user does not hinder the user from combining the divided images 351 and 353 and recognizing the pre-division image 350. Further, when the image lights of the pseudo image regions 352B and 354B are made incident on the eyes of the user, there is an advantage that, with the image lights, the eyes are less easily affected by the external light. That is, since the image lights are made incident on the eyes, an outside scene is less easily seen in display positions of the pseudo image regions 352B and 354B. Therefore, for example, when the external light is intense, it can be expected that visibility of the pre-division image 350 is improved.

A position where the pre-division image 350 is divided, pixel values of the dummy data configuring the pseudo image regions 352B and 354B, and the like are set in advance in the head-mounted display device 100. Setting content is stored as the setting data 123.

Note that, in FIGS. 4(B) to 4(E), an example is shown in which the pre-division image 350 is divided in the center in the longitudinal direction, the image for left eye 352 corresponding to the left eye is output on the basis of an image in the upper half, and the image for right eye 354 corresponding to the lower half and the right eye is output. The position where the pre-division image 350 is divided is not limited to the center of the pre-division image 350 and may be any position. In this case, the pseudo image regions 352B and 354B only have to correspond to a difference between the number of pixels of the image regions 352A and 354A and the number of pixels of the pre-division image 350. That is, if the pseudo image region 352B corresponds to the image region 354A and the pseudo image region 354B corresponds to the image region 352A, effects the same as the effects in the example explained with reference to FIGS. 4(B) to 4(E) can be obtained.

The image processing unit 160 may actually generate image data corresponding to the divided images 351 and 353 and store the image data in the storing unit 120 or may realize division of an image in data processing performed when image data is read out from the storing unit 120 and output to the transmitting units 51 and 52.

For example, the image processing unit 160 reads out the pre-division image 350 from the DRAM of the storing unit 120, writes out the upper half onto the DRAM as the divided image 351, and writes out the lower half onto the DRAM as the divided image 353. Subsequently, the image processing unit 160 adds the dummy data configuring the pseudo image region 352B to the divided image 351 on the DRAM and generates the image for left eye 352. Similarly, the image processing unit 160 adds the dummy data to the divided image 353 on the DRAM and generates the image for right eye 354. In this case, the image data of the image for left eye 352 and the image for right eye 354 are stored on the DRAM. The image processing unit 160 reads out the image for left eye 352 and the image for right eye 354 from the DRAM and outputs the image for left eye 352 and the image for right eye 354 with the transmitting units 51 and 52.

For example, the image processing unit 160 may be configured to perform the division of the image and the addition of the dummy data when outputting the image data from the transmitting units 51 and 52 on the basis of the pre-division image 350 on the DRAM. In this case, the image processing unit 160 reads out, with a predetermined byte or a predetermined number of lines set as a unit, data from an upper end position of the pre-division image 350 and outputs the data to the transmitting unit 52. After reading out data of the upper half of the pre-division image 350, the image processing unit 160 outputs the dummy data to the transmitting unit 52. The image processing unit 160 outputs an amount of the dummy data corresponding to the number of lines of the pseudo image region 352B to the transmitting unit 52. Data output to the transmitting unit 51 by the image processing unit 160 in this processing is the same as the data of the image for left eye 352 shown in FIG. 4(D).

The image processing unit 160 outputs an amount of the dummy data corresponding to the pseudo image region 354B to the transmitting unit 51. After the output of the dummy data, the image processing unit 160 reads out data of the lower half from a center position of the pre-division image 350 and outputs the data to the transmitting unit 51. Data output to the transmitting unit 51 by the image processing unit 160 in this processing is the same as the data of the image for right eye 354 shown in FIG. 4(E).

In this way, even if the image data of the image for left eye 352 and the image for right eye 354 are not actually stored on the DRAM, it is possible to realize operation for dividing the pre-division image 350 and outputting the image for left eye 352 and the image for right eye 354 on the basis of the divided images 351 and 353.

Further, when the image processing unit 160 includes a processor that processes, in parallel, the data output to the transmitting unit 51 and the data output to the transmitting unit 52 and outputs the data, the image processing unit 160 can execute, in parallel, the processing related to the upper half of the pre-division image 350 and the processing related to the lower half of the pre-division image 350. In this case, data read out from the DRAM in the respective kinds of processing are different data. Therefore, processing for the same address on the DRAM does not collide or compete. Necessity of processing for competition adjustment is low. Therefore, compared with when the entire pre-division image 350 is output to each of the transmitting unit 51 and the transmitting unit 52, it is possible to reduce a load of processing of the entire control unit 140.

The division control unit 164 may control the image processing unit 160 to execute processing for shifting display timings of the images of the right display driving unit 22 and the left display driving unit 24. Specifically, the division control unit 164 adjusts timing for outputting the image for left eye 352 and the image for right eye 354 from the transmitting units 51 and 52, the vertical synchronization signal VSync and the horizontal synchronization signal HSync, or the like.

In this case, it is possible to suppress an image data amount per unit time output by the image processing unit 160 and further reduce the load of the processing. Timings when the left optical-image display unit 28 and the right optical-image display unit 26 display images are different. However, when a frame frequency of the displayed images is not excessively low (e.g., several frames to several ten frames/second), afterimages perceived by the user are superimposed. Therefore, the user can superimpose a display image of the right optical-image display unit 26 and a display image of the left optical-image display unit 28 and recognize the pre-division image 350.

Further, in the examples shown in FIGS. 4(A) to 4(E), the upper half of the pre-division image 350 is set as the image for left eye 352 corresponding to the left eye of the user and the lower half of the pre-division image 350 is set as the image for right eye 354 corresponding to the right eye of the user. However, this is only an example. The image for left eye 352 may be an image including the lower half of the pre-division image 350. In this case, the image for right eye 354 only has to be an image including the upper half of the pre-division image 350. That is, the image for left eye 352 and the image for right eye 354 only have to be images in which a relation that the pseudo image region of one of the image for left eye 352 and the image for right eye 354 corresponds to the image region of the other holds and, when the image regions 352A and 354A are combined, the entire pre-division image 350 is visually recognized.

FIG. 4(F) shows an image for left eye 355 added with a superimposing position mark M inside the image. FIG. 4(G) shows an image for right eye 356 corresponding to the image for the left eye 355.

Both of the image for left eye 355 and the image for right eye 356 include the superimposing position mark M (an index). In an example shown in FIGS. 4(F) and 4(G), the superimposing position mark M is disposed in the centers of the images. However, the position of the superimposing position mark M in the image for left eye 355 and the position of the superimposing position mark M in the image for right eye 356 are the same. That is, in the image for left eye 355 and the image for right eye 356, display sizes of display in the right optical-image display unit 26 and the left optical-image display unit 28 are set to the same size. The image for left eye 355 and the image for right eye 356 include the superimposing position mark M in a common position. In this case, the superimposing position mark M is seen in both of the right eye and the left eye of the user. Therefore, the superimposing position mark M functions as a yardstick or a reference of alignment in combining the image regions of the image for left eye 355 and the image for right eye 356. Therefore, the user can reasonably combine, with reference to the superimposing position mark M, images seen in the left and right eyes and recognize the pre-division image 350 before being divided.

The division control unit 164 sets display positions of the superimposing position mark M in the image for left eye 355 and the image for right eye 356 and a display size of the superimposing position mark M and causes the image processing unit 160 to display the superimposing position mark M. The division control unit 164 reads out an image of the superimposing position mark M stored in advance in the storing unit 120 and causes the image processing unit 160 to display the superimposing position mark M in a designated position and a designated size.

In FIGS. 4(F) and 4(G), an example is shown in which one superimposing position mark M is disposed in each of the image for left eye 355 and the image for right eye 356. However, the number, the shape, and the like of indexes (superimposing position marks) are optional. For example, as the shape of the superimposing position mark, various shapes such as other figures, characters, and images can be used. A display color, luminance, and the like are also optional. The user only has to be able to visually identify the superimposing position mark M disposed in the image for left eye 355 and the image for right eye 356. For example, an icon or the like shown to the user on a menu screen concerning operation of the head-mounted display device 100 may be used as the superimposing position mark. A superimposing position mark having a frame shape may be used. A superimposing position mark including a plurality of figures or images may be displayed. The position of the superimposing position mark only has to be in a position common to the image for left eye 355 and the image for right eye 356 and is not limited to the centers of the image for left eye 355 and the image for right eye 356.

For example, the image processing unit 160 may enable, according to the control by the division control unit 164, adjustment of a display color and the luminance of the superimposing position mark and determine the display color and the luminance of the superimposing position mark according to a color of the image for left eye 355 and the image for right eye 356. When the superimposing position mark is configured by a plurality of figures or the like, display modes of the plurality of figures or the like may be varied.

FIGS. 5(A) to 5(E) are diagrams showing, as another example of the processing for dividing an image, an example in which the image is divided in a predetermined position in the lateral direction (the horizontal direction). FIG. 5(A) shows the pre-division image 350. FIG. 5(B) shows a divided image 357. FIG. 5(C) shows a divided image 359. FIG. 5(D) shows an image for left eye 358 based on the divided image 357. FIG. 5(E) shows an image for right eye 360 based on the divided image 359.

The divided images 357 and 359 are images obtained by dividing the pre-division image 350 in a position set in advance in the lateral direction. The pre-division image 350 is equally divided into two in the center position in the lateral direction. Sizes in the lateral direction of the divided image 357 and the divided image 359 are the same. The size in the longitudinal direction of the divided images 357 and 359 is the same as the size of the pre-division image 350.

The image processing unit 160 generates the image for left eye 358 and the image for right eye 360 on the basis of the divided images 357 and 359 and outputs the image for left eye 358 and the image for right eye 360 to the transmitting units 51 and 52.

The left half of the image for left eye 358 is an image region 358A including the divided image 357. The right half of the image for left eye 358 is a pseudo image region 358B. Like the pseudo image regions 352B and 354B, the pseudo image region 358B is formed by dummy data added by the image processing unit 160. The position and the size of the image region 358A in the image for left eye 358 are the same as the position and the size of the divided image 357 in the pre-division image 350.

The right half of the image for right eye 360 is an image region 360A including the divided image 359. The left half of the image for right eye 360 is a pseudo image region 360B. Like the pseudo image regions 352B and 354B, the pseudo image region 360B is formed by dummy data added by the image processing unit 160. The position and the size of the image region 360A in the image for right eye 360 are the same as the position and the size of the divided image 359 in the pre-division image 350.

In the example shown in FIGS. 5(A) to 5(E), effects the same as the effects in the example explained with reference to FIGS. 4(A) to 4(G) can be obtained.

That is, when the left optical-image display unit 28 and the right optical-image display unit 26 respectively display the image for left eye 358 and the image for right eye 360, the user recognizes the pre-division image 350. By dividing the pre-division image 350, compared with when the image processing unit 160 outputs the entire pre-division image 350 to each of the transmitting unit 51 and the transmitting unit 52, it is possible to reduced a load of processing on the entire control unit 140.

The pseudo image region 358B of the image for left eye 358 has a size and the number of pixels the same as the size and the number of pixels of the image region 360A of the image for right eye 360. The pseudo image region 360B has a size and the number of pixels the same as the size and the number of pixels of the image region 358A. Therefore, when images are combined by the function of the brain of the user, the images and the dummy data are superimposed. Therefore, the images are naturally superimposed. The user can reasonably recognize the pre-division image 350.

The divided image 357, which is the left half of the pre-vision image 350, is the image region 358A, which is the left half of the image for left eye 358. The divided image 359, which is the right half of the pre-division image 350, is the image region 360A, which is the right half of the image for right eye 360. Therefore, the user can more naturally superimpose the images and recognize the pre-division image 350. A display position of the image for left eye 358 in the displayable region of the left optical-image display unit 28 and a display position of the image for right eye 360 in the displayable region of the right optical-image display unit 26 are desirably set in the same position. Further, a display size of the image for left eye 358 in the displayable region of the left optical-image display unit 28 and a display size of the image for right eye 360 in the displayable region of the right optical-image display unit 26 are more desirably the same size. In this case, there is an advantage that the user can easily combine the visual fields of the left and right eyes and recognize the pre-division image 350.

In the examples shown in FIGS. 4(A) to 4(G) and FIGS. 5(A) to 5(E), an example is explained in which the pre-division image 350 is divided without overlap. However, an overlapping portion may be present. An example of the overlapping portion is shown in FIGS. 6(A) to 6(E).

Like FIGS. 5(A) to 5(E), FIGS. 6(A) to 6(E) are diagrams showing an example in which an image is divided in a predetermined position in the lateral direction (the horizontal direction). FIG. 6(A) shows the pre-division image 350. FIG. 6(B) shows a divided image 361. FIG. 6(C) shows a divided image 363. FIG. 6(D) shows an image for left eye 362 based on the divided image 361. FIG. 6(E) shows an image for right eye 364 based on the divided image 363. Alternate long and short dash lines in FIGS. 6(A) to 6(E) indicate the center position in the lateral direction of the pre-division image 350.

The divided image 361 is an image obtained by extracting the left half of the pre-division image 350 and a portion further on the right side than the width direction center of the pre-division image 350. The divided image 363 is an image obtained by extracting the right half of the pre-division image 350 and a portion further on the left side than the width direction center of the pre-division image 350. The image for left eye 362 includes an image region 362A configured by the divided image 361 and a pseudo image region 362B formed by dummy data added to the right side of the image region 362A. Each of the image for left eye 362 and the image for right eye 364 has a size and the number of pixels the same as the size and the number of pixels of the pre-division image 350.

The image processing unit 160 generates the image for left eye 362 and the image for right eye 364 on the basis of the divided images 361 and 363 and outputs the image for left eye 362 and the image for right eye 364 to the transmitting units 51 and 52.

The left half of the image for left eye 358 is an image region 358A including the divided image 357. The right half of the image for left eye 358 is the pseudo image region 358B. Like the pseudo image regions 352B and 354B, the pseudo image region 358B is formed by dummy data added by the image processing unit 160. The position and the size of the image region 358A in the image for left eye 358 are the same as the position and the size of the divided image 357 in the pre-division image 350.

The right half of the image for right eye 360 is an image region 360A including the divided image 359. The left half of the image for right eye 360 is the pseudo image region 360B. Like the pseudo image regions 352B and 354B, the pseudo image region 360B is formed by dummy data added by the image processing unit 160. The position and the size of the image region 360A in the image for right eye 360 are the same as the position and the size of the divided image 359 in the pre-division image 350.

When the image for left eye 362 is displayed by the left optical-image display unit 28 and the image for right eye 364 is displayed by the right optical-image display unit 26, effects the same as the effects of the image for left eye 358 and the image for right eye 360 shown in FIGS. 5(D) and 5(E) can be obtained.

Unlike the image for left eye 358, the image for left eye 362 includes a portion further on the right side than the center of the pre-division image 350. Similarly, unlike the image for right eye 360, the image for right eye 364 includes a portion further on the left side than the center of the pre-division image 350. That is, the image region 362A and the image region 364A have an overlapping portion.

The image for left eye 362 and the image for right eye 364 are seen in the eyes of the user. The image for left eye 362 and the image for right eye 364 have the center of the pre-division image 350 and the vicinity of the center in common. Therefore, this common portion is seen overlapping in both the eyes of the user. In this case, the user recognizes the portion seen overlapping in both the eyes as an index for superimposing images. Therefore, the user can easily recognize the pre-division image 350 from the image for left eye 362 and the image for right eye 364.

When a display color of the pseudo image regions 362B and 364B is a dark color compared with the image regions 362A and 364A, an overlapping region where the image regions 362A and 364A overlap is bright compared with the image regions 362A and 364A other than the overlapping region. In order to prevent this kind of a sense of discomfort, the luminance of the overlapping region may be reduced. Specifically, the image processing unit 160 may apply processing for reducing a pixel value or the luminance of the overlapping region to the image for left eye 362 and the image for right eye 364 and output data after the processing from the transmitting units 51 and 52.

When the display color of the pseudo image regions 362B and 364B is a bright color compared with the image regions 362A and 364A or when the luminance of the pseudo image regions 362B and 364B is equal to the luminance of the image regions 362A and 364A, the brightness of the overlapping region of the image regions 362A and 364A is likely to be equal to the brightness of a region other than the overlapping region. In this case, the likelihood of occurrence of the sense of discomfort is small. Therefore, the image processing unit 160 may determine a set color of the pseudo image regions 362B and 364B and discriminate, according to the color, presence or absence of necessity of adjusting the luminance of the overlapping region. When discriminating that the adjustment is necessary, as explained above, the image processing unit 160 may perform the processing for adjusting the luminance of the image data in the overlapping region and output the image data to the right display driving unit 22 and the left display driving unit 24.

The size of the common portion (the overlapping portion) of the image for left eye 362 and the image for right eye 364 is not limited to the example shown in FIGS. 6(A) to 6(E). When the overlapping portion is large, for the user, an index in combining images seen in the left and right eyes is clear. Therefore, the overlapping portion is effective. However, even if the overlapping portion is small, the effect of the index is sufficient.

As the overlapping portion is larger, an image processed by the image processing unit 160 is closer to a size of two pre-division images 350. That is, the effect of dividing the pre-division image 350 and generating the image for left eye and the image for right eye decreases. Therefore, the overlapping portion desirably has a size enough for enabling the user to obtain the effect of the index for overlapping images and is smaller.

It is also possible to divide the pre-division image 350 into a large number of regions to generate the image for left eye and the image for right eye.

FIGS. 7(A) to 7(D) are diagrams showing an example in which the pre-division image 350 is divided in a plurality of positions in the longitudinal direction. FIG. 7(A) shows a divided image 371 configured by a plurality of divided image pieces 371A. FIG. 7(B) shows a divided image 373 configured by a plurality of divided image pieces 373A. FIG. 7(C) shows the image for left eye 372 based on the divided image 371. FIG. 7(D) shows the image for right eye 374 based on the divided image 373.

In this example, the pre-division image 350 is divided in a line unit in the lateral direction into a plurality of divided image pieces 371A and 373A elongated in the lateral direction. The divided image pieces 371A and 373A may be, for example, images for one line or may be images for a plurality of lines. The image processing unit 160 divides the images divided in the line unit into the divided image pieces 371A for the left eye and the divided image pieces 373A for the right eye. For example, the image processing unit 160 allocates the divided image to the divided image pieces 371A and the divided image pieces 373A in order from the top in the pre-division image 350. According to this processing, the image processing unit 160 obtains the divided image 371, which is a set of the divided image pieces 371A for the left eye, and the divided image 373, which is a set of the divided image pieces 373A for the right eye.

The image processing unit 160 sets the divided image 371 as image regions 372A, adds pseudo image regions 372B formed by dummy data to blank parts among the image regions 372A, and obtains the image for left eye 372. Similarly, the image processing unit 160 sets the divided image 373 as image regions 374A, adds pseudo image regions 374B formed by dummy data to blank parts among the image regions 374A, and obtains the image for right eye 374. The size of the image for left eye 372 and the image for right eye 374 is the same as the size of the pre-division image 350.

The pseudo image region 372B of the image for left eye 372 is configured by the image pieces as many as the image pieces of the image region 374A of the image for right eye 374. The image pieces have the same size and the same number of pixels. The pseudo image region 374B is configured by the image pieces as many as the image pieces of the image region 372A. The image pieces have the same size and the same number of pixels.

The image processing unit 160 outputs the image for left eye 372 from the transmitting unit 52 and causes the left display driving unit 24 and the left optical-image display unit 28 to display the image for left eye 372. The image processing unit 160 outputs the image for right eye 374 from the transmitting unit 51 and causes the right display driving unit 22 and the right optical-image display unit 26 to display the image for right eye 374. Consequently, effects the same as the effects in the examples explained with reference to FIGS. 4(A) to 6(E) can be obtained.

That is, the user recognizes the pre-division image 350 obtained by superimposing the image for left eye 372 and the image for right eye 374. By dividing the pre-division image 350, compared with when the image processing unit 160 outputs the entire pre-division image 350 to each of the transmitting unit 51 and the transmitting unit 52, it is possible to reduce a load of processing on the entire control unit 140.

The pseudo image region 372B corresponds to the image region 374A. The pseudo image region 372B corresponds to the image region 374A. Therefore, when images are combined by the function of the brain of the user, the images and the dummy data are superimposed. Therefore, the images are naturally superimposed. The user can reasonably recognize the pre-division image 350.

Further, since the pre-division image 350 is divided in a line unit in the lateral direction, in the divided images 371 and 373, the number of divided image pieces 371A and 373A can be increased. In this case, both of the divided images 371 and 373 include the pre-division image 350 from the top to the bottom. Therefore, even only one of the image for left eye 372 and the image for right eye 374 causes the user to recognize an image similar to the pre-division image 350. The user can visually recognize the image similar to the pre-division image 350 with both the eyes. Therefore, it is possible to reduce a sense of discomfort of the user.

As shown in FIGS. 8(A) to 8(D), an image may be divided in a line unit in the longitudinal direction.

FIG. 8(A) shows a divided image 375 configured by a plurality of divided image pieces 375A. FIG. 8(B) shows a divided image 377 configured by a plurality of divided image pieces 377A. FIG. 8(C) shows an image for left eye 376 based on the divided image 375. FIG. 8(D) shows an image for right eye 378 based on the divided image 377.

In this example, the pre-division image 350 is divided in a line unit in the longitudinal direction into a plurality of image pieces 375A and 377A elongated in the longitudinal direction. The divided image pieces 375A and 377A may be, for example, images for one line or may be images for a plurality of lines. The image processing unit 160 divides the images divided in the line unit into the divided image pieces 375A for the left eye and the divided image pieces 377A for the right eye. For example, the image processing unit 160 allocates the divided images to the divided image pieces 375A and the divided image pieces 377A in order from the left in the pre-division image 350. According to this processing, the image processing unit 160 obtains the divided image 375, which is a set of the divided image pieces 375A for the left eye, and the divided image 377, which is a set of the divided image pieces 377A for the right eye.

The image processing unit 160 sets the divided image 375 as image regions 376A, adds pseudo image regions 376B formed by dummy data to blank parts among the image regions 376A, and obtains the image for left eye 376. Similarly, the image processing unit 160 sets the divided image 377 as image regions 378A, adds pseudo image regions 378B formed by dummy data to blank parts among the image regions 378A, and obtains the image for right eye 378. The size of the image for left eye 376 and the image for right eye 378 is the same as the size of the pre-division image 350. The pseudo image region 376B of the image for left eye 376 is configured by the image pieces as many as the image pieces of the image region 378A of the image for right eye 378. The image pieces have the same size and the same number of pixels. The pseudo image region 378B is configured by the image pieces as many as the image pieces of the image region 376A. The image pieces have the same size and the same number of pixels.

The image processing unit 160 outputs the image for left eye 376 from the transmitting unit 52 and causes the left display driving unit 24 and the left optical-image display unit 28 to display the image for left eye 376. The image processing unit 160 outputs the image for right eye 378 from the transmitting unit 51 and causes the right display driving unit 22 and the right optical-image display unit 26 to display the image for right eye 378. In this case, only a direction in which the pre-division image 350 is divided is different. Effects the same as the effects in the example explained with reference to FIGS. 7(A) to 7(D) can be obtained.

FIGS. 9(A) to 9(D) show an example in which the pre-division image 350 is divided into rectangular image pieces.

FIG. 9(A) shows a divided image 379 configured by a plurality of divided image pieces 379A. FIG. 9(B) shows a divided image 381 configured by a plurality of divided image pieces 381A. FIG. 9(C) shows an image for left eye 380 based on the divided image 379. FIG. 9(D) shows an image for right eye 382 based on the divided image 381.

In this example, the pre-division image 350 is divided into rectangular divided image pieces including pixels of several dots in the longitudinal direction and the lateral direction. The image processing unit 160 divides the divided image pieces into divided image pieces 379A for the left eye and the divided image pieces 381A for the right eye according to the control by the division control unit 164. For example, the image processing unit 160 allocates the divided image pieces to the divided image pieces 379A and the divided image pieces 381A one by one in order from the upper left in the pre-division image 350.

The image processing unit 160 sets the divided image 379 as image regions 380A, adds pseudo image regions 380B formed by dummy data to blank parts among the image regions 380A, and obtains the image for left eye 380. Similarly, the image processing unit 160 sets the divided image 381 as image regions 382A, adds pseudo image regions 382B formed by dummy data to blank parts among the image regions 382A, and obtains the image for right eye 382. The size of the image for left eye 380 and the image for right eye 382 is the same as the size of the pre-division image 350.

The pseudo image region 380B of the image for left eye 380 includes the image pieces as many as the image pieces of the image region 382A of the image for right eye 382. The image pieces have the same size and the same number of pixels. The pseudo image region 382B includes the image pieces as many as the image pieces of the image region 380A. The image pieces have the same size and the same number of pixels.

The image processing unit 160 outputs the image for left eye 380 from the transmitting unit 52 and causes the left display driving unit 24 and the left optical-image display unit 28 to display the image for left eye 380. The image processing unit 160 outputs the image for right eye 382 from the transmitting unit 51 and causes the right display driving unit 22 and the right optical-image display unit 26 to display the image for right eye 382. In this case, only a direction in which the pre-division image 350 is divided is different. Effects the same as the effects in the examples explained with reference to FIGS. 7(A) to 7(D) and FIGS. 8(A) to 8(D) can be obtained.

In this way, the division control unit 164 controls the image processing unit 160 to divide the display target image (the pre-division image 350) in various forms and output the image for left eye and the image for right eye from the transmitting units 51 and 52 on the basis of the divided images. The image processing unit 160 may be capable of executing only a part of the examples shown in FIGS. 4(A) to 9(D) or may be capable of executing all the kinds of processing. The image processing unit 160 may divide the display target image in forms other than the forms illustrated in FIGS. 4(A) to 9(D).

When displaying the superimposing position mark M, the head-mounted display device 100 is also capable of changing a display size of the superimposing position mark M.

FIG. 10 is a flowchart for explaining the operation of the head-mounted display device 100. In particular, FIG. 10 shows operation for changing the size of the superimposing position mark M. FIGS. 11(A) to 11(F) are diagrams showing a change in the display size of the superimposing position mark M. FIGS. 11(A) and 11(B) show a state in which the display size of the superimposing position mark M is large. FIGS. 11(C) and 11(D) show a state in which the display size of the superimposing position mark M is reduced. FIGS. 11(E) and 11(F) show a state in which the superimposing position mark M having a different shape is displayed.

As explained with reference to FIGS. 4(F) and 4(G), the division control unit 164 controls the image processing unit 160 to display the superimposing position mark M in the same position in the image for left eye 355 and the image for right eye 356. Consequently, the superimposing position mark M is seen in both of the right eye and the left eye of the user. The superimposing position mark M functions as a yardstick or a reference of alignment in combining the image regions of the image for left eye 355 and the image for right eye 356.

When the user starts to view an image (including a video), the user is unaccustomed to a way of viewing for recognizing the image for left eye 355 and the image for right eye 356 as one image. Therefore, the superimposing position mark M effectively functions. However, when the user gets used to the way of viewing while continuing to view the image, necessary of the superimposing position mark M as the index for alignment of the image for left eye 355 and the image for right eye 356 decreases.

Therefore, the division control unit 164 may control the image processing unit 160 to change the display size of the superimposing position mark M. For example, the division control unit 164 reads out image data of the superimposing position mark M stored in the storing unit 120 and superimposes the image data on each of the image for left eye 355 and the image for right eye 356 divided by the image processing unit 160. In this case, if a plurality of image data of the superimposing position marks M having different sizes are stored in advance in the storing unit 120, the division control unit 164 can change the display size of the superimposing position mark M by changing the image data of the superimposing position mark M read out from the storing unit 120. The division control unit 164 may acquire the image data of the superimposing position mark M from the storing unit 120, expand or reduce the acquired image data at a predetermined magnification, and cause the image processing unit 160 to superimpose the image data. In this case, the division control unit 164 can change the display size of the superimposing position mark M by changing the magnification for expanding or reducing the superimposing position mark M.

In FIG. 10, an example of operation of the division control unit 164 for changing the display size of the superimposing position mark M is shown.

When display of an image by the image display unit 20 is started (step S21), the division control unit 164 causes the image processing unit 160 to display the superimposing position mark M in a maximum size set in advance (step S22). Thereafter, the division control unit 164 monitors time in which a display state of the superimposing position mark M is continued and determines whether the time has reached time set in advance (step S23). When the time has reached the set time (YES in step S23), the division control unit 164 reduces the display size of the superimposing position mark M and causes the image processing unit 160 to update the display size of the superimposing position mark M (step S24). That is, every time the time for displaying the superimposing position mark M elapses, the superimposing position mark M is reduced.

When the time in which the display of the superimposing position mark M is continued has not reached the set time (NO in step S23) and after the display size of the superimposing position mark M is updated in step S24, the division control unit 164 determines whether the image is switched (step S25). When the image is switched (YES in step S25), the division control unit 164 returns to step S22 and displays the superimposing position mark M in the maximum size.

"The image is switched" means that image data of the image displayed by the image processing unit 160 is switched. Specifically, when an image source of the head-mounted display device 100 is changed or when resolution or a frame rate of image data input from the image supply device OA changes, the division control unit 164 determines that the image is switched. When a boundary between the image region and the pseudo image region in the image for left eye and/or a boundary between the image region and the pseudo image region in the image for right eye is changed, the division control unit 164 may determine that the image is switched. When the display size of the image for left eye in the left optical-image display unit 28 or the display size of the image for right eye in the right optical-image display unit 26 is changed, the division control unit 164 may determine that the image is switched.

When the image is not switched (NO in step S25), the division control unit 164 determines whether the display is ended (step S26). When the display is continued (NO in step S26), the division control unit 164 returns to step S23. When the display is ended (YES in step S26), the division control unit 164 causes the image processing unit 160 to end the display of the divided images and the superimposing position mark M (step S27).

In FIGS. 11(A) and 11(B), an example is shown in which the superimposing position mark M of the maximum size is disposed in the image for left eye 355 and the image for right eye 356. In this example, the large superimposing position mark M is disposed in a boundary between the image region 352A and the pseudo image region 352B in the image for left eye 355 and a boundary between the image region 354A and the pseudo image region 354B in the image for right eye 356.

As shown in FIGS. 11(C) and 11(D), when the superimposing position mark M is reduced, the influence of the superimposing position mark M on visibility of the image region 352A and the image region 354A decreases. The user can easily view the display target pre-division image 350.

As explained above, the shape of the superimposing position mark M is optional. For example, as shown in FIGS. 11(E) and 11(F), the superimposing position mark M may be formed in a belt shape. In this example, the superimposing position mark M overlaps the boundary between the image region 352A and the image region 352B in the image for left eye 355. In an example shown in FIG. 11(F), the superimposing position mark M overlaps the entire boundary between the image region 354A and the pseudo image region 354B in the image for right eye 356. When the user views the images such that the superimposing position marks M on the left and right overlap, the boundary between the image region 352A and the pseudo image region 352B and the boundary between the image region 354A and the pseudo image region 354B are less easily seen. Therefore, the user can view the images on the left and right to be combined using the superimposing position mark M as the index without being aware of the boundaries. For example, as shown in FIGS. 5(D) and 5(E), when the pre-division image 350 is divided in the horizontal direction, the superimposing position mark M having the belt shape extending in the longitudinal direction (the vertical direction) only has to be displayed to match the boundary between the image region and the pseudo image region.

Instead of the superimposing position mark M, an overlapping region (e.g., an overlapping region W1 shown in FIGS. 18D to 18G) where the image regions in the image for right eye and the image for left eye overlap may be set as the index for alignment. In this case, as in the processing for changing the size of the superimposing position mark M, the size of the overlapping region may be changed to be small as time elapses. When the image is switched, the size of the overlapping region may be increased.

A function of the head-mounted display device 100 for performing adjustment (calibration) of display positions of the divided images 351 and 353 is explained.

FIG. 12 is a flowchart for explaining the operation of the head-mounted display device 100. In particular, FIG. 12 shows operation of display position adjustment. FIGS. 13(A) to 13(C) are diagrams showing examples of images displayed by the head-mounted display device 100 in the operation of the display position adjustment. FIG. 13(A) is a combined image 391 schematically showing an image perceived by the user. FIGS. 13(B) and 13(C) show display examples in the display position adjustment.

The combined image 391 shown in FIG. 13(A) is an example of a state of an image that is likely to be perceived by the user when the image processing unit 160 causes the image display unit 20 to display the image for left eye 352 and the image for right eye 354 shown in FIGS. 4(D) and 4(E). When the head-mounted display device 100 divides and displays the pre-division image 350, there is an individual difference in perception of the user. For example, the image for left eye 352 and the image for right eye 354 are seen shifted like, for example, the combined image 391 because of a positional relation between both the eyes of the user and the right light guide plate 261 and the left light guide plate 262. When a shift occurs in the combined image 391 because of a physical positional relation, the head-mounted display device 100 adjusts the display position of the image in the image display unit 20. Then, improvement can be expected.

When the user feels a shift of the combined image 391 and operates the operation unit 135 to instruct adjustment of the display position, the division control unit 164 controls the image processing unit 160 to display images shown in FIGS. 13(B) and 13(C). In FIG. 13(B), the image region 352A is rendered smaller than a displayable region 241A of the right LCD 241 (FIG. 2). An arrow indicating a direction in which the image region 352A can be moved is displayed. In FIG. 13(C), the image region 354A is rendered smaller than a displayable region 242A of the left LCD 242 (FIG. 2). An arrow indicating a direction in which the image region 354A can be moved is displayed. A region excluding the image regions 352A and 354A and the arrows is displayed in, for example, black or a dark color.

In display states shown in FIGS. 13(B) and 13(C), the user instructs movement of display positions of the image regions 352A and 354A by operating the operation unit 135. As shown in FIG. 13(A), the shifted combined image 391 is seen for the user. Therefore, it is desirable that the user can instruct, with intuitive operation, a direction in which the shift can be eliminated. Therefore, for example, every time operation of the track pad 14 or the direction key 16 is performed once, the division control unit 164 moves the display position of the image region 352A or the image region 354A by a predetermined amount.

Operation related to adjustment of the display positions is shown in FIG. 12.

The division control unit 164 starts the adjustment of the display positions according to, for example, operation of the operation unit 135 (step S41) and acquires image data for adjustment for performing the adjustment of the display positions from the storing unit 120 (step S42). The image data for adjustment includes, for example, arrows and the like shown in FIGS. 13(B) and 13(C). The division control unit 164 causes the display processing unit 160 to display an image based on the image data for adjustment (step S43). The user inputs an instruction for movement of the display positions (step S44). The division control unit 164 changes display positions in the right LCD 241 and the left LCD 242 according to the instruction input (step S45) and determines whether the adjustment of the display positions is completed (step S46).

For example, when an instruction for adjustment completion is input by the operation unit 135, the division control unit 164 determines that the adjustment is completed (YES in step S46). The division control unit 164 ends the display of the image for adjustment. The division control unit 164 acquires the display positions after the movement in step S45 respectively for the right LCD 241 and the left LCD 242, records the display positions in the setting data 123 (step S47), and ends the processing. When determining that the adjustment is not completed (step S46), the division control unit 164 returns to step S44 and receives the instruction for movement.

The image processing unit 160 can appropriately adjust display timings in the right LCD 241 and the left LCD 242 by controlling an output of data in causing the right LCD 241 and the left LCD 242 to display divided images. FIGS. 14(A) to 14(D) are explanatory diagrams showing an example of operation of rendering of the head-mounted display device 100.

In FIGS. 14(A) to 14(D), operation in displaying the image for left eye 376 (FIG. 14(A)) configured by the plurality of divided image pieces 375A and the image for right eye (FIG. 14(B)) configured by the plurality of divided image pieces 377A explained with reference to FIGS. 8(A) to 8(D) is shown.

In normal display processing, the image processing unit 160 transmits an image signal in a line unit in the horizontal direction to the right LCD control unit 211 (FIG. 2) and the left LCD control unit 212 (FIG. 2). The right LCD control unit 211 updates display of the right LCD 241 for each line and the left LCD control unit 212 updates display of the left LCD 242 for each line on the basis of the image signal. The image processing unit 160 can transmit the image signal to the right LCD control unit 211 and the left LCD control unit 212 in a unit of two lines from leading positions of the lines. In this case, as shown in FIG. 14(B), the left LCD control unit 212 renders the image regions 376A by two lines in the longitudinal direction at a time from an end portion of the displayable region 242A of the left LCD 242. As shown in FIG. 14(C), the right LCD control unit 211 renders the image regions 378A by two lines in the longitudinal direction at a time from an end portion of the displayable region 241A of the right LCD 241.

Further, it is more desirable to align timing when the left LCD control unit 212 renders the image regions 376A and timing when the right LCD control unit 211 renders the image regions 378A. For example, at timing the same as or substantially the same as timing when the left LCD control unit 212 renders the image region 376A located at the left end in the image for left eye 376, the right LCD control unit 211 renders the image region 378A adjacent to the image region 376A rendered by the left LCD control unit 212. That is, portions adjacent to each other in the pre-division image 350 are simultaneously rendered. In this case, for the user, relatively large regions in the pre-division image 350 are seen as being rendered at substantially the same timing. Therefore, visual combination is easy. It can be expected that visibility is improved.

Note that an adjustment method for display positions of images in the image display unit 20 is not limited to the method of changing the positions where the images are rendered in the right LCD 241 and the left LCD 242. For example, the positions of the right optical-image display unit 26 and the left optical-image display unit 28 with respect to the right holding unit 21 and the left holding unit 23 configuring a frame of the image display unit 20 may be moved. The positions of images focused on the right light guide plate 261 and the left light guide plate 262 may be changed by the function of the right projection optical system 251 and the left projection optical system 252. The lens groups and the like of the right projection optical system 251 and the left projection optical system 252 may be moved. The display positions of the images may be adjusted by changing only the positions of the right LCD 241 and the left LCD 242.

As explained above, the head-mounted display device 100 according to the embodiment applied with the invention includes the left optical-image display unit 28 that displays an image corresponding to the left eye of the user and the right optical-image display unit 26 that displays an image corresponding to the right eye of the user. The head-mounted display device 100 includes the image processing unit 160 that divides a display target image and outputs an image for left eye and an image for right eye including divided images to the left optical-image display unit 28 and the right optical-image display unit 26. The image for left eye and the image for right eye include image regions configured by the images divided by the image processing unit 160 and non-image regions (pseudo image regions) not including the divided images. A state of the non-image region of one of the image for left eye and the image for right eye corresponds to a state of the image region of the other. Consequently, processing such as an increase in resolution and expansion of the display target image is not involved or a load of processing can be suppressed. Further, transfer speed for transferring images to the display units can be suppressed. If processing for generating the non-image regions and the non-image regions are simplified, a load can be easily suppressed. Therefore, it is possible to suppress a load related to display of images and cause the user to visually recognize a target image.

The non-image regions can be pseudo image regions including pseudo images different from the divided images.

The image for left eye and the image for right eye displayed by the head-mounted display device 100 are images visually recognized as the display target image by the user when the image for left eye and the image for right eye are displayed on the left optical-image display unit 28 and the right optical-image display unit 26. Therefore, an image the same as the image before the division can be shown to the user. Therefore, it is possible to divide an image, reduce a processing load, and display the target image making use of the two display units.

The image processing unit 160 associates the positions of the image regions in the image for left eye and the image for right eye with the positions of the divided images in the display target image. Therefore, the divided images are displayed on the left optical-image display unit 28 and the right optical-image display unit 26 without the positions of the divided images being changed. Therefore, it is possible to cause the user to visually recognize one display target image using the two display units.

The head-mounted display device 100 controls, with the division control unit 164, the display position of the image region of the image for right eye in the right optical-image display unit 26 and the display position of the image region of the image for left eye in the left optical-image display unit 28. Therefore, it is possible to appropriately adjust the display positions of the image for left eye and the image for right eye and satisfactorily keep visibility of the display target image. The division control unit 164 may control and change the display positions of the image for right eye and the image for left eye or may control and change the display positions of the image regions.

The head-mounted display device 100 includes the input-information acquiring unit 110 that receives an input of the user. The division control unit 164 changes, according to the input received by the input-information acquiring unit 110, at least one of the display position of the image region of the image for right eye in the right optical-image display unit 26 and the display position of the image region of the image for left eye in the left optical-image display unit 28. Therefore, the user can adjust the display positions of the image regions by performing operation according to view perceived by the user.

In the operation for adjusting the display positions, the division control unit 164 only has to change at least one of the display position of the image region of the image for right eye in the right optical-image display unit 26 and the display position of the image region of the image for left eye in the left optical-image display unit 28. The division control unit 164 may change both of the display position of the image region of the image for right eye in the right optical-image display unit 26 and the display position of the image region of the image for left eye in the left optical-image display unit 28 according to necessity.

The image display unit 20 may transmit an outside scene and display the images to be enabled to be visually recognized together with the outside scene. The image processing unit 160 may adjust a display mode of the pseudo image region (the non-image region) in at least one of the image for left eye and the image for right eye. Specifically, when the pseudo image regions 352B and 354B (FIGS. 4(D) and 4(E)) are colored in black, image light is absent in portions corresponding to the pseudo image regions 352B and 354B. In this case, image light of the divided image 351 and image light of the divided image 353 are made incident on the eyes of the user. On the other hand, image lights of the dummy data are not made incident on the eyes. Therefore, a light amount of the image lights made incident on the eyes of the user is substantially equal to a light amount for one screen of the pre-division image 350. Therefore, the user can easily recognize the pre-division image 350. On the other hand, when the pseudo image regions 352B and 354B are colored in white, image lights of pixels having maximum luminance are irradiated on the portions corresponding to the pseudo image regions 352B and 354B. In this case, the image light of the divided image 351 and the image light of the divided image 353 are made incident on the eyes of the user. Further, image lights of while corresponding to dummy data are also made incident on the eyes. In this way, the view of the pre-division image can be adjusted by changing the display mode of the pseudo image region to change, for example, the display color to black or white.

The display mode of the pseudo image region is not limited to the display color in coloring the pseudo image region with a uniform color and may be a tint or luminance of the pseudo image region. In the example explained above, since a color of the dummy data is an achromatic color, the pseudo image region does not hinder the user from combining the divided images 351 and 353 and recognizing the pre-division image 350. However, the color of the pseudo image region may be a chromatic color. In this case, a tint of the pre-division image 350 visually recognized by the user can be changed by the influence of the color of the pseudo image region.

Further, when the luminance of the pseudo image regions 352B and 354B is low, an outside scene is easily seen in positions overlapping the pseudo image regions 352B and 354B. Therefore, external light is perceived by the user. On the other hand, when the luminance of the pseudo image regions 352B and 354B is high, the outside scene is less easily transmitted. Therefore, the user can visually recognize the pre-division image 350 without being affected by the outside scene.

Note that the display mode of the pseudo image region does not have to be fixed and may be changed. In this case, the image processing unit 160 may change the display mode (a color, luminance, tone, etc.) of the pseudo image region according to a change in the luminance and the tone of the pre-division image 350 to be displayed. Alternatively, when the pre-division image 350 does not change, the image processing unit 160 may change the display mode of the pseudo image region according to the elapse of time.

As explained with reference to FIGS. 6(A) to 6(E), the image processing unit 160 may extract the divided images 361 and 363 having portions overlapping each other from the pre-division image 350 and set the divided images 361 and 363 respectively as image regions of the image for left eye 362 and the image for right eye 364. In this case, since a seam of the images displayed by the left optical-image display unit 28 and the right optical-image display unit 26 is less conspicuous, it is possible to reduce a sense of discomfort of the user and display a high-definition image.

As explained with reference to FIGS. 7(A) to 9(D), the image processing unit 160 may dispose a plurality of image regions and a plurality of pseudo image regions in each of the image for left eye and the image for right eye. In this case, the image for left eye and the image for right eye are combined in a more complicated shape to cause the user to visually recognize the display target image. Therefore, for example, it is possible to divide the display target image in a shape easily visually recognized by the user and display images.

In the head-mounted display device 100, as explained with reference to FIGS. 4(F) and 4(G), the image processing unit 160 may include a predetermined index (the superimposing position mark M) in the common position of the image for left eye and the image for right eye. Further, the image processing unit 160 may equalize the display sizes of the left optical-image display unit 28 and the right optical-image display unit 26. In this case, since the index is disposed in the common position, correspondence between the image displayed by the right optical-image display unit 26 and the image displayed by the left optical-image display unit 28 is clarified. There is an advantage that the user can easily recognize one display target image from the images of the two display units.

The division control unit 164 can change the display size of the superimposing position mark M (the index) displayed by the right optical-image display unit 26 and the left optical-image display unit 28. Therefore, it is possible to change visibility of the index according to a degree of necessity of the superimposing position mark M. It is possible to display the superimposing position mark M to allow the user to easily recognize an image and not to hinder visual recognition of the image.

The division control unit 164 reduces the display size of the superimposing position mark M as time elapses and, when the display target image changes, expands the display size of the superimposing position mark M. Therefore, it is possible to appropriately cope with a change in the necessity of the superimposing position mark M. That is, when the superimposing position mark M is necessary, the superimposing position mark M is displayed large to improve visibility. When the necessity of the superimposing position mark M decreases, the display size is reduced. The superimposing position mark M can be displayed not to hinder visual recognition of an image.

The image processing unit 160 disposes the image regions and the pseudo image regions in the regions set in advance in the image for left eye and the image for right eye. Therefore, it is possible to reduce loads of processing of the image processing unit 160 for dividing the display target image and processing for combining the pseudo image regions with divided images to generate the image for left eye and the image for right eye.

The right optical-image display unit 26 and the left optical-image display unit 28 configure the image display unit 20 that transmits an outside scene and displays an image to be able to be visually recognized together with the outside scene. For the user, the image for left eye and the image for right eye including the divided images are seen overlapping the outside scene.

In this configuration, it is possible to adjust the view of the image for left eye and the image for right eye by adjusting a display color and display luminance of the image regions of the image for left eye and the image for right eye or a light amount of the entire images. For example, it is possible to adjust the luminance or the light amount according to a light amount of external light to make it easier to view the display target image than the outside scene or make it easy to view the outside scene Further, it is possible to adjust the view of the image for left eye and the image for right eye by adjusting a color and/or brightness of the pseudo image regions included in the image for left eye and the image for right eye. For example, when the light amount of the external light is large, it is possible to increase the luminance of the pseudo image regions and show the display target image bright. For example, when the light amount of the external light is small, it is possible to reduce the luminance of the pseudo image regions, darken the display target image, and make it easy to view the display target image according to the outside scene. Conversely, when the light amount of the external light is small, it is also possible to increase the luminance of the pseudo image regions and make the display target image conspicuous.

In the first embodiment, the configuration is explained in which, in the processing related to the adjustment of the display positions shown in FIG. 12, the display positions in the right LCD 241 and the left LCD 242 are changed according to the input of the instruction of the user. However, the display positions may be automatically adjusted according to the control by the control unit 140. For example, the head-mounted display device 100 may be configured to include a visual-line detecting unit that picks up an image of the eyes of the user and detects a visual line direction as explained in a second embodiment or may be configured to measure eye potential of the eyes of the user and detect an eyeball motion to thereby estimate a visual line. In this case, it is possible to display images including an index for position adjustment on the right LCD 241 and the left LCD 242, detect a visual line of the user in a state in which the user gazes the index, and automatically adjust the display positions on the basis of a detection result. The head-mounted display device 100 may be configured to include an image pickup unit (not shown in the figure) that picks up a virtual image visually recognized by the user with image lights guided by the light guide plates 261 and 262.

The head-mounted display device 100 may determine, on the basis of a picked-up image of the image pickup unit, whether the display positions of the image for left eye and the image for right eye are appropriate and adjust the display positions according to necessity. In this case, there is an advantage that it is possible to appropriately adjust the display positions even if the user does not perform operation for instructing the display positions.

Second Embodiment

FIG. 15 is a block diagram showing the functional configuration of a head-mounted display device 100A in a second embodiment. FIGS. 16(A) and 16(B) are diagrams showing a main part configuration of an image display unit 20A included in the head-mounted display device 100A. FIG. 16(A) is a main part perspective view of the image display unit 20A viewed from the head side of a user. FIG. 16(B) is an explanatory diagram of a visual line direction.

In the second embodiment, the head-mounted display device 100A including a function of detecting a visual line of the user and a function of performing AR display corresponding to a target object located in a visual line direction of the user is explained. In the second embodiment, units configured the same as the units in the first embodiment are denoted by the same reference numerals and signs. Explanation of the units is omitted.

The image display unit 20A includes, in addition to the components of the image display unit 20 (FIG. 2), distance sensors 64 and visual line sensors 68 (a visual-line detecting unit). The head-mounted display device 100 and the head-mounted display device 100A are common in the other points. The head-mounted display device 100A can execute the operation of the head-mounted display device 100 in the first embodiment.

Reference signs 261A and 262A in FIG. 16(A) respectively denote half mirrors formed on the right light guide plate 261 and the left light guide plate 262. The half mirrors 261A and 262A correspond to display regions that display images to enable an outside scene to be transmitted. The half mirrors 261A and 262A are also present in the image display unit 20 in the first embodiment.

As shown in FIG. 16(A), the distance sensors 64 are disposed in a boundary portion between the right optical-image display unit 26 and the left optical-image display unit 28. In a state in which the user wears the image display unit 20A, the position of the distance sensors 64 is substantially the middle between both the eyes of the user in the horizontal direction and above both the eyes of the user in the vertical direction. The distance sensors 64 detect a distance to a measurement target object located in a measurement direction set in advance.

For example, as shown in FIG. 16(B), the distance sensors 64 detect a distance to a target object OB present ahead of a visual line RD of a right eye RE of the user and a visual line LD of a left eye LE of the user. In this case, a direction 64A in which the distance sensors 64 perform the detection is the front of the image display unit 20A.

The distance sensors 64 include light sources such as LEDs or laser diodes and light receiving units that receive reflected lights of lights emitted by the light sources and reflected on the measurement target object. In this case, the distance sensors 64 execute, according to the control by the control unit 140, triangulation processing or ranging processing based on a time difference. The distance sensors 64 may include sound sources that emit ultrasound and detecting units that receive the ultrasound reflected on the measurement target object. In this case, the distance sensors 64 execute, according to the control by a position detecting unit 162 explained below, the ranging processing on the basis of a time difference until the reflection of the ultrasound. Note that the distance sensors 64 may include light sources and light receiving units or sound sources and detecting units. A distance detecting unit 173 may perform the ranging processing.

A measuring direction of the distance sensors 64 in this embodiment is a front side direction of the head-mounted display device 100A and overlaps an image pickup direction of the camera 61.

As shown in FIG. 16(A), the visual line sensors 68 are disposed on a surface on the user side of the image display unit 20A. The visual line sensors 68 are provided as a pair in the center position between the right optical-image display unit 26 and the left optical-image display unit 28 to respectively correspond to the right eye RE (FIG. 16(B)) and the left eye LE (FIG. 16(B)) of the user. The visual line sensors 68 are configured by, for example, a pair of cameras that respectively pick up images of the right eye RE and the left eye LE of the user. The visual line sensors 68 perform the image pickup according to the control by the control unit 140 (FIG. 2). The control unit 140 detects reflected lights on eyeball surfaces of the right eye RE and the left eye LE and images of pupils from picked-up image data and specifies a visual line direction. The visual line sensors 68 respectively pick up images of the left and right eyes of the user. Therefore, when the user closes the eyes, the closing of the eyes can be detected by the visual line sensors 68.

As shown in the block diagram of FIG. 15, the distance sensors 64 and the visual line sensors 68 are connected to the control unit 140 by the connecting unit 40. The distance detecting unit 173 is capable of controlling the distance sensors 64 to detect a distance to a target object. Note that the control unit 140 may be configured to detect the distance to the target object on the basis of picked-up image data of the camera 61.

The division control unit 164 can adjust, according to the visual line direction detected by the visual line sensors 68, display modes of an image for right eye and an image for left eye obtained by dividing a display target image.

FIG. 17 is a flowchart for explaining the operation of the head-mounted display device 100A and shows operation for adjusting a boundary position for dividing the display target image according to the visual line direction. FIGS. 18(A) to 18(G) are explanatory diagrams of the operation shown in FIG. 17. FIGS. 18(A), 18(B), and 18(C) show visual field characteristics. FIG. 18(A) shows a visual field in the horizontal direction. FIG. 18(B) shows a visual field in the vertical direction. FIG. 18(C) shows distribution of a visual field on a surface perpendicular to a straight line indicating the visual line direction. FIGS. 18(D), 18(E), 18(F), and 18(G) show modes of divided images.

In general, it is known that a human has a different characteristic of view in each region of a visual field. Specifically, as human visual fields, centering on the visual line direction indicated by RD and LD in FIG. 16(B), there are a distinguishing visual field V1 closes to the center, an effective visual field V2, and a stable fixation visual field V3. The distinguishing visual field V1 is a center region where a visual function such as vision is most excellently exhibited. The distinguishing visual field V1 is a range of approximately ±5° centering on the visual line direction. A range in the horizontal direction of the distinguishing visual field V1 corresponds to X1 in the figure. A range in the vertical direction of the distinguishing visual field V1 corresponds to Y1 in the figure.

The effective visual field V2 is a region where information reception can be instantaneously performed only with an eyeball motion. A range of the effective visual field V2 is approximately ±30° in the horizontal direction (in the figure, X2) and approximately ±20° in the vertical direction (in the figure, Y2) centering on the visual line direction. The stable fixation visual field V3 is a range in which gazing can be reasonably performed with eyeball and head motions. The stable fixation visual field V3 is a region where effective information reception can be performed. A range of the stable fixation visual field V3 is approximately ±60 to 90° in the horizontal direction (in the figure, X3) and approximately ±45 to 70° in the vertical direction (in the figure, Y3) centering on the visual line direction.

Therefore, when the user combines images viewed with the left and right eyes and visually recognizes the display target image, i.e., the pre-division image 350 before division, if a position (a boundary) for dividing the pre-division image 350 is present in the distinguishing visual field V1 or the vicinity of the distinguishing visual field V1, the user can satisfactorily visually recognize the pre-division image 350. Therefore, the division control unit 164 controls a boundary of images displayed on the left and right according to a visual line of the user.

The division control unit 164 acquires image data for dominant eye setting from the storing unit 120 (step S61) and causes, on the basis of the acquired image data, the image processing unit 160 to display an image for dominant eye setting (step S62). When the user, who views the image for dominant eye setting, performs an input for designating whether a dominant eye is the right eye or the left eye according to operation of the operation unit 135, the division control unit 164 receives the input (step S63) and updates setting of the setting data 123 concerning the dominant eye (step S64).

In operation in steps S61 to S64, the dominant eye of the user is specified. As shown in FIG. 16(B), the visual line sensors 68 detect the visual line direction RD of the right eye RE of the user and the visual line direction LD of the left eye LE of the user. However, a visual line direction perceived by the user is not always the middle between the visual line directions RD and LD. A visual line direction of the dominant eye is often more strongly perceived. The division control unit 164 performs processing for specifying the dominant eye of the user according to the operation shown in FIG. 17 and coping with the visual line direction of the dominant eye.

The image for dominant eye setting displayed in step S62 is an image with which the user can easily discriminate whether the dominant eye is the right eye or the left eye. The image for dominant eye setting may be an image with which the dominant eye can be determined using an outside scene visually recognized through the right optical-image display unit 26 and the left optical-image display unit 28. The image for dominant eye setting may include a message or an image for guiding the user to close one of the eyes in order to determine the dominant eye.

The division control unit 164 starts display of the display target image (step S65). In step S66, the division control unit 164 causes the image processing unit 160 to display an image for right eye and an image for left eye obtained by dividing the display target image in a default position and a default form set in advance.

The division control unit 164 executes detection of a visual line by the visual line sensors 68 (step S66). In step S66, the division control unit 164 may specify a visual line direction on the basis of only the visual line direction of the dominant eye of the user detected by the visual line sensors 68. The division control unit 164 may calculate the visual line direction on the basis of the visual line direction RD of the right eye RE and the visual line direction LD of the left eye LE detected by the visual line sensors 68 such that the visual line direction of the dominant eye is prioritized.

The division control unit 164 determines whether the visual line has moved (step S67). When a difference between a visual line direction at the time when the detection in step S66 is performed last time and a visual line direction at the time when the detection in step S66 is performed next time exceeds a set threshold, the division control unit 164 determines that the visual line direction has moved (YES in step S67). In this case, the division control unit 164 designates, according to the visual line direction detected in step S66, the position of a boundary for dividing the display target image and the size of an overlapping region and causes the image processing unit 160 to update the display (step S68). Consequently, the image for right eye and the image for left eye adjusted to the latest visual line direction are displayed. Note that, when the operation in step S66 is performed first time, the operation in step S68 is executed as at the time when the visual line moves.

When determining that the visual line direction has not moved (NO in step S67) and after executing the operation in step S68, the division control unit 164 determines whether the display is ended (step S69). When the display is continued (NO in step S69), the division control unit 164 returns to step S66. When the display is ended (YES in step S69), the division control unit 164 causes the image processing unit 160 to end the display and ends the processing.

In the operation shown in FIG. 17, an example is explained in which the setting data 123 concerning the dominant eye is updated on the basis of the selection input of the user and the processing in steps S67 to S68 is performed according to the setting of the setting data 123. However, the dominant eye setting may be automatically changed or updated. The setting of the dominant eye used in the processing by the division control unit 164 may be temporarily switched without updating the setting data 123 concerning the dominant eye.

The dominant eye of the human sometimes changes according to a gazing direction. Therefore, when the division control unit 164 detects the visual line in step S66, if a gazing direction calculated from the detected visual line direction is the opposite side of the dominant eye set in the setting data 123, the division control unit 164 may set, as the dominant eye, the eye on the opposite side of the dominant eye set in the setting data 123 and perform the processing in S67 to S68. For example, when the right eye is set as the dominant eye by the setting data 123 and the visual line direction detected in step S66 belongs to the left half of the visual field of the user, the division control unit 164 may set the left eye as the dominant eye and perform the processing in steps S67 to S68.

FIGS. 18(D) and 18(E) show examples of an image for left eye 384 and an image for right eye 385 corresponding to the visual line direction. The image for left eye 384 is an image obtained by vertically dividing the pre-division image 350 (FIG. 4(A)) into two. Compared with the image for left eye 352 shown in FIG. 4(D), an image region 384A of the image for left eye 384 includes a half or more of the pre-division image 350. An image region 385A of the image for right eye 385 is a lower part of the pre-division image 350 and includes a half or more of the pre-division image 350. When the image for left eye 384 and the image for right eye 385 are superimposed, an overlapping region indicated by reference sign W1 in the figure is generated. The overlapping region W1 is a region displayed to be seen in both of the right eye and the left eye of the user. The user more clearly visually recognizes the overlapping region W1. The division control unit 164 determines, on the basis of a detection result of the visual line sensors 68, the position and the size of the image regions 384A and 385A such that the visual line of the user is included in the overlapping region W1. The division control unit 164 causes the image processing unit 160 to display the image regions 384A and 385A.

FIGS. 18(F) and 18(G) show an example in which the visual line direction specified by the division control unit 164 from the detection result of the visual line sensors 68 moves downward. In a state shown in FIGS. 18(F) and 18(G), the overlapping region W1 is present in a lower part of the image according to the visual line direction. The image regions 384A and 385A change corresponding to the position of the overlapping region W1.

By adjusting the position and the size of the overlapping region W1 according to the visual line direction, it is possible to display an image such that the distinguishing visual field V1 in the visual field of the user is included in the overlapping region W1. Therefore, the user can clearly visually recognize the overlapping region W1. In the stable fixation visual field V3 or the like where the visual function of the user is less easily exhibited, it is possible to reduce a processing load by dividing the image to the left and right.

In the processing explained in FIG. 17, when the division control unit 164 determines, using a general value concerning the distinguishing visual field V1, the position of the boundary for dividing the display target image according to the visual line direction and the size of the overlapping region. In this processing, the division control unit 164 may perform processing reflecting an individual difference. That is, the division control unit 164 may measure, concerning a range of the distinguishing visual field, the effective visual field, or the stable fixation visual field with respect to the visual line direction, an individual difference (a difference) between a standard value and the user and perform the processing in step S68 in FIG. 17 by adding the difference.

FIG. 19 is a flowchart for explaining the operation of the head-mounted display device 100A and shows operation related to AR display.

The division control unit 164 performs the AR display for displaying AR content corresponding to a target object visually recognized by the user through the image display unit 20A. The target object is a physical body, a person, an animal, or a distant view included in an outside scene. In the AR display, the division control unit 164 displays an image, a character, or the like in a position corresponding to the target object to provide information concerning the target object or change the view of a figure of the target object seen through the image display unit 20A. The AR content includes data of the image or the character displayed in the position corresponding to the target object. Data for specifying the target object, data concerning display positions of the image and the character, and the like may be included in the AR content. Data of the AR content is stored in, for example, the storing unit 120.

The display position of the AR content may be a position overlapping the target object or may be around the target object. In this embodiment, the target object is a physical body. The target object may be an immovable property such as a building, may be a mobile body such as an automobile or a train, or may be a living organism such as a human or an animal.

The division control unit 164 detects the target object located in the visual field of the user. An AR-display control unit 186 determines a position of display of the AR content corresponding to the detected target object and displays the AR content. The AR content is desirably displayed to overlap a position where the user visually recognizes the target object or according to the position where the user visually recognizes the target object. Therefore, the division control unit 164 specifies the position of the target object. As a method of specifying the position of the target object, for example, there is a method of detecting an image of the target object from picked-up image data of the camera 61. In this embodiment, the division control unit 164 estimates that the target object is present in the visual line direction of the user and detects, with the distance sensors 64, a distance to the target object present in the visual line direction of the user to obtain the direction in which the target object is present and the distance to the target object.

The division control unit 164 acquires data of the AR content stored in the storing unit 120 (step S81) and causes, on the basis of the acquired data, the image processing unit 160 to display the AR content (step S82). The image processing unit 160 divides, according to the control by the division control unit 164, an image of the AR content on the basis of a default dividing position, a default size of an overlapping region, and the like set in advance and displays an image for right eye and an image for left eye.

Subsequently, the division control unit 164 performs detection of the target object of AR by the visual line sensors 68 and the distance sensors 64 (step S83) and specifies, on the basis of a detection result of the visual line sensors 68 and a detection result of the distance sensors 64, a direction in which the target object of AR is present (step S84). The direction specified in step S84 is a relative direction with respect to the right optical-image display unit 26 and the left optical-image display unit 28, which are display units of the image display unit 20A. Therefore, the direction of the target object changes not only when the target object moves but also when the image display unit 20A moves with respect to the target object.

The division control unit 164 determines whether the direction of the target object has changed (step S85). When a difference between a direction specified in step S84 last time and a direction specified in step S84 next time exceeds a threshold set in advance, the division control unit 164 determines that the direction of the target object has changed (YES in step S85). In this case, the division control unit 164 changes, according to the direction detected in step S85, setting of the position of the boundary for dividing the display target image and the size of the overlapping region (step S86) and updates the display according to the setting after the change (step S87). Consequently, the image for right eye and the image for left eye adjusted to the direction of the target object are displayed. Note that, when the operation in step S84 is performed first time, the operation in step S86 is executed in the same manner as when the direction of the target object changes.

When determining that the direction of the target object has not changed (NO in step S85) and after executing the operation in step S87, the division control unit 164 determines whether the display is ended (step S88). When the display is continued (NO in step S88), the division control unit 164 returns to step S83. When the display is ended (YES in step S88), the division control unit 164 causes the image processing unit 160 to end the display and ends the processing.

In this way, the head-mounted display device 100A according to the second embodiment applied with the invention includes the visual line sensors 68 that detect the visual line direction of the user in the head-mounted display device 100A. The division control unit 164 controls, according to the visual line direction detected by the visual sensors 68, a display position of an image region of the image for right eye in the right optical-image display unit 26 and a display position of an image region of the image for left eye in the left optical-image display unit 28. Therefore, it is possible to adjust the display positions of the image regions according to the visual line direction of the user and satisfactorily keep visibility of the display target image.

The division control unit 164 can control, according to the visual line direction of the dominant eye of the user detected by the visual line sensors 68, the display position of the image region of the image for right eye in the right optical-image display unit 26 and the display position of the image region of the image for left eye in the left optical-image display unit 28. Therefore, it is possible to adjust the display positions of the image regions to prioritize the visual line direction of the dominant eye of the user. It is possible to satisfactorily keep visibility of the display target image.

The division control unit 164 functions as an AR-display control unit that causes, according to the position where the user visually recognizes the target object included in the outside scene, the right optical-image display unit 26 and the left optical-image display unit 28 to display the display target image. The division control unit 164 controls, according to the position where the user visually recognizes the target object, the display position of the image region of the image for right eye in the right optical-image display unit 26 and the display position of the image region of the image for left eye in the left optical-image display unit 28. Therefore, it is possible to satisfactorily perform AR display corresponding to the target object included in the outside scene.

Display processing corresponding to the target object in the outside scene visually recognized by the user is not limited to the AR display. The division control unit 164 may perform so-called MR (Mixed Reality) display and VR (Virtual Reality) display. The division control unit 164 specifies, on the basis of the visual line direction of the user detected by the visual line sensors 68, the target object in the outside scene or the position of the target object visually recognized or gazed by the user. The division control unit 164 only has to display, with the display control unit 190, an MR image generated on the basis of a picked-up image of the camera 61 or a VR image including CG (Computer Graphics) for the VR display corresponding to the target object in the outside scene or the position of the target object visually recognized or gazed by the user. The MR image is, for example, an image obtained by combining CG generated and stored in advance or CG generated by the control unit 140 with the picked-up image of the camera 61. The VR image is an image created using the CG generated and stored in advance or the CG generated by the control unit 140. When performing the MR display or the VR display, the division control unit 164 can divide the MR image or the VR image, which is the display target image, and display the image for right eye on the right optical-image display unit 26 and display the image for left eye on the left optical-image display unit 28.

Note that the first and second embodiments explained above are only examples of specific modes applied with the invention and do not limit the invention. The invention can also be applied as modes different from the embodiments. For example, as a configuration for generating image light in the image display unit 20, the image display unit 20 may be configured to include an organic EL (Organic Electro-Luminescence) display and an organic EL control unit. An LCOS (Liquid crystal on silicon, LCoS is a registered trademark), a digital micro mirror device, and the like can also be used. For example, the invention is also applicable to, for example, a head mounted display of a laser retinal projection type. That is, a configuration may be adopted in which the image generating unit includes a laser beam source and an optical system for guiding a laser beam to the eyes of the user, makes the laser beam incident on the eyes of the user to scan the laser beam on the retinas, focuses the laser beam on the retinas to thereby cause the user to visually recognize an image. When the head mounted display of the laser retinal projection type is adopted, "a region where image light can be emitted in an image-light generating unit" can be defined as an image region recognized by the eyes of the user.

As the optical system for guiding the image light to the eyes of the user, a configuration can be adopted that includes an optical member for transmitting external light made incident from the outside toward the device and makes the external light incident on the eyes of the user together with the image light. An optical member located in front of the eyes of the user and overlapping a part of or the entire visual field of the user may be used. Further, an optical system of a scanning type that scans a laser beam or the like and changes the laser beam to image light may be adopted. The optical system is not limited to an optical system that guides image light on the inside of the optical member and may be an optical system having only a function of refracting and/or reflecting the image light and guiding the image light to the eyes of the user.

The invention is also applicable to a display device in which a scanning optical system including a MEMS (Micro Electro Mechanical Systems) mirror is adopted and a MEMS display technique is used. That is, as an image display element, the display device may include a signal-light forming unit, a scanning optical system including a MEMS mirror that scans light emitted by the signal-light generating unit, and an optical member on which a virtual image is formed by the light scanned by the scanning optical system. In this configuration, the light emitted by the signal-light forming unit is reflected by the MEMS mirror, made incident on the optical member, guided in the optical member, and reaches a virtual-image forming surface. The MEMS mirror scans the light to form a virtual image on the virtual-image forming surface. The user catches the virtual image with the eyes to recognize an image. An optical component in this case may be an optical component that guides light through a plurality of times of reflection like, for example, the right light guide plate 261 and the left light guide plate 262 in the embodiments. A half mirror surface may be used. A configuration in which the MEMS mirror is adopted is explained below as a third embodiment.

Third Embodiment

FIG. 20 is a block diagram showing the basic configuration of a head-mounted display device 100B in a third embodiment applied with the invention.

The head-mounted display device 100B is configured by connecting an image display unit 20B to the control device 10 explained in the first and second embodiments. The image display unit 20B has a configuration in which the right display driving unit 22 and the left display driving unit 24 included in the image display unit 20 in the first embodiment and the image display unit 20A explained in the second embodiment are replaced with a right display driving unit 22A and a left display driving unit 24A.

The right display driving unit 22A includes a light source 401, a right light-source driving unit 402, a MEMS scanner 404 (a light scanning unit) including a mirror 403, a mirror-driving control unit 405, and a receiving unit 53.

The light source 401 includes, for example, a laser beam source (not shown in the figure) and emits combined light obtained by combining color lights of red (R), green (G), and blue (B). The right light-source driving unit 402 supplies a driving current to the light source 401 and lights the light source 401.

The mirror 403 is disposed to face a radiating unit from which the light source 401 radiates light. The mirror 403 reflects the emitted light of the light source 401. The MEMS scanner 404 moves the mirror 403 to control a tilt to thereby change an optical path of the reflected light of the mirror 403. According to the operation of the MEMS scanner 404, the reflected light of the mirror 403 is irradiated on the half mirror 261A (FIG. 16(A)) of the right light guide plate 261. The MEMS scanner 404 can two-dimensionally scan (sweep) the reflected light of the mirror 403 on the half mirror 261A by driving the mirror 403 at high speed. Therefore, it is possible to form an image on the half mirror 261A with the reflected light of the mirror 403 and show the image to the user.

The mirror-driving control unit 405 controls the movement of the MEMS scanner 404 on the basis of control data received by the receiving unit 53.

The left display driving unit 24A includes a light source 411, a left light-source driving unit 412, a MEMS scanner 414 (a light scanning unit) including a mirror 413, a mirror-driving control unit 415, and a receiving unit 54.

The light source 411 includes, for example, a laser beam source (not shown in the figure) and emits combined light obtained by combining color lights of red (R), green (G), and blue (B). The left light-source driving unit 412 supplies a driving current to the light source 411 and lights the light source 411.

The mirror 413 is disposed to face a radiating unit from which the light source 411 radiates light. The mirror 413 reflects the emitted light of the light source 411. The MEMS scanner 414 moves the mirror 413 to control a tilt to thereby change an optical path of the reflected light of the mirror 413. According to the operation of the MEMS scanner 414, the reflected light of the mirror 413 is irradiated on the half mirror 262A (FIG. 16(A)) of the left light guide plate 262. The MEMS scanner 414 can two-dimensionally scan (sweep) the reflected light of the mirror 413 on the half mirror 262A by driving the mirror 413 at high speed. Therefore, it is possible to form an image on the half mirror 262A with the reflected light of the mirror 413 and show the image to the user.

The mirror-driving control unit 415 controls the movement of the MEMS scanner 414 on the basis of control data received by the receiving unit 54.

In this configuration, the half mirrors 261A and 262A function as reflecting units.

FIGS. 21(A) to 21(D) are explanatory diagrams showing an example of a display system with which the head-mounted display device 100A displays an image. FIG. 21(A) shows an example of scanning in the right light guide plate 261. FIGS. 21(B), 21(C), and 21(D) show an example of scanning performed when divided display is performed.

As illustrated in FIG. 21(A), the image display unit 20B scans image light emitted by a laser to display an image. For example, in the half mirror 261A, the image light is scanned in the horizontal direction as indicated by a track 405A. Specifically, the image light moves in the horizontal direction on the half mirror 261A, turns back at an end of the half mirror 261A and moves obliquely downward, and moves in the horizontal direction again. Therefore, turning-back portions 405B are formed at both ends of the track 405A. In order to cope with the formation of the turning-back portions 405B, in the half mirror 261A, a range not including the turning-back portion 405B is formed as a displayable region 261C. Although not shown in the figure, the same applies when the left display driving unit 24A performs display on the left light guide plate 262.

The right display driving unit 22A drives the MEMS scanner 404 in the turning-back portions 405B. On the other hand, the right display driving unit 22A can stop the emission of the light of the light source 401 by the control of the right light-source driving unit 402. Therefore, in the turning-back portions 405B, actually, the light is not irradiated on the half mirror 261A. The user visually recognizes light of the displayable region 261C. In the displayable region 261C, an image is formed by light irradiated on the half mirror 261A while the reflected light of the mirror 403 moves horizontally and while the reflected light moves obliquely downward. Note that it is also possible to irradiate light on the displayable region 261C and form an image only while the reflected light of the mirror 403 moves horizontally. In this case, an image is not formed in a process in which the reflected light of the mirror 403 moves obliquely downward.

When the head-mounted display device 100B performs the divided display according to the control by the division control unit 164, for example, as shown in FIGS. 21(B) and 21(C), the head-mounted display device 100B divides the display target image in the horizontal direction and displays the display target image. In FIG. 21(B), a scanning range of the left light guide plate 262 on the half mirror 262A is shown. In FIG. 21(C), a scanning range on the half mirror 261A is shown. When the divided display is performed, in each of the right holding unit 21 and the left light guide plate 262, scanning of image light is performed in a region larger than a half of the displayable regions 261C and 262C taking into account the turning-back portions 405B. Therefore, in a range in which the MEMS scanners 404 and 414 perform scanning (sweeping), as shown in FIG. 21(D), at least the turning-back portions 405B overlap and an image is displayed to form an overlapping region W11. The overlapping region W11 desirably includes not only the turning-back portions 405B but also the track 405A.

As shown in FIGS. 22(A) to 22(E), the head-mounted display device 100B may display a divided image including belt-like image regions and pseudo image regions extending in the longitudinal direction.

FIGS. 22(A) to 22(E) show display examples of images. FIG. 22(A) shows the pre-division image 350. FIGS. 22(B) and 22(C) show divided images. The divided image 395 includes divided image pieces 395A for the left eye to be visually recognized by the left eye of the user and pseudo image regions 395B formed by dummy data. The divided image 396 includes divided image pieces 396A for the right eye to be visually recognized by the right eye of the user and pseudo image regions 396B formed by dummy data.

When the right display driving unit 22A displays the divided image pieces 395A and when the left display driving unit 24A displays the divided image pieces 396A, as shown in FIG. 22(D), the image light may be scanned in the horizontal direction. In this case, the right light-source driving unit 402 and the left light-source driving unit 412 perform control for irradiating the image light in positions corresponding to the divided image pieces 395A and 396A and stopping the image light in the pseudo image regions 395B and 396B and the turning-back portions 405B.

As shown in FIG. 22(D), the right display driving unit 22A and the left display driving unit 24A may scan the reflected lights of the mirrors 403 and 413 in the longitudinal direction. That is, the right display driving unit 22A scans the reflected light of the mirror 403 in the horizontal direction according to the width of the divided image pieces 395A, turns back the reflected light obliquely downward, and scans the reflected light in the horizontal direction again. The right display driving unit 22A repeats the scanning to sweep a range corresponding to one divided image piece 395A. The right display driving unit 22A executes the sweeping by the number of the divided image pieces 395A. The left display driving unit 24A can also execute the sweeping. In this case, it is possible to reduce the sweeping in regions corresponding to the pseudo image regions 395B. It is possible to efficiently perform display by the image light.

The division control unit 164 may generate a divided image 397 including belt-like divided image pieces 397A and pseudo image regions 397B extending in the horizontal direction and a divided image 398 including belt-like divided image pieces 398A and pseudo image regions 398B extending in the horizontal direction.

In this case, as shown in FIG. 23(C), the right display driving unit 22A desirably sweeps the reflected light of the mirror 403 in the horizontal direction. The same applies to the left display driving unit 24A.

In this way, the head-mounted display device 100B can collectively control, according to the control by the division control unit 164, a method and a mode for dividing the display target image and a mode in which the right display driving unit 22A and the left display driving unit 24A sweep the image light with MEMS. Therefore, it is possible to more efficiently display an image and reduce a load related to the display of the image.

FIG. 24 is a flowchart for explaining the operation of the head-mounted display device 100B. In particular, FIG. 24 shows operation for starting display of an image based on image data.

The division control unit 164 acquires display target image data from the storing unit 120 (step S101) and determines a boundary position for dividing an image (step S102). Subsequently, the division control unit 164 determines the size of a divided image by adding non-rendered portions, where an image cannot be displayed as in the folding-back portions 405B, to the boundary position determined in step S102 (step S103). The size determined in step S103 does not indicate an expansion ratio or a reduction ratio and is a size concerning the size of the overlapping region provided in the divided images. In step S103, the boundary position for dividing the image may be changed.

Thereafter, the division control unit 164 causes, on the basis of the determined boundary and the size of the divided images, the image processing unit 160 to generate data of the divided images (step S104) and start display (step S105).

The head-mounted display device 100B according to the third embodiment applied with the invention can execute the operation explained in the first and second embodiments and obtain the same effects.

Further, the head-mounted display device 100B includes the light source 401, the right light-source driving unit 402, the MEMS scanner 404 including the mirror 403, and the right display driving unit 22A including the mirror-driving control unit 405. The head-mounted display device 100B includes the light source 411, the left light-source driving unit 412, the MEMS scanner 414 including the mirror 413, and the left display driving unit 24A including the mirror-driving control unit 415. The head-mounted display device 100B generates divided images corresponding to amplitude at which the MEMS scanners 404 and 414 scan image light and displays the divided images with the image display unit 20B. For example, the division control unit 164 controls the image processing unit 160 to generate divided images taking into account the turning-back portions 405B in the scanning of the image light. Therefore, in the configuration for displaying an image through sweeping of image light, it is possible to control display such that divided images are satisfactorily visually recognized.

Note that the invention is not limited to the configurations of the embodiments and can be carried out in various modes without departing from the spirit of the invention.

For example, in the embodiment, the example is explained in which the rectangular pre-division image 350 is divided and displayed. However, the invention is not limited concerning the size, the shape, and the number of pixels of an image to be displayed, whether the image is a color image or a monochrome image, and whether the image is a moving image or a still image.

In the embodiments, the divided regions in the image for right eye and the image for left eye may be switched at every predetermined time such as every frame. In this case, it is possible to cause the left and right eyes to visually recognize one pre-division image at every predetermined time. Therefore, it is possible to expect an effect that visibility of an image is improved.

In the embodiment, the image processing unit 160 is explained as being configured to store a digital image signal forming an image of content in the DRAM frame by frame, divide the image, and generate divided images. However, the invention is not limited to this. For example, when an analog image signal is input from the image supply device OA, the image processing unit 160 may divide the analog image signal. Further, in a configuration in which analog image signals are respectively output to the right display driving unit 22 and the left display driving unit 24, the image processing unit 160 may generate analog image signals in pseudo image regions and combine the analog image signals. That is, the image processing unit 160 may combine the analog image signals in the pseudo image regions with the analog image signals output to the right display driving unit 22 and the left display driving unit 24 to generate and output a first image and a second image.

One of the direction key 16 and the track pad 14 provided in the control device 10 may be omitted. Other interfaces for operation such as a stick for operation may be provided in addition to the direction key 16 and the track pad 14 or instead of the direction key 16 and the track pad 14. Input devices such as a keyboard and a mouse may be connectable to the control device 10. The control device 10 may receive inputs from the keyboard and the mouse.

The display device of the invention is not limited to the head-mounted display device and is also applicable to various display devices such as a flat panel display and a projector. The display device of the invention only has to be a display device that causes the user to visually recognize an image using image light together with external light. Examples of the display device include a configuration for causing the user to visually recognize the image by the image light using an optical member that transmits the external light. Specifically, the display device is applicable to, besides the configuration including the optical member that transmits the external light in the head mounted display, a display device that projects image light on a translucent plane or curved surface (glass, transparent plastics, etc.) fixedly or movably set in a position apart from the user. Examples of the display device include a configuration of a display device that projects image light on window glass of a vehicle and causes a user on a vehicle or a user outside the vehicle to visually recognize scenes inside and outside the vehicle together with an image by the image light and a configuration of a display device that projects image light on a fixedly set transparent, or semitransparent, or colored transparent display surface such as window glass of a building and causes a user present around the display surface to visually recognize a scene through the display surface together with an image by the image light.

The configuration for performing the MR display or the VR display using the picked-up image of the camera 61 or the CG is not limited to the display device that causes the user to visually recognize an image together with external light and is also applicable to various display devices, for example, a display device that displays an image in a state in which an outside scene cannot be visually recognized. Specifically, the invention is applicable to a display device that displays, for example, a picked-up image of the camera 61, an image and a CG generated on the basis of the picked-up image, and videos based on video data stored in advance and video data input from the outside. The display device of this type can include a display device of a so-called close type with which an outside scene cannot be visually recognized. A display device that does not perform processing such as AR display, MR display, or VR display and displays video data or an analog video signal input from the outside is naturally included as an application target of the invention.

In the embodiments, the image display unit 20 of the eyeglass type worn on the head of the user is illustrated. However, the invention is not limited to this. For example, an image display unit of another type such as an image display unit worn like a hat may be adopted instead of the image display unit 20. The image display unit may be other configurations. The image display unit only has to include a display unit that displays an image corresponding to the left eye of the user and a display unit that displays an image corresponding to the right eye of the user. The display device according to the invention may be configured as a head mounted display mounted on a vehicle such as an automobile or an airplane. For example, the display device may be configured as a head mounted display incorporated in a body protector such as a helmet or may be a head-up display (HUD) used for a windshield of an automobile. Further, for example, a hand held display of a binocular type used by the user with both the hands may be adopted as the image display unit 20 of this application. Furthermore, a display that focuses light on retinas in eyeballs of the user such as a so-called contact lens type display or an implant type display embedded in the eyeballs used while being attached to the eyeballs (e.g., on corneas) of both the eyes of the user may be adopted as the image display unit 20. In all the cases, a display unit that causes one eye of the user to recognize an image can be set as the first display unit and a display unit that causes the other eye to recognize the image can be set as the second display unit.

Further, in the embodiment, the configuration in which the image display unit 20 and the control device 10 are separated and connected via the connecting unit 40 is explained as the example. However, it is also possible to adopt a configuration in which the control device 10 and the image display unit 20 are integrally configured and worn on the head of the user.

The control device 10 and the image display unit 20 may be connected by a longer cable or a radio communication line. As the control device 10, a notebook computer, a tablet computer, or a desktop computer, portable electronic devices including a game machine, a cellular phone, a smart phone, and a portable media player, other dedicated devices, and the like may be used.

At least a part of the functional blocks shown in FIGS. 2, 15, and 20 may be realized by hardware or may be configured to be realized by cooperation of the hardware and software. The functional blocks are not limited to a configuration in which independent hardware resources are disposed as shown in FIGS. 2, 15, and 20. The programs executed by the control unit 140 may be stored in the storing unit 120 or a storage device in the control device 10 or the program stored in an external device may be configured to be acquired via the communication unit 117 or the interface 180 and executed. Among the components formed in the control device 10, only the operation unit 135 may be formed as an independent user interface (UI). The power supply 130 in the embodiment may be independently formed and configured to be replaceable. The components formed in the control device 10 may be redundantly formed in the image display unit 20. For example, the control unit 140 shown in FIGS. 2, 15, and 20 may be formed in both of the control device 10 and the image display unit 20. The functions performed by the control unit 140 formed in the control device 10 and the CPU formed in the image display unit 20 may be configured to be separately divided.

REFERENCE SIGNS LIST

10 Control device
20, 20A, 20B Image display units
21 Right holding unit
22, 22A Right display driving units (Second display units)
23 Left holding unit
24, 24A Left display driving units (First display units)
26 Right optical-image display unit (Second display unit)
28 Left optical-image display unit (First display unit)
68 Visual line sensors (Visual-line detecting unit)
100, 100A, 100B Head-mounted display devices (Display devices)
110 Input-information acquiring unit (Receiving unit)
117 Communication unit
120 Storing unit
140 Control unit
150 Operating system
160 Image processing unit
164 Division control unit (Display-state control unit)
170 Sound processing unit
180 Interface
190 Display control unit
201 Right backlight control unit
202 Left backlight control unit
211 Right LCD control unit
212 Left LCD control unit
221 Right backlight
222 Left backlight
241 Right LCD
242 Left LCD
251 Right projection optical system
252 Left projection optical system
261 Right light guide plate
261A, 262A Half mirrors (Reflecting units)
262 Left light guide plate
401, 411 Light sources
402 Right light-source driving unit
403, 413 Mirrors
404, 414 MEMS scanners (Light scanning units)
405, 415 Mirror-driving control units
412 Left light-source driving unit

The invention claimed is:

1. A display device comprising:
a first display unit configured to display an image corresponding to a left eye of a user;
a second display unit configured to display an image corresponding to a right eye of the user;
an image processing unit configured to divide a display target image into a first divided image and a second divided image, and output a first image that includes the first divided image and a first dummy image to the first display unit, and output a second image that includes the second divided image and a second dummy image to the second display unit; and
a display-state control unit configured to control a display position of an image region of the first image in the first display unit and a display position of an image region of the second image in the second display unit, wherein
the first display unit displays the first image and the second display unit displays the second image simultaneously,
a region corresponding to the second divided image overlaps a region corresponding to the first divided image, thereby forming an overlapping region, the overlapping region having a reduced luminance compared to regions other than the overlapping region,
the display-state control unit disposes a predetermined index in a same relative position of the first image and the second image, and
the display-state control unit changes a display size of the index displayed on the first display unit and the second display unit.

2. The display device according to claim 1, wherein the first dummy image and the second dummy image are pseudo image regions including pseudo images different from the first and second divided images.

3. The display device according to claim 1, wherein the first image and the second image are images visually recognized as the display target image by a user when the first image and the second image are displayed on the first display unit and the second display unit.

4. The display device according to claim 1, wherein the image processing unit associates positions of image regions in the first image and the second image with positions of the divided images in the display target image.

5. The display device according to claim claim 1, further comprising a receiving unit configured to receive an input of the user, wherein
the display-state control unit changes, according to the input received by the receiving unit, at least one of the display position of the image region of the first image in the first display unit and the display position of the image region of the second image in the second display unit.

6. The display device according to claim 1, wherein the display device controls, according to a state of a visual line of the user, at least one of the display position of the image region of the first image in the first display unit and the display position of the image region of the second image in the second display unit.

7. The display device according to claim 6, further comprising a visual-line detecting unit configured to detect a visual line direction of the user, wherein
the display-state control unit controls, according to the visual line direction detected by the visual-line detecting unit, at least one of the display position of the image region of the first image in the first display unit and the display position of the image region of the second image in the second display unit.

8. The display device according to claim 7, wherein the display-state control unit controls, according to a visual line direction of a dominant eye of the user detected by the visual-line detecting unit, the display position of the image region of the first image in the first display unit and the display position of the image region of the second image in the second display unit.

9. The display device according to claim 1, wherein
the first display unit and the second display unit transmit an outside scene and display the images to be enabled to be visually recognized together with the outside scene, and
the display-state control unit adjusts a display mode of a dummy data region in at least one of the first image and the second image.

10. The display device according to claim 9, further comprising a display control unit configured to cause the first display unit and the second display unit to display the display target image according to a position where the user visually recognizes a target object included in the outside scene, wherein
the display-state control unit controls, according to the position where the user visually recognizes the target object, the display position of the image region of the first image in the first display unit and the display position of the image region of the second image in the second display unit.

11. The display device according to claim claim 1, wherein the display-state control unit extracts two images having portions overlapping each other from the display target image and sets the two images respectively as the image regions of the first image and the second image.

12. The display device according to claim 1, wherein the display-state control unit disposes the image regions and dummy data regions in regions set in advance in the first image and the second image.

13. The display device according to claim 1, wherein the display-state control unit disposes a plurality of the image regions and a plurality of dummy data regions in each of the first image and the second image.

14. The display device according to claim 1, wherein the display-state control unit sets a display size of the first image displayed on the first display unit and a display size of the second image displayed on the second display unit to a same size.

15. The display device according to claim 1, wherein the display-state control unit reduces a display size of the index as time elapses and, when the display target image changes, expands the display size of the index.

16. The display device according to claim 1, wherein
the first display unit and the second display unit respectively include light sources, light scanning units configured to two-dimensionally scan lights from the light sources, and
reflecting units configured to reflect the lights two-dimensionally scanned by the light scanning units to the user, and
the display-state control unit causes the image processing unit to output the first image and the second image corresponding to amplitudes of the scanning of the lights by the light scanning units of the first display unit and the second display unit to the first and second display units.

17. The display device according to claim 1, wherein the first display unit and the second display unit display the first image and the second image at timings different from each other.

18. A control method for a display device including first and second display units, the control method comprising:
dividing a display target image into a first divided image and a second divided image, a region corresponding to the second divided image overlapping a region corresponding to the first divided image, thereby forming an overlapping region, the overlapping region having a reduced luminance compared to regions other than the overlapping region;
outputting a first image that includes the first divided image and a first dummy image to the first display unit;
outputting a second image that includes the second divided image and a second dummy image to the second display unit;
controlling a display position of an image region of the first image in the first display unit and a display position of an image region of the second image in the second display unit;
simultaneously displaying the first image with the first display unit and the second image with the second display unit;
disposing a predetermined index in a same relative position of the first image and the second image; and
changing a display size of the index displayed on the first display unit and the second display unit.

19. A non-transitory, computer readable medium storing a program executable by a computer that controls a display device including first and second display units, the program causes the computer to function as an image processing unit configured to:
divide a display target image into a first divided image and a second divided image, a region corresponding to the second divided image overlapping a region corresponding to the first divided image, thereby forming an overlapping region, the overlapping region having a reduced luminance compared to regions other than the overlapping region;
output a first image that includes the first divided image and a first dummy image to the first display unit;
output a second image that includes the second divided image and a second dummy image to the second display unit;
control a display position of an image region of the first image in the first display unit and a display position of an image region of the second image in the second display unit;
simultaneously display the first image with the first display unit and the second image with the second display unit;
dispose a predetermined index in a same relative position of the first image and the second image; and
change a display size of the index displayed on the first display unit and the second display unit.

20. The display device according to claim 1, wherein the second divided image is located at a region corresponding to the first dummy image in the first image.

* * * * *